(12) United States Patent
Srinivasan et al.

(10) Patent No.: US 11,308,132 B2
(45) Date of Patent: Apr. 19, 2022

(54) REFERENCE ATTRIBUTES FOR RELATED STORED OBJECTS IN A MULTI-TENANT CLOUD SERVICE

(71) Applicant: Oracle International Corporation, Redwood Shores, CA (US)

(72) Inventors: Sudhir Kumar Srinivasan, San Jose, CA (US); Shruthi Chikkanna, Issaquah, WA (US); Nikhil Yograj Vaishnavi, Fremont, CA (US); Xiaoxiao Xu, Santa Clara, CA (US); Gregg Wilson, Austin, TX (US); Venkateswara Reddy Medam, Modesto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 198 days.

(21) Appl. No.: 15/991,057

(22) Filed: May 29, 2018

(65) Prior Publication Data
US 2019/0095516 A1     Mar. 28, 2019

Related U.S. Application Data

(60) Provisional application No. 62/563,796, filed on Sep. 27, 2017, provisional application No. 62/563,842, filed on Sep. 27, 2017.

(51) Int. Cl.
*G06F 16/00*     (2019.01)
*G06F 16/28*     (2019.01)
(Continued)

(52) U.S. Cl.
CPC ......... *G06F 16/288* (2019.01); *G06F 9/5072* (2013.01); *G06F 16/211* (2019.01);
(Continued)

(58) Field of Classification Search
CPC combination set(s) only.
See application file for complete search history.

(56) References Cited

U.S. PATENT DOCUMENTS

| | | | |
|---|---|---|---|
| 5,550,971 | A | 8/1996 | Brunner et al. |
| 6,097,382 | A | 8/2000 | Rosen et al. |

(Continued)

FOREIGN PATENT DOCUMENTS

| | | |
|---|---|---|
| CN | 101166173 A | 4/2008 |
| CN | 101399813 A | 4/2009 |

(Continued)

OTHER PUBLICATIONS

"Cross-Device Single Sign-On Session Transfer", retrieved from https://www.egiz.gv.at/en/projekte/160-sso_session_transfer on Sep. 7, 2017.

(Continued)

*Primary Examiner* — Farhan M Syed
(74) *Attorney, Agent, or Firm* — Potomac Law Group, PLLC

(57) ABSTRACT

A system stores and uses object relationships in a multi-tenant cloud-based identity and access management (IAM) system by: defining a schema for storing related objects, where the schema includes reference attributes indicative of relationships between the related objects in a database, and the schema defines a relationship type and a persistence scope for each reference attribute; constructing an in-memory representation of the related objects and their relationships based on the schema, where the in-memory representation indicates the relationship type and the persistence scope for each reference attribute; and using the in-memory representation of the related objects to perform an IAM service for a client of the multi-tenant cloud-based IAM system.

20 Claims, 21 Drawing Sheets

(51) Int. Cl.
  *G06F 16/21*     (2019.01)
  *G06F 16/2457*   (2019.01)
  *H04L 29/06*     (2006.01)
  *G06F 9/50*      (2006.01)

(52) U.S. Cl.
  CPC ........ *G06F 16/213* (2019.01); *G06F 16/2457* (2019.01); *H04L 63/0815* (2013.01); *H04L 63/102* (2013.01)

(56) References Cited

U.S. PATENT DOCUMENTS

| | | |
|---|---|---|
| 6,266,058 B1 | 7/2001 | Meyer |
| 6,353,834 B1 | 3/2002 | Wong et al. |
| 6,578,068 B1 | 6/2003 | Bowman-Amuah |
| 6,606,663 B1 | 8/2003 | Liao et al. |
| 6,631,497 B1 | 10/2003 | Jamshidi et al. |
| 6,631,519 B1 | 10/2003 | Nicholson et al. |
| 6,978,305 B1 | 12/2005 | Nainani et al. |
| 6,990,653 B1 | 1/2006 | Burd et al. |
| 7,062,502 B1 | 6/2006 | Kesler |
| 7,111,307 B1 | 9/2006 | Wang |
| 7,116,310 B1 | 10/2006 | Evans et al. |
| 7,203,678 B1 | 4/2007 | Petropoulos et al. |
| 7,337,434 B2 | 2/2008 | Nichols et al. |
| 7,395,355 B2 | 7/2008 | Afergan et al. |
| 7,428,725 B2 | 9/2008 | Niyogi et al. |
| 7,430,742 B2 | 9/2008 | Cwalina et al. |
| 7,464,297 B2 | 12/2008 | Potter et al. |
| 7,487,248 B2 | 2/2009 | Moran et al. |
| 7,529,825 B1 | 5/2009 | Freskos et al. |
| 7,546,576 B2 | 6/2009 | Egli |
| 7,546,602 B2 | 6/2009 | Hejlsberg et al. |
| 7,577,909 B2 | 8/2009 | Harriger et al. |
| 7,577,934 B2 | 8/2009 | Anonsen et al. |
| 7,610,575 B2 | 10/2009 | Sproule |
| 7,650,594 B2 | 1/2010 | Nattinger |
| 7,685,430 B1 | 3/2010 | Masurkar |
| 7,703,128 B2 | 4/2010 | Cross et al. |
| 7,707,553 B2 | 4/2010 | Roques et al. |
| 7,720,864 B1 | 5/2010 | Muth et al. |
| 7,730,427 B2 | 6/2010 | Peters |
| 7,735,068 B2 | 6/2010 | Siddaramappa et al. |
| 7,757,177 B1 | 7/2010 | Bohm et al. |
| 7,757,207 B2 | 7/2010 | Yan et al. |
| 7,779,383 B2 | 8/2010 | Bomhoevd et al. |
| 7,827,256 B2 | 11/2010 | Phillips et al. |
| 7,849,447 B1 | 12/2010 | Karis et al. |
| 7,861,121 B2 | 12/2010 | Wang |
| 7,913,246 B2 | 3/2011 | Hammond et al. |
| 7,917,888 B2 | 3/2011 | Chong et al. |
| 7,926,027 B2 | 4/2011 | Chen et al. |
| 8,032,634 B1 | 10/2011 | Eppstein et al. |
| 8,099,766 B1 | 1/2012 | Corbett |
| 8,166,387 B2 | 4/2012 | Morrison et al. |
| 8,209,491 B2 | 6/2012 | Mobarak et al. |
| 8,219,970 B2 | 7/2012 | Neil et al. |
| 8,245,037 B1 | 8/2012 | Durgin et al. |
| 8,364,968 B2 | 1/2013 | Corcoran et al. |
| 8,417,728 B1 | 4/2013 | Anders et al. |
| 8,452,567 B1 | 5/2013 | Sullivan et al. |
| 8,464,063 B2 | 6/2013 | Agarwal et al. |
| 8,473,951 B2 | 6/2013 | Sharon et al. |
| 8,554,846 B2 | 10/2013 | Brail |
| 8,578,282 B2 | 11/2013 | Boillot |
| 8,607,322 B2 | 12/2013 | Hinton et al. |
| 8,612,599 B2 | 12/2013 | Tung et al. |
| 8,676,723 B2 | 3/2014 | Jung |
| 8,732,182 B2 | 5/2014 | Bethlehem et al. |
| 8,732,665 B2 | 5/2014 | Vedula et al. |
| 8,745,641 B1 | 6/2014 | Coker |
| 8,782,632 B1 | 7/2014 | Chigurapati et al. |
| 8,799,641 B1 | 8/2014 | Seidenberg et al. |
| 8,812,627 B2 | 8/2014 | Donahue et al. |
| 8,813,028 B2 | 8/2014 | Farooqi |
| 8,824,274 B1 | 9/2014 | Medved et al. |
| 8,856,869 B1 | 10/2014 | Brinskelle |
| 8,863,111 B2 | 10/2014 | Selitser et al. |
| 8,873,401 B2 | 10/2014 | Ashwood-Smith et al. |
| 8,938,540 B2 | 1/2015 | Biljon et al. |
| 8,943,309 B1 | 1/2015 | Schilder et al. |
| 8,949,776 B2 | 2/2015 | Feber |
| 8,954,732 B1 | 2/2015 | Watsen et al. |
| 8,955,081 B2 | 2/2015 | Metke et al. |
| 8,959,063 B2 | 2/2015 | Haeberle et al. |
| 8,972,929 B2 | 3/2015 | Fahmy |
| 8,977,693 B2 | 3/2015 | Gidugu |
| 8,978,114 B1 | 3/2015 | Kaushik et al. |
| 8,984,581 B2 | 3/2015 | Luna et al. |
| 8,990,765 B2 | 3/2015 | Kulkarni et al. |
| 9,009,858 B2 | 4/2015 | Kevin et al. |
| 9,037,723 B2 | 5/2015 | Morgan |
| 9,047,166 B2 | 6/2015 | Nishio et al. |
| 9,047,404 B1 | 6/2015 | Jibaly et al. |
| 9,047,414 B1 | 6/2015 | Matyjek |
| 9,069,599 B2 | 6/2015 | Martinez et al. |
| 9,069,979 B2 | 6/2015 | Srinivasan et al. |
| 9,077,770 B2 | 7/2015 | Redpath |
| 9,105,046 B1 | 8/2015 | Dias et al. |
| 9,118,657 B1 | 8/2015 | Shetty |
| 9,154,485 B1 | 10/2015 | Fallows et al. |
| 9,158,518 B2 | 10/2015 | Brown et al. |
| 9,183,321 B2 | 11/2015 | Murthy |
| 9,223,684 B2 | 12/2015 | Gittelman et al. |
| 9,246,840 B2 | 1/2016 | Anderson et al. |
| 9,258,668 B2 | 2/2016 | Mall et al. |
| 9,258,669 B2 | 2/2016 | Nyisztor et al. |
| 9,292,502 B2 | 3/2016 | Karlsen |
| 9,311,413 B1 | 4/2016 | Franklin et al. |
| 9,363,301 B2 * | 6/2016 | Lawson ............ H04L 12/1403 |
| 9,369,457 B2 | 6/2016 | Grajek et al. |
| 9,413,750 B2 | 8/2016 | Akula et al. |
| 9,432,457 B2 | 8/2016 | Marano et al. |
| 9,448,790 B2 | 9/2016 | Collison et al. |
| 9,483,491 B2 | 11/2016 | Wijayaratne et al. |
| 9,544,293 B2 | 1/2017 | Mathew et al. |
| 9,648,007 B1 | 5/2017 | Sterling et al. |
| 9,715,534 B2 | 7/2017 | Beausoleil et al. |
| 9,729,539 B1 | 8/2017 | Agrawal et al. |
| 9,772,822 B2 | 9/2017 | Narayanan et al. |
| 9,826,045 B2 | 11/2017 | Straub et al. |
| 9,886,524 B1 | 2/2018 | Richardson et al. |
| 9,948,702 B2 | 4/2018 | Exton et al. |
| 10,013,364 B1 | 7/2018 | O'Brien et al. |
| 10,021,077 B1 | 7/2018 | Brown |
| 10,148,493 B1 | 12/2018 | Ennis, Jr. et al. |
| 10,263,947 B2 * | 4/2019 | Vats ............... H04L 9/3213 |
| 10,331,422 B1 | 6/2019 | Russell |
| 10,410,210 B1 | 9/2019 | Solis |
| 10,505,941 B2 * | 12/2019 | Vats ............... H04L 63/102 |
| 10,521,780 B1 | 12/2019 | Hopkins, III et al. |
| 10,567,381 B1 | 2/2020 | Baer et al. |
| 10,878,512 B1 | 12/2020 | Al-Zoubi et al. |
| 2001/0007128 A1 | 7/2001 | Lambert et al. |
| 2001/0020274 A1 | 9/2001 | Shambroom |
| 2002/0116441 A1 | 8/2002 | Ding et al. |
| 2002/0129264 A1 | 9/2002 | Rowland et al. |
| 2002/0174010 A1 | 11/2002 | Rice |
| 2003/0014315 A1 | 1/2003 | Jaalinoja et al. |
| 2003/0028583 A1 | 2/2003 | Flores et al. |
| 2003/0115341 A1 | 6/2003 | Sinha et al. |
| 2003/0149717 A1 | 8/2003 | Heinzman |
| 2004/0010621 A1 | 1/2004 | Afergan et al. |
| 2004/0028212 A1 | 2/2004 | Lok et al. |
| 2004/0031030 A1 | 2/2004 | Kidder et al. |
| 2004/0046789 A1 | 3/2004 | Inanoria |
| 2004/0128546 A1 | 7/2004 | Blakley et al. |
| 2004/0148505 A1 | 7/2004 | Qiu |
| 2004/0250257 A1 | 12/2004 | Koutyrine et al. |
| 2005/0055631 A1 | 3/2005 | Scardina et al. |
| 2005/0091539 A1 | 4/2005 | Wang et al. |
| 2005/0117587 A1 | 6/2005 | Kawato |
| 2005/0171872 A1 | 8/2005 | Burch et al. |
| 2005/0172261 A1 | 8/2005 | Yuknewicz et al. |

(56) References Cited

U.S. PATENT DOCUMENTS

| | | |
|---|---|---|
| 2005/0183059 A1 | 8/2005 | Loksh et al. |
| 2006/0064582 A1 | 3/2006 | Teal et al. |
| 2006/0075398 A1 | 4/2006 | Bennett et al. |
| 2006/0143359 A1 | 6/2006 | Dostert et al. |
| 2006/0173873 A1 | 8/2006 | Prompt et al. |
| 2006/0176901 A1 | 8/2006 | Terai et al. |
| 2006/0185004 A1 | 8/2006 | Song et al. |
| 2006/0230363 A1 | 10/2006 | Rapp |
| 2006/0291398 A1 | 12/2006 | Potter et al. |
| 2007/0016804 A1 | 1/2007 | Kemshall |
| 2007/0078887 A1 | 4/2007 | Harvey et al. |
| 2007/0112574 A1 | 5/2007 | Greene |
| 2007/0124443 A1 | 5/2007 | Nanda et al. |
| 2007/0174290 A1 | 7/2007 | Narang et al. |
| 2007/0219956 A1 | 9/2007 | Milton |
| 2007/0240127 A1 | 10/2007 | Roques et al. |
| 2007/0255764 A1 | 11/2007 | Sonnier et al. |
| 2008/0049779 A1 | 2/2008 | Hopmann et al. |
| 2008/0077809 A1 | 3/2008 | Hayler et al. |
| 2008/0112620 A1 | 5/2008 | Jiang |
| 2008/0222238 A1 | 9/2008 | Ivanov et al. |
| 2008/0256026 A1 | 10/2008 | Hays |
| 2008/0256280 A1 | 10/2008 | Ma |
| 2008/0256554 A1 | 10/2008 | Yassin |
| 2008/0276224 A1 | 11/2008 | Gyure et al. |
| 2008/0288644 A1 | 11/2008 | Gilfix et al. |
| 2008/0301685 A1 | 12/2008 | Thomas et al. |
| 2009/0006538 A1 | 1/2009 | Risney et al. |
| 2009/0019533 A1 | 1/2009 | Hazlewood et al. |
| 2009/0064001 A1 | 3/2009 | Robbins |
| 2009/0086726 A1 | 4/2009 | Savage et al. |
| 2009/0106234 A1 | 4/2009 | Siedlecki et al. |
| 2009/0119763 A1 | 5/2009 | Park et al. |
| 2009/0125595 A1 | 5/2009 | Maes |
| 2009/0157811 A1 | 6/2009 | Bailor et al. |
| 2009/0164571 A1 | 6/2009 | Potter et al. |
| 2009/0178129 A1 | 7/2009 | Cross et al. |
| 2009/0183072 A1 | 7/2009 | Stephenson et al. |
| 2010/0017812 A1 | 1/2010 | Nigam |
| 2010/0042869 A1 | 2/2010 | Szabo et al. |
| 2010/0070230 A1 | 3/2010 | Kumar et al. |
| 2010/0083386 A1 | 4/2010 | Kline et al. |
| 2010/0088519 A1 | 4/2010 | Tsuruoka et al. |
| 2010/0107241 A1 | 4/2010 | Jaber et al. |
| 2010/0169640 A1 | 7/2010 | Smith et al. |
| 2010/0251352 A1 | 9/2010 | Zarchy et al. |
| 2010/0257513 A1 | 10/2010 | Thirumalai et al. |
| 2010/0281475 A1 | 11/2010 | Jain et al. |
| 2010/0286992 A1 | 11/2010 | Tkatch et al. |
| 2010/0293080 A1 | 11/2010 | Shah |
| 2011/0010394 A1 | 1/2011 | Carew et al. |
| 2011/0022812 A1 | 1/2011 | Linden et al. |
| 2011/0067097 A1 | 3/2011 | Park et al. |
| 2011/0078675 A1 | 3/2011 | Camp et al. |
| 2011/0107196 A1 | 5/2011 | Foster |
| 2011/0123973 A1 | 5/2011 | Singh |
| 2011/0125448 A1 | 5/2011 | Jung |
| 2011/0126002 A1 | 5/2011 | Fu et al. |
| 2011/0138034 A1 | 6/2011 | Brookbanks et al. |
| 2011/0153667 A1 | 6/2011 | Parmenter et al. |
| 2011/0209140 A1 | 8/2011 | Scheidel et al. |
| 2011/0213756 A1 | 9/2011 | Chen et al. |
| 2011/0213870 A1 | 9/2011 | Cai et al. |
| 2011/0246964 A1 | 10/2011 | Cox et al. |
| 2011/0265077 A1 | 10/2011 | Collison et al. |
| 2011/0295838 A1 | 12/2011 | Collins et al. |
| 2011/0302398 A1 | 12/2011 | Ureche et al. |
| 2011/0302516 A1 | 12/2011 | White et al. |
| 2011/0314159 A1 | 12/2011 | Murphy et al. |
| 2011/0321033 A1 | 12/2011 | Kelkar et al. |
| 2011/0321150 A1 | 12/2011 | Gluck |
| 2012/0011578 A1 | 1/2012 | Hinton et al. |
| 2012/0017085 A1 | 1/2012 | Carter et al. |
| 2012/0036125 A1 | 2/2012 | Al-Kofahi et al. |
| 2012/0090021 A1 | 4/2012 | Luh et al. |
| 2012/0096521 A1 | 4/2012 | Peddada |
| 2012/0102451 A1 | 4/2012 | Kulkarni et al. |
| 2012/0110650 A1 | 5/2012 | Biljon et al. |
| 2012/0131683 A1 | 5/2012 | Nassar et al. |
| 2012/0144501 A1 | 6/2012 | Vangpat et al. |
| 2012/0151063 A1 | 6/2012 | Yang et al. |
| 2012/0151568 A1 | 6/2012 | Pieczul et al. |
| 2012/0166488 A1 | 6/2012 | Kaushik et al. |
| 2012/0170751 A1 | 7/2012 | Wurm |
| 2012/0215582 A1 | 8/2012 | Petri et al. |
| 2012/0252405 A1 | 10/2012 | Lortz et al. |
| 2012/0297016 A1 | 11/2012 | Iyer et al. |
| 2012/0317172 A1 | 12/2012 | Redpath |
| 2012/0317233 A1 | 12/2012 | Redpath |
| 2012/0323553 A1 | 12/2012 | Aslam et al. |
| 2012/0328105 A1 | 12/2012 | Mukkara et al. |
| 2013/0007845 A1 | 1/2013 | Chang et al. |
| 2013/0019015 A1 | 1/2013 | Devarakonda et al. |
| 2013/0019242 A1 | 1/2013 | Chen et al. |
| 2013/0024695 A1 | 1/2013 | Kandrasheu et al. |
| 2013/0031136 A1 | 1/2013 | Shah |
| 2013/0071087 A1 | 3/2013 | Motiwala et al. |
| 2013/0086645 A1 | 4/2013 | Srinivasan et al. |
| 2013/0151848 A1 | 6/2013 | Baumann et al. |
| 2013/0152047 A1 | 6/2013 | Moorthi et al. |
| 2013/0173712 A1 | 7/2013 | Llorente et al. |
| 2013/0179961 A1 | 7/2013 | Abe |
| 2013/0191339 A1 | 7/2013 | Haden et al. |
| 2013/0191481 A1 | 7/2013 | Prevost et al. |
| 2013/0198236 A1 | 8/2013 | Lissack et al. |
| 2013/0198824 A1 | 8/2013 | Hitchcock et al. |
| 2013/0232179 A1 | 9/2013 | Chhaunker et al. |
| 2013/0239192 A1 | 9/2013 | Linga et al. |
| 2013/0247142 A1 | 9/2013 | Nishizawa et al. |
| 2013/0254262 A1 | 9/2013 | Udall |
| 2013/0262626 A1 | 10/2013 | Bozek et al. |
| 2013/0312067 A1 | 11/2013 | Ogura et al. |
| 2013/0312117 A1 | 11/2013 | Kevin et al. |
| 2014/0006465 A1 | 1/2014 | Davis et al. |
| 2014/0007205 A1 | 1/2014 | Oikonomou |
| 2014/0013109 A1 | 1/2014 | Yin |
| 2014/0013400 A1 | 1/2014 | Warshavsky et al. |
| 2014/0032531 A1 | 1/2014 | Ravi et al. |
| 2014/0039888 A1 | 2/2014 | Taubman et al. |
| 2014/0040920 A1 | 2/2014 | Wu et al. |
| 2014/0050317 A1 | 2/2014 | Sabin |
| 2014/0053056 A1 | 2/2014 | Weber et al. |
| 2014/0053126 A1 | 2/2014 | Watson et al. |
| 2014/0075032 A1 | 3/2014 | Vasudevan et al. |
| 2014/0075501 A1 | 3/2014 | Srinivasan et al. |
| 2014/0075513 A1* | 3/2014 | Trammel ............ H04L 63/0876 726/4 |
| 2014/0089674 A1 | 3/2014 | Buehl |
| 2014/0090037 A1 | 3/2014 | Singh |
| 2014/0109072 A1 | 4/2014 | Lang et al. |
| 2014/0109078 A1 | 4/2014 | Lang et al. |
| 2014/0114707 A1 | 4/2014 | Rope et al. |
| 2014/0136840 A1 | 5/2014 | Spalka et al. |
| 2014/0164318 A1 | 6/2014 | Tsai et al. |
| 2014/0172486 A1 | 6/2014 | Kwan et al. |
| 2014/0173454 A1 | 6/2014 | Sanchez |
| 2014/0245389 A1 | 8/2014 | Oberheide et al. |
| 2014/0280771 A1 | 9/2014 | Bosworth et al. |
| 2014/0280931 A1 | 9/2014 | Braun et al. |
| 2014/0280943 A1 | 9/2014 | Bobrov et al. |
| 2014/0280948 A1 | 9/2014 | Schmidt et al. |
| 2014/0281943 A1 | 9/2014 | Prilepov et al. |
| 2014/0282398 A1 | 9/2014 | Podolyak et al. |
| 2014/0282399 A1 | 9/2014 | Gorelik et al. |
| 2014/0282889 A1 | 9/2014 | Ishaya et al. |
| 2014/0298293 A1 | 10/2014 | Nishio et al. |
| 2014/0304507 A1 | 10/2014 | Coppola et al. |
| 2014/0304700 A1 | 10/2014 | Kim et al. |
| 2014/0310243 A1 | 10/2014 | McGee et al. |
| 2014/0324911 A1 | 10/2014 | Lavarene et al. |
| 2014/0330869 A1 | 11/2014 | Factor et al. |
| 2014/0337914 A1 | 11/2014 | Canning et al. |
| 2015/0007274 A1 | 1/2015 | Chang et al. |
| 2015/0039732 A1 | 2/2015 | Mall et al. |

(56) References Cited

U.S. PATENT DOCUMENTS

| | | |
|---|---|---|
| 2015/0040104 A1 | 2/2015 | Mall et al. |
| 2015/0040201 A1 | 2/2015 | Nyisztor et al. |
| 2015/0067135 A1 | 3/2015 | Wang et al. |
| 2015/0074670 A1 | 3/2015 | Gerganov |
| 2015/0082035 A1 | 3/2015 | Medvinsky |
| 2015/0088806 A1* | 3/2015 | Lotan ................ G06F 16/254 707/602 |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089351 A1 | 3/2015 | Logan et al. |
| 2015/0089569 A1 | 3/2015 | Sondhi et al. |
| 2015/0089604 A1 | 3/2015 | Mathew et al. |
| 2015/0095923 A1 | 4/2015 | Sarid |
| 2015/0121462 A1 | 4/2015 | Courage et al. |
| 2015/0128063 A1 | 5/2015 | Jones |
| 2015/0128106 A1 | 5/2015 | Halley et al. |
| 2015/0135296 A1 | 5/2015 | Cason et al. |
| 2015/0154415 A1 | 6/2015 | Wu et al. |
| 2015/0172139 A1 | 6/2015 | Dennis et al. |
| 2015/0195182 A1 | 7/2015 | Mathur et al. |
| 2015/0195313 A1 | 7/2015 | Lewis et al. |
| 2015/0213284 A1 | 7/2015 | Birkel et al. |
| 2015/0229638 A1 | 8/2015 | Loo |
| 2015/0256530 A1 | 9/2015 | Semba |
| 2015/0271200 A1 | 9/2015 | Brady et al. |
| 2015/0295844 A1 | 10/2015 | Perreira et al. |
| 2015/0304446 A1 | 10/2015 | Kato |
| 2015/0317156 A1 | 11/2015 | Chan et al. |
| 2015/0319185 A1 | 11/2015 | Kirti et al. |
| 2015/0319252 A1 | 11/2015 | Momchilov et al. |
| 2015/0324386 A1 | 11/2015 | Calder et al. |
| 2015/0332596 A1 | 11/2015 | Applehans |
| 2015/0350186 A1 | 12/2015 | Chan et al. |
| 2015/0350338 A1 | 12/2015 | Barnett et al. |
| 2016/0004668 A1 | 1/2016 | Rowles et al. |
| 2016/0048848 A1 | 2/2016 | Diggs et al. |
| 2016/0080360 A1 | 3/2016 | Child et al. |
| 2016/0085666 A1 | 3/2016 | Jordan |
| 2016/0085735 A1 | 3/2016 | Davis et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0092540 A1 | 3/2016 | Bihani et al. |
| 2016/0105393 A1 | 4/2016 | Thakkar et al. |
| 2016/0112475 A1* | 4/2016 | Lawson ............ H04L 67/2823 709/204 |
| 2016/0119291 A1 | 4/2016 | Zollinger et al. |
| 2016/0124742 A1 | 5/2016 | Rangasamy et al. |
| 2016/0125490 A1 | 5/2016 | Angal et al. |
| 2016/0127199 A1 | 5/2016 | Ding et al. |
| 2016/0127254 A1 | 5/2016 | Kumar et al. |
| 2016/0127349 A1 | 5/2016 | Nakajima et al. |
| 2016/0127454 A1 | 5/2016 | Maheshwari et al. |
| 2016/0132214 A1 | 5/2016 | Koushik et al. |
| 2016/0142399 A1 | 5/2016 | Pace et al. |
| 2016/0149882 A1 | 5/2016 | Srivastava |
| 2016/0154629 A1 | 6/2016 | Noens et al. |
| 2016/0164920 A1 | 6/2016 | Borovoy et al. |
| 2016/0182314 A1* | 6/2016 | Will ................ H04L 41/0806 709/226 |
| 2016/0182328 A1 | 6/2016 | Bhasin et al. |
| 2016/0182588 A1 | 6/2016 | Luo et al. |
| 2016/0189153 A1 | 6/2016 | Luk et al. |
| 2016/0202007 A1 | 7/2016 | Hatch |
| 2016/0203087 A1 | 7/2016 | Nam et al. |
| 2016/0248860 A1 | 8/2016 | Dunbar et al. |
| 2016/0248866 A1 | 8/2016 | Garas |
| 2016/0267170 A1 | 9/2016 | Hastings et al. |
| 2016/0269343 A1 | 9/2016 | Li et al. |
| 2016/0285795 A1 | 9/2016 | Beausoleil et al. |
| 2016/0292694 A1 | 10/2016 | Goldschlag et al. |
| 2016/0294797 A1 | 10/2016 | Martin et al. |
| 2016/0294870 A1 | 10/2016 | Banerjee et al. |
| 2016/0314460 A1 | 10/2016 | Subramanian et al. |
| 2016/0337329 A1 | 11/2016 | Sood et al. |
| 2016/0344561 A1 | 11/2016 | Grajek |
| 2016/0352746 A1 | 12/2016 | Anderson et al. |
| 2016/0359861 A1 | 12/2016 | Manov et al. |
| 2016/0364231 A1 | 12/2016 | Tati et al. |
| 2016/0378436 A1 | 12/2016 | Jensen et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0063989 A1 | 3/2017 | Langouev et al. |
| 2017/0083293 A1 | 3/2017 | Jao et al. |
| 2017/0083503 A1 | 3/2017 | Davis et al. |
| 2017/0118095 A1 | 4/2017 | Konecny |
| 2017/0118209 A1 | 4/2017 | Saravanan |
| 2017/0141916 A1 | 5/2017 | Zhang |
| 2017/0142094 A1 | 5/2017 | Doitch et al. |
| 2017/0155686 A1 | 6/2017 | Yanacek et al. |
| 2017/0168797 A1 | 6/2017 | Pogrebinsky |
| 2017/0187785 A1 | 6/2017 | Johnson et al. |
| 2017/0187818 A1 | 6/2017 | Haswell et al. |
| 2017/0214696 A1 | 7/2017 | Cleaver et al. |
| 2017/0223057 A1 | 8/2017 | Amiri |
| 2017/0223138 A1 | 8/2017 | Amiri et al. |
| 2017/0244613 A1 | 8/2017 | Vasudevan et al. |
| 2017/0289197 A1 | 10/2017 | Mandyam et al. |
| 2017/0295184 A1 | 10/2017 | Kurian et al. |
| 2017/0315789 A1 | 11/2017 | Lam et al. |
| 2017/0331802 A1 | 11/2017 | Keshava et al. |
| 2017/0346804 A1 | 11/2017 | Beecham |
| 2017/0366547 A1* | 12/2017 | Goldfarb ............... H04L 63/102 |
| 2018/0005239 A1 | 1/2018 | Schlesinger et al. |
| 2018/0032534 A1 | 2/2018 | Koerner et al. |
| 2018/0041467 A1* | 2/2018 | Vats ................... G06F 16/282 |
| 2018/0041491 A1 | 2/2018 | Gupta et al. |
| 2018/0041516 A1* | 2/2018 | Vats ................... H04L 63/102 |
| 2018/0041598 A1* | 2/2018 | Vats ................... H04L 63/102 |
| 2018/0060546 A1 | 3/2018 | Yin et al. |
| 2018/0063258 A1 | 3/2018 | Wang et al. |
| 2018/0083915 A1* | 3/2018 | Medam ............... H04L 63/08 |
| 2018/0083944 A1* | 3/2018 | Vats ................... H04L 63/0815 |
| 2018/0083977 A1 | 3/2018 | Murugesan et al. |
| 2018/0165346 A1 | 6/2018 | Fitzpatrick et al. |
| 2018/0191700 A1 | 7/2018 | Kong et al. |
| 2018/0196643 A1 | 7/2018 | Dolby et al. |
| 2018/0321934 A1 | 11/2018 | Chaganti et al. |
| 2018/0329981 A1 | 11/2018 | Gupte et al. |
| 2019/0034199 A1 | 1/2019 | Pollock |
| 2019/0068377 A1 | 2/2019 | Matsugashita et al. |
| 2019/0073671 A1 | 3/2019 | Fang et al. |
| 2019/0089809 A1 | 3/2019 | Theebaprakasam et al. |
| 2019/0102156 A1 | 4/2019 | Kennedy |
| 2019/0114251 A1 | 4/2019 | Sapozhnikov et al. |
| 2019/0190912 A1 | 6/2019 | Boer et al. |
| 2019/0213104 A1 | 7/2019 | Qadri et al. |
| 2019/0243642 A1 | 8/2019 | Bahrami et al. |
| 2019/0243643 A1 | 8/2019 | Bahrami et al. |
| 2019/0289010 A1 | 9/2019 | Yassour et al. |
| 2019/0303887 A1 | 10/2019 | Wright et al. |
| 2019/0332357 A1 | 10/2019 | Reddy |
| 2019/0370370 A1 | 12/2019 | Wittern et al. |
| 2020/0133738 A1 | 4/2020 | Junior |
| 2020/0133744 A1 | 4/2020 | MacLeod et al. |
| 2020/0226185 A1 | 7/2020 | Yan et al. |
| 2020/0285528 A1 | 9/2020 | Olsen |
| 2020/0326913 A1 | 10/2020 | Ying et al. |
| 2021/0019307 A1 | 1/2021 | Torres et al. |

(56) References Cited

U.S. PATENT DOCUMENTS

FOREIGN PATENT DOCUMENTS

| | | | |
|---|---|---|---|
| CN | 102315945 | A | 1/2012 |
| CN | 103780635 | A | 5/2014 |
| CN | 104903905 | A | 9/2015 |
| CN | 105515759 | A | 4/2016 |
| CN | 103930897 | B | 4/2018 |
| CN | 105659558 | B | 8/2018 |
| CN | 105659557 | B | 11/2019 |
| EP | 3361700 | A1 | 8/2018 |
| JP | 2008027043 | A | 2/2008 |
| JP | 2011198109 | A | 10/2011 |
| JP | 2012103846 | A | 5/2012 |
| JP | 2013025405 | A | 2/2013 |
| JP | 2013182310 | A | 9/2013 |
| JP | 2015527681 | A | 9/2015 |
| JP | 2015529366 | A | 10/2015 |
| JP | 2015534674 | A | 12/2015 |
| JP | 2016009299 | A | 1/2016 |
| WO | 2005001620 | A2 | 1/2005 |
| WO | 2013071087 | A1 | 5/2013 |
| WO | 2013186070 | A1 | 12/2013 |
| WO | 2014039918 | A1 | 3/2014 |
| WO | 2014046857 | A1 | 3/2014 |
| WO | 2014151839 | A1 | 9/2014 |
| WO | 2014176363 | A1 | 10/2014 |
| WO | 2016049626 | A1 | 3/2016 |
| WO | 2016065080 | A1 | 4/2016 |

OTHER PUBLICATIONS

Application Note—"Implementing Single Sign-On Using SAML 2.0 on Juniper Networks Mag Series Junos Pulse Gateways", Juniper Networks, Inc., 2013, 22 pages.
Grossman et al., "ToolClips: An Investigation of Contextual Video Assistance for Functionality Understanding, CHI 2010: Looking with Video", Apr. 10-15, 2010, pp. 1515-1524.
Hudli et al., "An Evaluation Framework for Selection of Mobile App Development Platform", ACM, pp. 13-16, 2015.
Claycomb et al., "Detecting Insider Activity Using Enhanced Directory Virtualization", Oct. 2010, Proceedings of the 2010 ACM workshop on Insider threats, p. 29-36.
Larsson, "A Cast Study: Implementing Novell Identity Management at Drew University", Nov. 2005, Proceedings of the 33rd annual ACM SIGUCCS conference on user services, p. 165-170.
"Citrix XenServer Workload Balancing (WLB)"; Jan. 22, 2015;https://www.citrix.com/blogs/2015/01/22/citrix-xenserver-workload-balancing-wlb-why-xendesktop-and-xenapp-customers-really-should-take-note/.
"Explore Microsoft Azure monitoring and diagnostics", youtube,Sep. 28, 2016 (Sep. 28, 2016), p. 1 pp.• XP054977701,Retrieved from the Internet: URL:https://www.youtube.com/watch?v=wUf4sm8aAw[retrieved on Sep. 5, 2017].
Anonymous, "DaaS—Diagnostics as a Service for Azure Web Sites: Blog: Microsoft Azure", Jul. 8, 2014 (Jul. 8, 2014), XP055403199, Retrieved from the Internet: URL:https://azure.microsoft.com/en-gb/blog/daas/ [retrieved on Sep. 1, 2017].
Anonymous, Gluu Server Overview: The Gluu Server for SSO, WAM, & 2FA : Gluu, website, , Aug. 29, 2016 (Aug. 29, 2016), XP055417541, Retrieved from the Internet on Oct. 20, 2017, https://web.archive.org/web/201 60829102122/https://www.gluu.org/gluu-server/overview/.
Author Unknown, "Oracle Access Management—Complete, Integrated, Scalable Access Management Solution", Oracle White Paper, Retrieved Fromhttp://www.oracle.com/technetwork/middleware/id-mgmt/overview/complete-and-scalable-access-mgmt-1697349.pdf, Published May 2015.
Author Unknown, SCIM Directory Services, Oracle Corporation, Sep. 2012, https://tools.ietf.org/id/draft-hunt-scim-directory-00.html#rfc.section.2.2, visited Jun. 26, 2017.
Author Unknown, UnboundID Identity Proxy Product Description Version 4.5, UnboundID Corp., Austin TX, 2015 , https://cdn2.hubspot.net/hub/405650/file-2157336753-pdf/Resources/Data_Sheets/UnboundID_Identity_Proxy_v4.5PD.pdf?t=1458081481415, visited Jun. 26, 2017.
Brockallen: "Single sign-out and IdentityServer3: brockallen",Feb. 8, 2016, XP055417951, Retrieved from the Internet on Nov. 20, 2017, URL:https://brockallen.com/2016/02/08/single-sign-out-and-identityserver3/.
Gluu: "Diagram Gluu Software Architecture", Dec. 3, 2013 (Dec. 3, 2013), XP055417597, Retrieved from the Internet: URL:https://www.gluu.org/blog/wp-content/uploads/2013/12/idea_asimba.png [retrieved on Oct. 20, 2017].
Gluu: "Use Case for Asimba as SAML Proxy: Gluu : Blog", Dec. 3, 2013 (Dec. 3, 2013), XP055417606, Retrieved from the Internet:URL:https://www.gluu.org/blog/use-case-for-asimba-as-saml-proxy/ [retrieved on Oct. 20, 2017].
Gluu:"Shibboleth Plugin released to enable simultaneous OpenID Connect and SAML sessions: Gluu", Mar. 25, 2013 (Mar. 25, 2013), XP055417498,Retrieved from the Internet: URL:https://www.gluu.org/press-releases/2013/gluu-releases-shibboleth-plugin-for-ox-to-enable-simultaneous-openid-connect-and-saml-sessions/ [retrieved on Oct. 19, 2017].
Gregg Browinski: "SAML Single Logout—What You Need to Know",Jun. 20, 2016 (Jun. 20, 2016), XP055417923, Retrieved from the Internet: URL:https://www.portalguard.com/blog/2016/06/20/saml-single-logout-need-to-know/ [retrieved on Oct. 23, 2017].
Jones et al., RFC 7519 JSON Web Tokens (JWT), May 2015, IETF, pp. 1-30.
Sairam Pappu et al., "Integrate Oracle E-Business Suite Using Oracle E-Business Suite AccessGate with Oracle Access Manager Using Multiple Data Stores", Retrieved From http://www.oracle.com/technetwork/middleware/id-mgmt/oamebsintegrationwhi-tepaper-2152856.pdf, Published Feb. 2014.
Unknown, "SAML Authorization Assertion", Oct. 31, 2014, Oracle, pp. 1-2, Retrieved from docs.oracle.com.
Wikipedia: "Security Assertion Markup Language—Wikipedia",Aug. 28, 2016 (Aug. 28, 2016), XP055417859, Retrieved from the Internet:URL:https://en.wlkipedia.org/w/index.php?title=Security_Assertion_Markup_Language&oldid=736544308 [retrieved on Oct. 23, 2017].
Coan et al., "Using Distributed Topology Update and Preplanned Configurations to Achieve Trunk Network Survivability", Oct. 1991, IEEE, vol. 40, No. 4 (Year: 1991).
Konstantinou et al., "An Architecture for Virtual Solution Composition and Deployment in Infrastructure Clouds", Jun. 2009, ACM (Year: 2009).
Oliveira et al., "Delivering software with agility and quality in a cloud environment", Mar. 2016, IBM, vol. 60 No. 2/3 Paper 10 (Year: 2016).
Rasti et al., "On the Long-Term Evolution of the Two-Tier Gnutella Overlay", Apr. 2007, IEEE (Year: 2007).
Rokonuzzaman et al., "A Cross-layer Approach for Qos Topology Control in Wireless Ad Hoc Networks", 2009. IEEE (Year: 2009).
"TaskscheduleR: R Package to Schedule R Scripts with the Windows Task Manager", Bnosac, Feb. 8, 2017, https://web.archive.org/web/20170208221949/http://www.bnosac.be/index.php/blog/50-taskscheduler-r-package-to-schedule-r-scripts-with-the-windows-task-manager-2.
Peyrott, "What is and how does Single Sign On Authentication work", Blog Series, Sep. 23, 2015.
Yang et al., "Design-Role Based Multi-Tenancy Access Control Scheme for Cloud Service", 2003, International Symposium on Biometrics and Security Technologies, Date of Conference: July 2-5 (Year: 2013).
Alguliev et al., "identity management based security architecture of cloud computing on multi-agent systems", Nov. 2013, Third International Conference on Innovative Computing Technology (INTECH 2013), pp. 1-4.
Author Unknown, "AWS Identity and Access Management (IAM)", Amazon AWS website [full url in ref] as captured by the Wayback Machine Internet Archive (archive.org) on Jul. 27, 2017.

(56) References Cited

OTHER PUBLICATIONS

Author Unknown, "Create a Template for an Application", OutSystems.com website as captured by the Wayback Machine Internet Archive, Sep. 18, 2017.
Author Unknown, "Custom App Development or Template Applications? Here's How You Know", Applt Ventures website [full url in ref.] Jun. 1, 2016.
Ryan O'Leary, "Accelerate Code Development with Cloud Application Templates", Flexera Blogs, Aug. 25, 2016.
International Search Report and Written Opinion issued in the corresponding International Application No. PCT/US2020/043935, dated Oct. 28, 2020.
International Search Report and Written Opinion issued in the corresponding International Application No. PCT/US2020/048682, dated Oct. 28, 2020.
R. Fielding; Rest API Tutorial; 2017.
Gai et al., "Proactive Attribute-based Secure Data Schema for Mobile Cloud in Financial Industry," Proceedings from the IEEE 17th International Conference on High Performance Computing and Communications (HPCC), IEEE 7th International Symposium on Cyberspace Safety and Security (CSS) and IEEE 12th International Conference on Embedded Software and Systems (ICESS), 2015, pp. 1332-1337, IEEE Computer Society.

\* cited by examiner

REFERENCE ATTRIBUTES FOR RELATED STORED OBJECTS IN A MULTI-TENANT CLOUD SERVICE

CROSS-REFERENCE TO RELATED APPLICATIONS

This application claims the benefit of priority to U.S. Provisional Application Ser. No. 62/563,796, filed Sep. 27, 2017, and U.S. Provisional Application Ser. No. 62/563,842, filed Sep. 27, 2017, both being incorporated herein by reference in their entirety.

FIELD

One embodiment is directed generally to identity and access management, and in particular, to identity and access management in a cloud system.

BACKGROUND INFORMATION

Generally, the use of cloud-based applications (e.g., enterprise public cloud applications, third-party cloud applications, etc.) is soaring, with access coming from a variety of devices (e.g., desktop and mobile devices) and a variety of users (e.g., employees, partners, customers, etc.). The abundant diversity and accessibility of cloud-based applications has led identity management and access security to become a central concern. Typical security concerns in a cloud environment are unauthorized access, account hijacking, malicious insiders, etc. Accordingly, there is a need for secure access to cloud-based applications, or applications located anywhere, regardless of from what device type or by what user type the applications are accessed.

SUMMARY

A system stores and uses object relationships in a multi-tenant cloud-based identity and access management (IAM) system by: defining a schema for storing related objects, where the schema includes reference attributes indicative of relationships between the related objects in a database, and the schema defines a relationship type and a persistence scope for each reference attribute; constructing an in-memory representation of the related objects and their relationships based on the schema, where the in-memory representation indicates the relationship type and the persistence scope for each reference attribute; and using the in-memory representation of the related objects to perform an IAM service for a client of the multi-tenant cloud-based IAM system.

DETAILED DESCRIPTION

Figure 1:
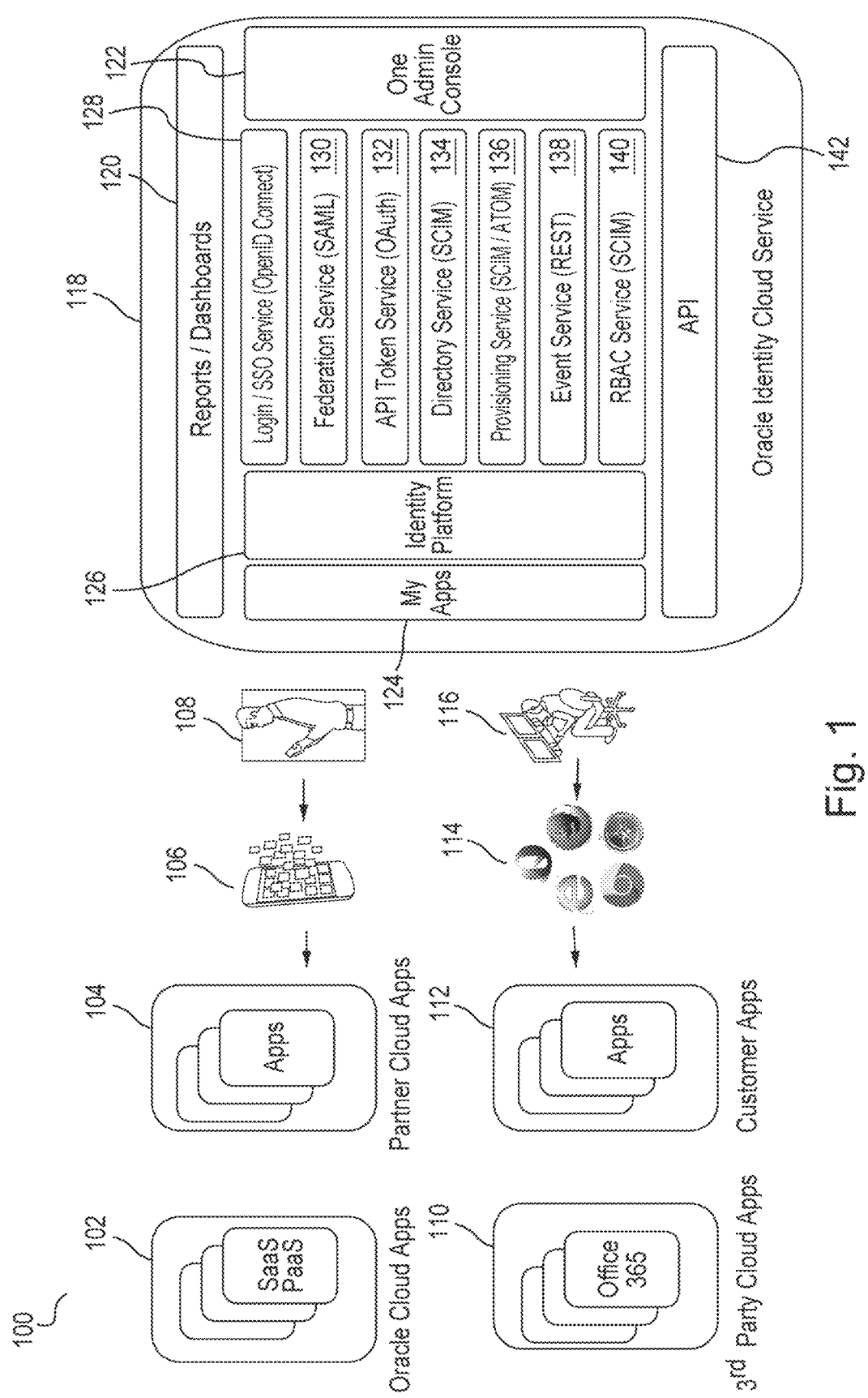
FIGS. 1-5 are block diagrams of example embodiments that provide cloud-based identity management.

Embodiments define and use a novel schema for storing objects that have references to other objects. Embodiments extend the System for Cross-domain Identity Management ("SCIM") Internet Engineering Task Force ("IETF"), Request for Comments ("RFC") 7643 to store such objects/resources for any level of references between objects and any type of resources. Further, embodiments optimally query resources that reference other resources. In embodiments, the query is determined at run-time based on the requested resource types and their reference relationships. Embodiments extend the SCIM filter functionality to address such referenced resources.

Embodiments provide an identity cloud service that implements a microservices based architecture and provides multi-tenant identity and data security management and secure access to cloud-based applications. Embodiments support secure access for hybrid cloud deployments (i.e., cloud deployments which include a combination of a public cloud and a private cloud). Embodiments protect applications and data both in the cloud and on-premise. Embodiments support multi-channel access via web, mobile, and application programming interfaces ("APIs"). Embodiments manage access for different users, such as customers, partners, and employees. Embodiments manage, control, and audit access across the cloud as well as on-premise. Embodiments integrate with new and existing applications and identities. Embodiments are horizontally scalable.

One embodiment is a system that implements a number of microservices in a stateless middle tier environment to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement access tokens that are consumed by a routing tier and a middle tier to enforce a security model for accessing the microservices. Accordingly, embodiments provide a cloud-scale Identity and Access Management ("IAM") platform based on a multi-tenant, microservices architecture.

One embodiment provides an identity cloud service that enables organizations to rapidly develop fast, reliable, and secure services for their new business initiatives. In one embodiment, the identity cloud service provides a number of core services, each of which solving a unique challenge faced by many enterprises. In one embodiment, the identity cloud service supports administrators in, for example, initial on-boarding/importing of users, importing groups with user members, creating/updating/disabling/enabling/deleting users, assigning/un-assigning users into/from groups, creating/updating/deleting groups, resetting passwords, managing policies, sending activation, etc. The identity cloud service also supports end users in, for example, modifying profiles, setting primary/recovery emails, verifying emails, unlocking their accounts, changing passwords, recovering passwords in case of forgotten password, etc.

Unified Security of Access

One embodiment protects applications and data in a cloud environment as well as in an on-premise environment. The embodiment secures access to any application from any device by anyone. The embodiment provides protection across both environments since inconsistencies in security between the two environments may result in higher risks. For example, such inconsistencies may cause a sales person to continue having access to their Customer Relationship Management ("CRM") account even after they have defected to the competition. Accordingly, embodiments extend the security controls provisioned in the on-premise environment into the cloud environment. For example, if a person leaves a company, embodiments ensure that their accounts are disabled both on-premise and in the cloud.

Generally, users may access applications and/or data through many different channels such as web browsers, desktops, mobile phones, tablets, smart watches, other wearables, etc. Accordingly, one embodiment provides secured access across all these channels. For example, a user may use their mobile phone to complete a transaction they started on their desktop.

One embodiment further manages access for various users such as customers, partners, employees, etc. Generally, applications and/or data may be accessed not just by employees but by customers or third parties. Although many known systems take security measures when onboarding employees, they generally do not take the same level of security measures when giving access to customers, third parties, partners, etc., resulting in the possibility of security breaches by parties that are not properly managed. However, embodiments ensure that sufficient security measures are provided for access of each type of user and not just employees.

Identity Cloud Service

Embodiments provide an Identity Cloud Service ("IDCS") that is a multi-tenant, cloud-scale, IAM platform. IDCS provides authentication, authorization, auditing, and federation. IDCS manages access to custom applications and services running on the public cloud, and on-premise systems. In an alternative or additional embodiment, IDCS may also manage access to public cloud services. For example, IDCS can be used to provide Single Sign On ("SSO") functionality across such variety of services/applications/systems.

Embodiments are based on a multi-tenant, microservices architecture for designing, building, and delivering cloud-scale software services. Multi-tenancy refers to having one physical implementation of a service securely supporting multiple customers buying that service. A service is a software functionality or a set of software functionalities (such as the retrieval of specified information or the execution of a set of operations) that can be reused by different clients for different purposes, together with the policies that control its usage (e.g., based on the identity of the client requesting the service). In one embodiment, a service is a mechanism to enable access to one or more capabilities, where the access is provided using a prescribed interface and is exercised consistent with constraints and policies as specified by the service description.

In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an HTTP resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, microservices architecture refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional Hypertext Transfer Protocol ("HTTP") port) and that allows any other module/microservice within the same service to talk to it. A microservice or any other self-contained functional module can be generically referred to as a "service".

Embodiments provide multi-tenant identity management services. Embodiments are based on open standards to ensure ease of integration with various applications, delivering IAM capabilities through standards-based services.

Embodiments manage the lifecycle of user identities which entails the determination and enforcement of what an identity can access, who can be given such access, who can manage such access, etc. Embodiments run the identity management workload in the cloud and support security functionality for applications that are not necessarily in the cloud. The identity management services provided by the embodiments may be purchased from the cloud. For example, an enterprise may purchase such services from the cloud to manage their employees' access to their applications.

Embodiments provide system security, massive scalability, end user usability, and application interoperability. Embodiments address the growth of the cloud and the use of identity services by customers. The microservices based foundation addresses horizontal scalability requirements, while careful orchestration of the services addresses the functional requirements. Achieving both goals requires decomposition (wherever possible) of the business logic to achieve statelessness with eventual consistency, while much of the operational logic not subject to real-time processing is shifted to near-real-time by offloading to a highly scalable asynchronous event management system with guaranteed delivery and processing. Embodiments are fully multi-tenant from the web tier to the data tier in order to realize cost efficiencies and ease of system administration.

Embodiments are based on industry standards (e.g., Open ID Connect, OAuth2, Security Assertion Markup Language 2 ("SAML2"), System for Cross-domain Identity Management ("SCIM"), Representational State Transfer ("REST"), etc.) for ease of integration with various applications. One embodiment provides a cloud-scale API platform and implements horizontally scalable microservices for elastic scalability. The embodiment leverages cloud principles and provides a multi-tenant architecture with per-tenant data separation. The embodiment further provides per-tenant customization via tenant self-service. The embodiment is available via APIs for on-demand integration with other identity services, and provides continuous feature release.

One embodiment provides interoperability and leverages investments in identity management ("IDM") functionality in the cloud and on-premise. The embodiment provides automated identity synchronization from on-premise Lightweight Directory Access Protocol ("LDAP") data to cloud data and vice versa. The embodiment provides a SCIM identity bus between the cloud and the enterprise, and allows for different options for hybrid cloud deployments (e.g., identity federation and/or synchronization, SSO agents, user provisioning connectors, etc.).

Accordingly, one embodiment is a system that implements a number of microservices in a stateless middle tier to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement tokens that are consumed by a routing tier to enforce a security model for accessing the microservices. Accordingly, embodiments provide a cloud-scale IAM platform based on a multi-tenant, microservices architecture.

Generally, known systems provide siloed access to applications provided by different environments, e.g., enterprise cloud applications, partner cloud applications, third-party cloud applications, and customer applications. Such siloed access may require multiple passwords, different password policies, different account provisioning and de-provisioning schemes, disparate audit, etc. However, one embodiment implements IDCS to provide unified IAM functionality over such applications. FIG. 1 is a block diagram 100 of an example embodiment with IDCS 118, providing a unified identity platform 126 for onboarding users and applications. The embodiment provides seamless user experience across various applications such as enterprise cloud applications 102, partner cloud applications 104, third-party cloud applications 110, and customer applications 112. Applications 102, 104, 110, 112 may be accessed through different channels, for example, by a mobile phone user 108 via a mobile phone 106, by a desktop computer user 116 via a browser 114, etc. A web browser (commonly referred to as a browser) is a software application for retrieving, presenting, and traversing information resources on the World Wide Web. Examples of web browsers are Mozilla Firefox®, Google Chrome®, Microsoft Internet Explorer®, and Apple Safari®.

IDCS 118 provides a unified view 124 of a user's applications, a unified secure credential across devices and applications (via identity platform 126), and a unified way of administration (via an admin console 122). IDCS services may be obtained by calling IDCS APIs 142. Such services may include, for example, login/SSO services 128 (e.g., OpenID Connect), federation services 130 (e.g., SAML), token services 132 (e.g., OAuth), directory services 134 (e.g., SCIM), provisioning services 136 (e.g., SCIM or Any Transport over Multiprotocol ("AToM")), event services 138 (e.g., REST), and authorization services 140 (e.g., SCIM). IDCS 118 may further provide reports and dashboards 120 related to the offered services.

Integration Tools

Generally, it is common for large corporations to have an IAM system in place to secure access to their on-premise applications. Business practices are usually matured and standardized around an in-house IAM system such as "Oracle IAM Suite" from Oracle Corp. Even small to medium organizations usually have their business processes designed around managing user access through a simple directory solution such as Microsoft Active Directory ("AD"). To enable on-premise integration, embodiments provide tools that allow customers to integrate their applications with IDCS.

Figure 2:
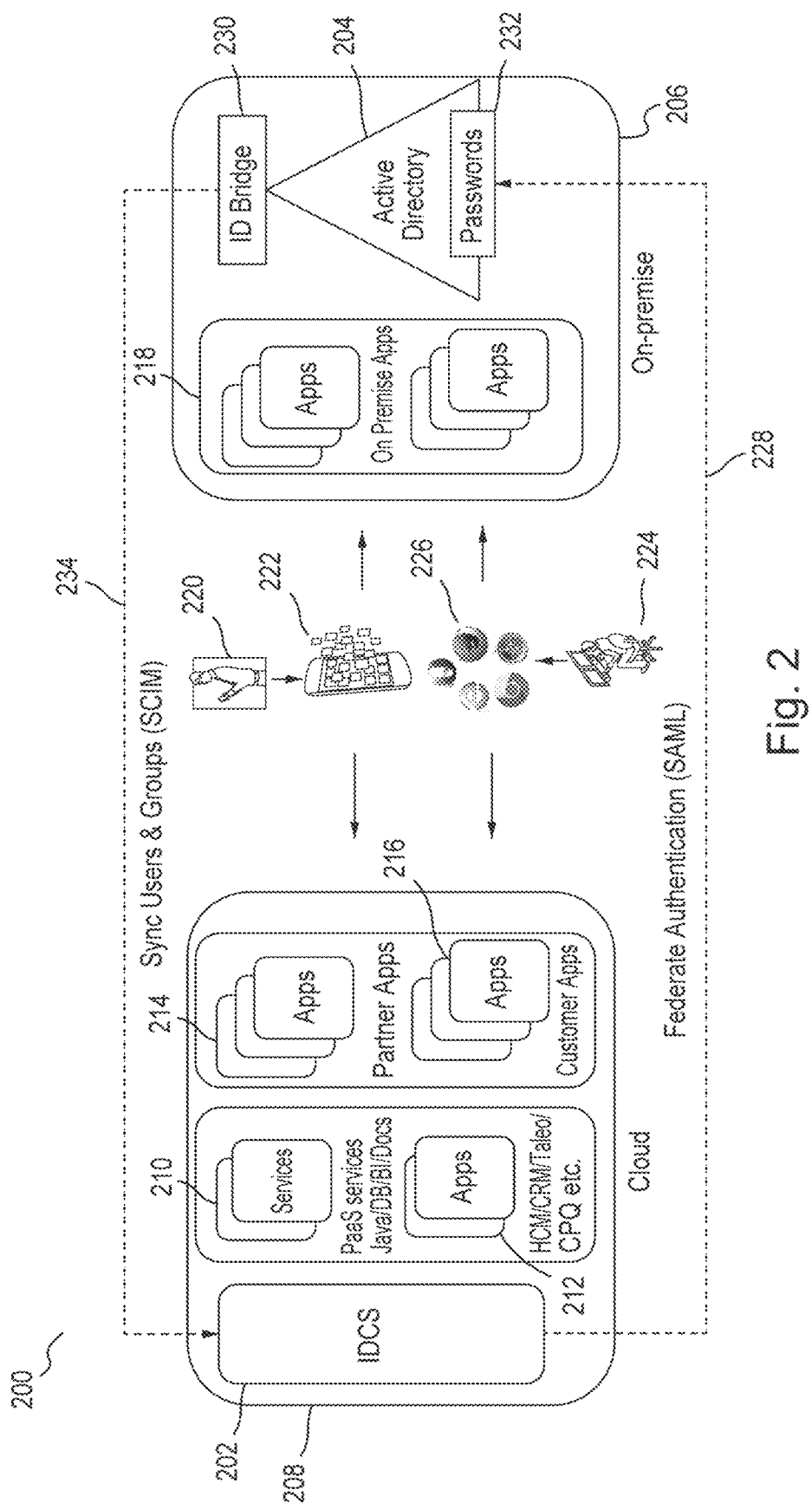

FIG. 2 is a block diagram 200 of an example embodiment with IDCS 202 in a cloud environment 208, providing integration with an AD 204 that is on-premise 206. The embodiment provides seamless user experience across all applications including on-premise and third-party applications, for example, on-premise applications 218 and various applications/services in cloud 208 such as cloud services 210, cloud applications 212, partner applications 214, and customer applications 216. Cloud applications 212 may include, for example, Human Capital Management ("HCM"), CRM, talent acquisition (e.g., Oracle Taleo cloud service from Oracle Corp.), Configure Price and Quote ("CPQ"), etc. Cloud services 210 may include, for example, Platform as a Service ("PaaS"), Java, database, business intelligence ("BI"), documents, etc.

Applications 210, 212, 214, 216, 218, may be accessed through different channels, for example, by a mobile phone user 220 via a mobile phone 222, by a desktop computer user 224 via a browser 226, etc. The embodiment provides automated identity synchronization from on-premise AD data to cloud data via a SCIM identity bus 234 between cloud 208 and the enterprise 206. The embodiment further provides a SAML bus 228 for federating authentication from cloud 208 to on-premise AD 204 (e.g., using passwords 232).

Generally, an identity bus is a service bus for identity related services. A service bus provides a platform for communicating messages from one system to another system. It is a controlled mechanism for exchanging information between trusted systems, for example, in a service oriented architecture ("SOA"). An identity bus is a logical bus built according to standard HTTP based mechanisms such as web service, web server proxies, etc. The communication in an identity bus may be performed according to a respective protocol (e.g., SCIM, SAML, Open ID Connect, etc.). For example, a SAML bus is an HTTP based connection between two systems for communicating messages for SAML services. Similarly, a SCIM bus is used to communicate SCIM messages according to the SCIM protocol.

The embodiment of FIG. 2 implements an identity ("ID") bridge 230 that is a small binary (e.g., 1 MB in size) that can be downloaded and installed on-premise 206 alongside a customer's AD 204. ID Bridge 230 listens to users and groups (e.g., groups of users) from the organizational units ("OUs") chosen by the customer and synchronizes those users to cloud 208. In one embodiment, users' passwords 232 are not synchronized to cloud 208. Customers can manage application access for users by mapping IDCS users' groups to cloud applications managed in IDCS 208. Whenever the users' group membership is changed on-premise 206, their corresponding cloud application access changes automatically.

For example, an employee moving from engineering to sales can get near instantaneous access to the sales cloud and lose access to the developer cloud. When this change is reflected in on-premise AD 204, cloud application access change is accomplished in near-real-time. Similarly, access to cloud applications managed in IDCS 208 is revoked for users leaving the company. For full automation, customers may set up SSO between on-premise AD 204 and IDCS 208 through, e.g., AD federation service ("AD/FS", or some other mechanism that implements SAML federation) so that end users can get access to cloud applications 210, 212, 214, 216, and on-premise applications 218 with a single corporate password 332.

Figure 3:
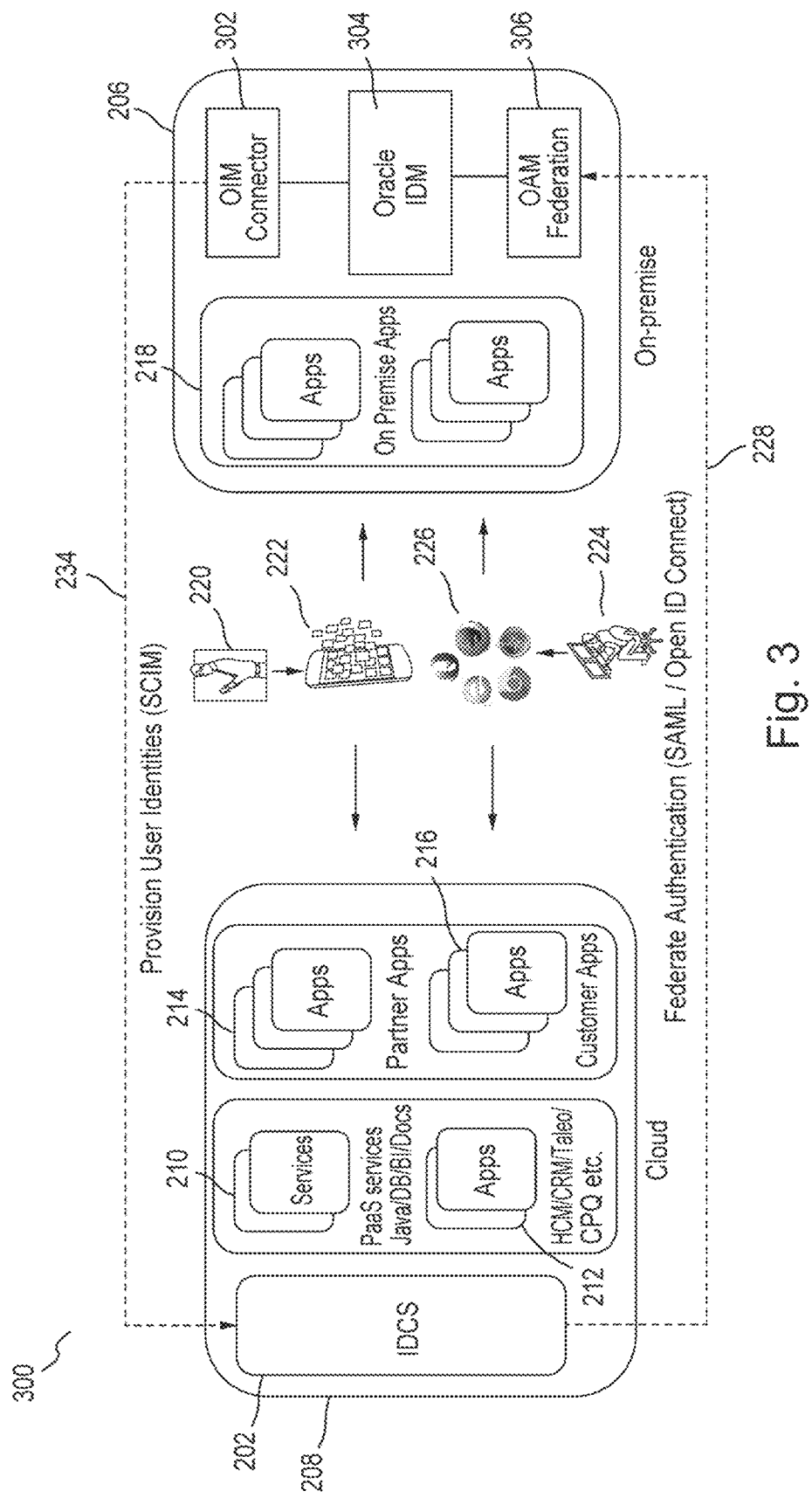

FIG. 3 is a block diagram 300 of an example embodiment that includes the same components 202, 206, 208, 210, 212, 214, 216, 218, 220, 222, 224, 226, 228, 234 as in FIG. 2. However, in the embodiment of FIG. 3, IDCS 202 provides integration with an on-premise IDM 304 such as Oracle IDM. Oracle IDM 304 is a software suite from Oracle Corp. for providing IAM functionality. The embodiment provides seamless user experience across all applications including on-premise and third-party applications. The embodiment provisions user identities from on-premise IDM 304 to IDCS 208 via SCIM identity bus 234 between cloud 202 and enterprise 206. The embodiment further provides SAML bus 228 (or an Open ID Connect bus) for federating authentication from cloud 208 to on-premise 206.

In the embodiment of FIG. 3, an Oracle Identity Manager ("OIM") Connector 302 from Oracle Corp., and an Oracle Access Manager ("OAM") federation module 306 from Oracle Corp., are implemented as extension modules of Oracle IDM 304. A connector is a module that has physical awareness about how to talk to a system. OIM is an application configured to manage user identities (e.g., manage user accounts in different systems based on what a user should and should not have access to). OAM is a security application that provides access management functionality such as web SSO; identity context, authentication and authorization; policy administration; testing; logging; auditing; etc. OAM has built-in support for SAML. If a user has an account in IDCS 202, OIM connector 302 and OAM federation 306 can be used with Oracle IDM 304 to create/delete that account and manage access from that account.

Figure 4:
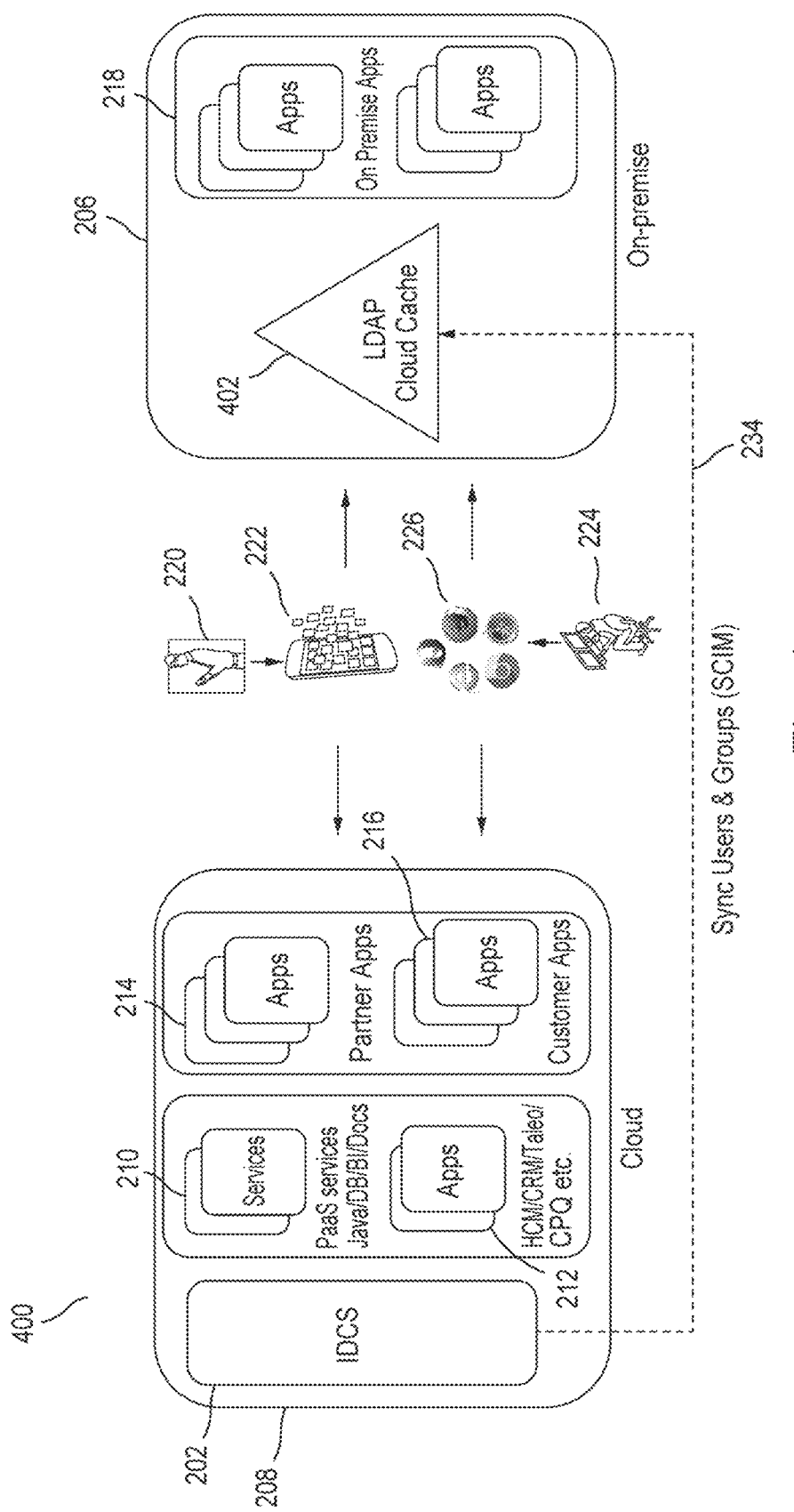

FIG. 4 is a block diagram 400 of an example embodiment that includes the same components 202, 206, 208, 210, 212, 214, 216, 218, 220, 222, 224, 226, 234 as in FIGS. 2 and 3. However, in the embodiment of FIG. 3, IDCS 202 provides functionality to extend cloud identities to on-premise applications 218. The embodiment provides seamless view of the identity across all applications including on-premise and third-party applications. In the embodiment of FIG. 4, SCIM identity bus 234 is used to synchronize data in IDCS 202 with on-premise LDAP data called "Cloud Cache" 402. Cloud Cache 402 is disclosed in more detail below.

Generally, an application that is configured to communicate based on LDAP needs an LDAP connection. An LDAP connection may not be established by such application through a URL (unlike, e.g., "www.google.com" that makes a connection to Google) since the LDAP needs to be on a local network. In the embodiment of FIG. 4, an LDAP-based application 218 makes a connection to Cloud Cache 402, and Cloud Cache 402 establishes a connection to IDCS 202 and then pulls data from IDCS 202 as it is being requested. The communication between IDCS 202 and Cloud Cache 402 may be implemented according to the SCIM protocol. For example, Cloud Cache 402 may use SCIM bus 234 to send a SCIM request to IDCS 202 and receive corresponding data in return.

Generally, fully implementing an application includes building a consumer portal, running marketing campaigns on the external user population, supporting web and mobile channels, and dealing with user authentication, sessions, user profiles, user groups, application roles, password policies, self-service/registration, social integration, identity federation, etc. Generally, application developers are not identity/security experts. Therefore, on-demand identity management services are desired.

Figure 5:
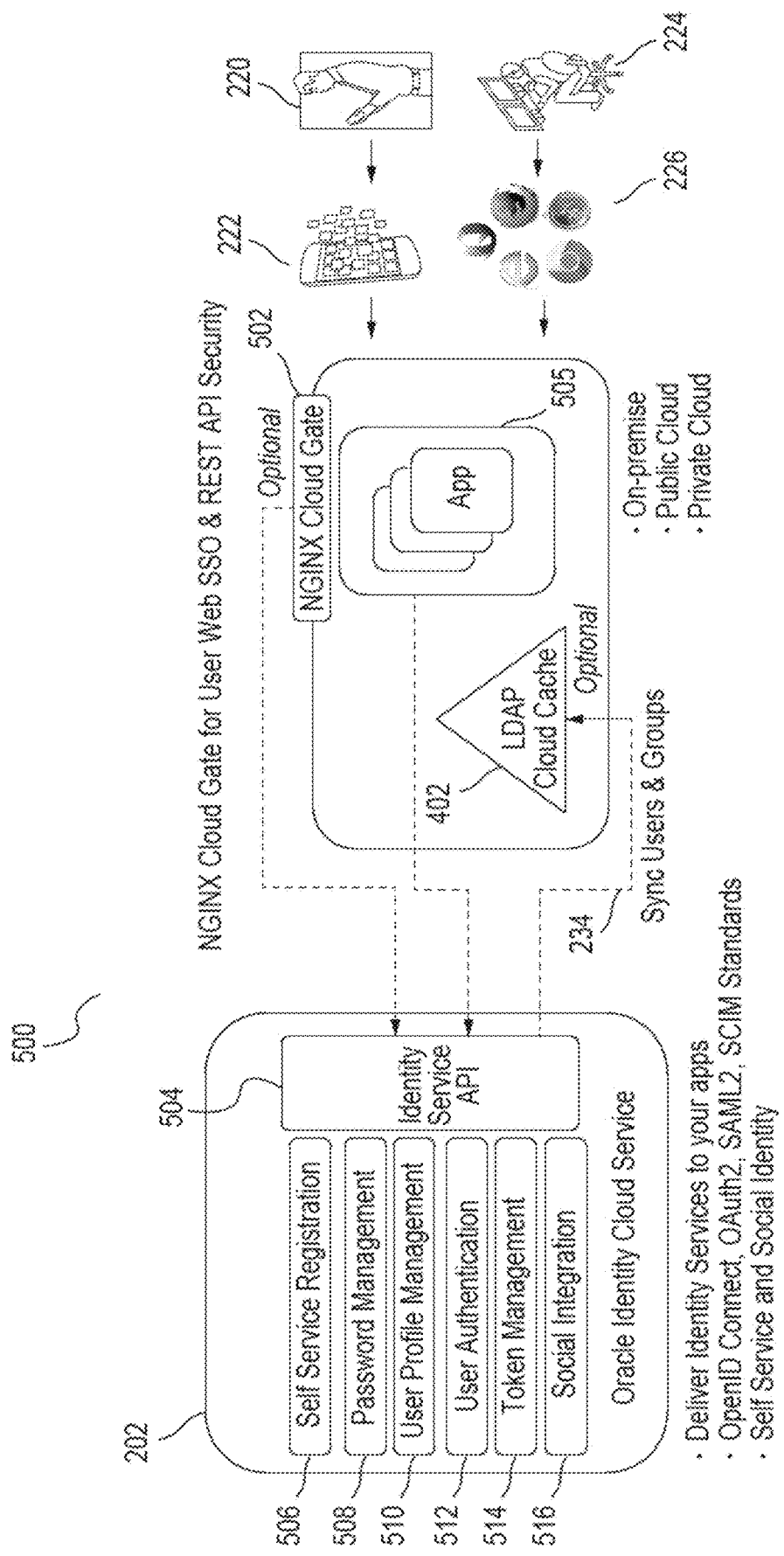

FIG. 5 is a block diagram 500 of an example embodiment that includes the same components 202, 220, 222, 224, 226, 234, 402, as in FIGS. 2-4. However, in the embodiment of FIG. 5, IDCS 202 provides secure identity management on demand. The embodiment provides on demand integration with identity services of IDCS 202 (e.g., based on standards such as OpenID Connect, OAuth2, SAML2, or SCIM). Applications 505 (which may be on-premise, in a public cloud, or in a private cloud) may call identity service APIs 504 in IDCS 202. The services provided by IDCS 202 may include, for example, self-service registration 506, password management 508, user profile management 510, user authentication 512, token management 514, social integration 516, etc.

In this embodiment, SCIM identity bus 234 is used to synchronize data in IDCS 202 with data in on-premise LDAP Cloud Cache 402. Further, a "Cloud Gate" 502 running on a web server/proxy (e.g., NGINX, Apache, etc.) may be used by applications 505 to obtain user web SSO and REST API security from IDCS 202. Cloud Gate 502 is a component that secures access to multi-tenant IDCS microservices by ensuring that client applications provide valid access tokens, and/or users successfully authenticate in order to establish SSO sessions. Cloud Gate 502 is further disclosed below. Cloud Gate 502 (enforcement point similar to webgate/webagent) enables applications running behind supported web servers to participate in SSO.

One embodiment provides SSO and cloud SSO functionality. A general point of entry for both on-premise IAM and IDCS in many organizations is SSO. Cloud SSO enables users to access multiple cloud resources with a single user sign-in. Often, organizations will want to federate their on-premise identities. Accordingly, embodiments utilize open standards to allow for integration with existing SSO to preserve and extend investment (e.g., until a complete, eventual transition to an identity cloud service approach is made).

One embodiment may provide the following functionalities:
- maintain an identity store to track user accounts, ownership, access, and permissions that have been authorized,
- integrate with workflow to facilitate various approvals (e.g., management, IT, human resources, legal, and compliance) needed for applications access,
- provision SaaS user accounts for selective devices (e.g., mobile and personal computer ("PC")) with access to user portal containing many private and public cloud resources, and
- facilitate periodic management attestation review for compliance with regulations and current job responsibilities.

In addition to these functions, embodiments may further provide:
- cloud account provisioning to manage account life cycle in cloud applications,
- more robust multifactor authentication ("MFA") integration,
- extensive mobile security capabilities, and
- dynamic authentication options.

One embodiment provides adaptive authentication and MFA. Generally, passwords and challenge questions have been seen as inadequate and susceptible to common attacks such as phishing. Most business entities today are looking at some form of MFA to reduce risk. To be successfully deployed, however, solutions need to be easily provisioned, maintained, and understood by the end user, as end users usually resist anything that interferes with their digital experience. Companies are looking for ways to securely incorporate bring your own device ("BYOD"), social identities, remote users, customers, and contractors, while making MFA an almost transparent component of a seamless user access experience. Within an MFA deployment, industry standards such as OAuth and OpenID Connect are essential to ensure integration of existing multifactor solutions and the incorporation of newer, adaptive authentication technology. Accordingly, embodiments define dynamic (or adaptive) authentication as the evaluation of available information (i.e., IP address, location, time of day, and biometrics) to prove an identity after a user session has been initiated. With the appropriate standards (e.g., open authentication ("OATH") and fast identity online ("FIDO")) integration and extensible identity management framework, embodiments provide MFA solutions that can be adopted, upgraded, and integrated easily within an IT organization as part of an end-to-end secure IAM deployment. When considering MFA and adaptive policies, organizations must implement consistent policies across on-premise and cloud resources, which in a hybrid IDCS and on-premise IAM environment requires integration between systems.

One embodiment provides user provisioning and certification. Generally, the fundamental function of an IAM solution is to enable and support the entire user provisioning life cycle. This includes providing users with the application access appropriate for their identity and role within the organization, certifying that they have the correct ongoing access permissions (e.g., as their role or the tasks or applications used within their role change over time), and promptly de-provisioning them as their departure from the organization may require. This is important not only for meeting various compliance requirements but also because inappropriate insider access is a major source of security breaches and attacks. An automated user provisioning capability within an identity cloud solution can be important not only in its own right but also as part of a hybrid IAM solution whereby IDCS provisioning may provide greater flexibility than an on-premise solution for transitions as a company downsizes, upsizes, merges, or looks to integrate existing systems with IaaS/PaaS/SaaS environments. An IDCS approach can save time and effort in one-off upgrades and ensure appropriate integration among necessary departments, divisions, and systems. The need to scale this technology often sneaks up on corporations, and the ability to deliver a scalable IDCS capability immediately across the enterprise can provide benefits in flexibility, cost, and control.

Generally, an employee is granted additional privileges (i.e., "privilege creep") over the years as her/his job changes. Companies that are lightly regulated generally lack an "attestation" process that requires managers to regularly audit their employees' privileges (e.g., access to networks, servers, applications, and data) to halt or slow the privilege creep that results in over-privileged accounts. Accordingly, one embodiment may provide a regularly conducted (at least once a year) attestation process. Further, with mergers and acquisitions, the need for these tools and services increases exponentially as users are on SaaS systems, on-premise, span different departments, and/or are being de-provisioned or re-allocated. The move to cloud can further complicate this situation, and the process can quickly escalate beyond existing, often manually managed, certification methods. Accordingly, one embodiment automates these functions and applies sophisticated analytics to user profiles, access history, provisioning/de-provisioning, and fine-grained entitlements.

One embodiment provides identity analytics. Generally, the ability to integrate identity analytics with the IAM engine for comprehensive certification and attestation can be critical to securing an organization's risk profile. Properly deployed identity analytics can demand total internal policy enforcement. Identity analytics that provide a unified single management view across cloud and on-premise are much needed in a proactive governance, risk, and compliance ("GRC") enterprise environment, and can aid in providing a closed-loop process for reducing risk and meeting compliance regulations. Accordingly, one embodiment provides identity analytics that are easily customizable by the client to accommodate specific industry demands and government regulations for reports and analysis required by managers, executives, and auditors.

One embodiment provides self-service and access request functionality to improve the experience and efficiency of the end user and to reduce costs from help desk calls. Generally, while a number of companies deploy on-premise self-service access request for their employees, many have not extended these systems adequately outside the formal corporate walls. Beyond employee use, a positive digital customer experience increases business credibility and ultimately contributes to revenue increase, and companies not only save on customer help desk calls and costs but also improve customer satisfaction. Accordingly, one embodiment provides an identity cloud service environment that is based on open standards and seamlessly integrates with existing access control software and MFA mechanisms when necessary. The SaaS delivery model saves time and effort formerly devoted to systems upgrades and maintenance, freeing professional IT staff to focus on more core business applications.

One embodiment provides privileged account management ("PAM"). Generally, every organization, whether using SaaS, PaaS, IaaS, or on-premise applications, is vulnerable to unauthorized privileged account abuse by insiders with super-user access credentials such as system administrators, executives, HR officers, contractors, systems integrators, etc. Moreover, outside threats typically first breach a low-level user account to eventually reach and exploit privileged user access controls within the enterprise system. Accordingly, one embodiment provides PAM to prevent such unauthorized insider account use. The main component of a PAM solution is a password vault which may be delivered in various ways, e.g., as software to be installed on an enterprise server, as a virtual appliance also on an enterprise server, as a packaged hardware/software appliance, or as part of a cloud service. PAM functionality is similar to a physical safe used to store passwords kept in an envelope and changed periodically, with a manifest for signing them in and out. One embodiment allows for a password checkout as well as setting time limits, forcing periodic changes, automatically tracking checkout, and reporting on all activities. One embodiment provides a way to connect directly through to a requested resource without the user ever knowing the password. This capability also paves the way for session management and additional functionality.

Generally, most cloud services utilize APIs and administrative interfaces, which provide opportunities for infiltrators to circumvent security. Accordingly, one embodiment accounts for these holes in PAM practices as the move to the cloud presents new challenges for PAM. Many small to medium sized businesses now administer their own SaaS systems (e.g., Office 365), while larger companies increasingly have individual business units spinning up their own SaaS and IaaS services. These customers find themselves with PAM capabilities within the identity cloud service solutions or from their IaaS/PaaS provider but with little experience in handling this responsibility. Moreover, in some cases, many different geographically dispersed business units are trying to segregate administrative responsibilities for the same SaaS applications. Accordingly, one embodiment allows customers in these situations to link existing PAM into the overall identity framework of the identity cloud service and move toward greater security and compliance with the assurance of scaling to cloud load requirements as business needs dictate.

API Platform

Embodiments provide an API platform that exposes a collection of capabilities as services. The APIs are aggregated into microservices and each microservice exposes one or more of the APIs. That is, each microservice may expose different types of APIs. In one embodiment, each microservice communicates only through its APIs. In one embodiment, each API may be a microservice. In one embodiment, multiple APIs are aggregated into a service based on a target capability to be provided by that service (e.g., OAuth, SAML, Admin, etc.). As a result, similar APIs are not exposed as separate runtime processes. The APIs are what is made available to a service consumer to use the services provided by IDCS.

Generally, in the web environment of IDCS, a URL includes three parts: a host, a microservice, and a resource (e.g., host/microservice/resource). In one embodiment, the microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

Configuring applications that integrate with external services with the necessary endpoints and keeping that configuration up to date is typically a challenge. To meet this challenge, embodiments expose a public discovery API at a well-known location from where applications can discover the information about IDCS they need in order to consume IDCS APIs. In one embodiment, two discovery documents are supported: IDCS Configuration (which includes IDCS, SAML, SCIM, OAuth, and OpenID Connect configuration, at e.g., <IDCS-URL>/.well-known/idcs-configuration), and Industry-standard OpenID Connect Configuration (at, e.g., <IDCS-URL>/.well-known/openid-configuration). Applications can retrieve discovery documents by being configured with a single IDCS URL.

Figure 6:
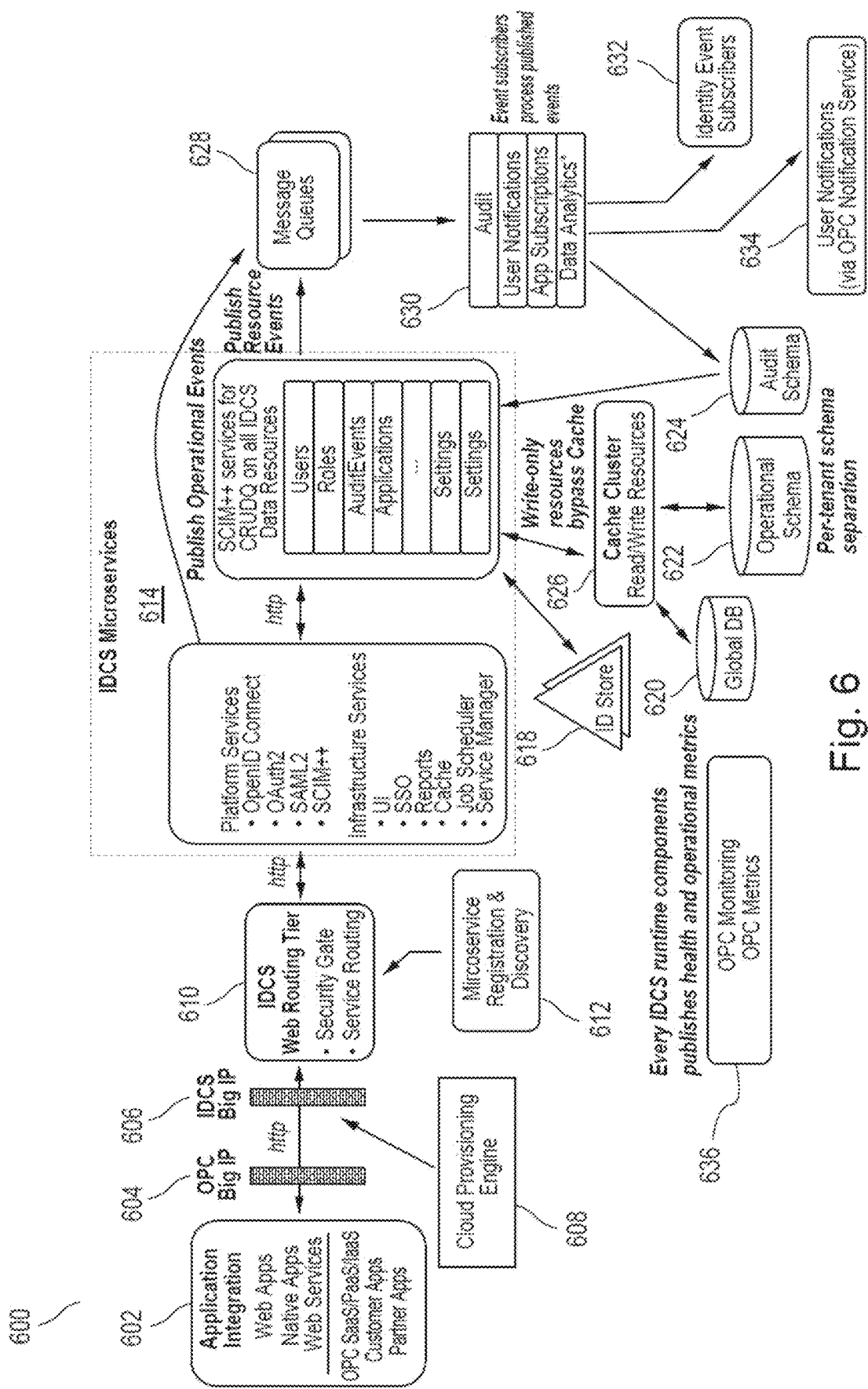
FIG. 6 is a block diagram providing a system view of an embodiment.

FIG. 6 is a block diagram providing a system view 600 of IDCS in one embodiment. In FIG. 6, any one of a variety of applications/services 602 may make HTTP calls to IDCS APIs to use IDCS services. Examples of such applications/services 602 are web applications, native applications (e.g., applications that are built to run on a specific operating system, such as Windows applications, iOS applications, Android applications, etc.), web services, customer applications, partner applications, or any services provided by a public cloud, such as Software as a Service ("SaaS"), PaaS, and Infrastructure as a Service ("IaaS").

In one embodiment, the HTTP requests of applications/services 602 that require IDCS services go through an Oracle Public Cloud BIG-IP appliance 604 and an IDCS BIG-IP appliance 606 (or similar technologies such as a Load Balancer, or a component called a Cloud Load Balancer as a Service ("LBaaS") that implements appropriate security rules to protect the traffic). However, the requests can be received in any manner. At IDCS BIG-IP appliance 606 (or, as applicable, a similar technology such as a Load Balancer or a Cloud LBaaS), a cloud provisioning engine 608 performs tenant and service orchestration. In one embodiment, cloud provisioning engine 608 manages internal security artifacts associated with a new tenant being on-boarded into the cloud or a new service instance purchased by a customer.

The HTTP requests are then received by an IDCS web routing tier 610 that implements a security gate (i.e., Cloud Gate) and provides service routing and microservices registration and discovery 612. Depending on the service requested, the HTTP request is forwarded to an IDCS microservice in the IDCS middle tier 614. IDCS microservices process external and internal HTTP requests. IDCS microservices implement platform services and infrastructure services. IDCS platform services are separately deployed Java-based runtime services implementing the business of IDCS. IDCS infrastructure services are separately deployed runtime services providing infrastructure support for IDCS. IDCS further includes infrastructure libraries that are common code packaged as shared libraries used by IDCS services and shared libraries. Infrastructure services and libraries provide supporting capabilities as required by platform services for implementing their functionality.

Platform Services

In one embodiment, IDCS supports standard authentication protocols, hence IDCS microservices include platform services such as OpenID Connect, OAuth, SAML2, System for Cross-domain Identity Management++("SCIM++"), etc.

The Open ID Connect platform service implements standard Open ID Connect Login/Logout flows. Interactive web-based and native applications leverage standard browser-based Open ID Connect flow to request user authentication, receiving standard identity tokens that are JavaScript Object Notation ("JSON") Web Tokens ("JWTs") conveying the user's authenticated identity. Internally, the runtime authentication model is stateless, maintaining the user's authentication/session state in the form of a host HTTP cookie (including the JWT identity token). The authentication interaction initiated via the Open ID Connect protocol is delegated to a trusted SSO service that implements the user login/logout ceremonies for local and federated logins. Further details of this functionality are disclosed below with reference to FIGS. 10 and 11. In one embodiment, Open ID Connect functionality is implemented according to, for example, OpenID Foundation standards.

The OAuth2 platform service provides token authorization services. It provides a rich API infrastructure for creating and validating access tokens conveying user rights to make API calls. It supports a range of useful token grant types, enabling customers to securely connect clients to their services. It implements standard 2-legged and 3-legged OAuth2 token grant types. Support for OpenID Connect ("OIDC") enables compliant applications (OIDC relaying parties ("RP"s)) to integrate with IDCS as the identity provider (OIDC OpenID provider ("OP")). Similarly, the integration of IDCS as OIDC RP with social OIDC OP (e.g., Facebook, Google, etc.) enables customers to allow social identities policy-based access to applications. In one embodiment, OAuth functionality is implemented according to, for example, Internet Engineering Task Force ("IETF"), Request for Comments ("RFC") 6749.

The SAML2 platform service provides identity federation services. It enables customers to set up federation agreements with their partners based on SAML identity provider ("IDP") and SAML service provider ("SP") relationship models. In one embodiment, the SAML2 platform service implements standard SAML2 Browser POST Login and Logout Profiles. In one embodiment, SAML functionality is implemented according to, for example, IETF, RFC 7522.

SCIM is an open standard for automating the exchange of user identity information between identity domains or information technology ("IT") systems, as provided by, e.g., IETF, RFCs 7642, 7643, 7644. The SCIM++ platform service provides identity administration services and enables customers to access IDP features of IDCS. The administration services expose a set of stateless REST interfaces (i.e., APIs) that cover identity lifecycle, password management, group management, etc., exposing such artifacts as web-accessible resources.

All IDCS configuration artifacts are resources, and the APIs of the administration services allow for managing IDCS resources (e.g., users, roles, password policies, applications, SAML/OIDC identity providers, SAML service providers, keys, certifications, notification templates, etc.). Administration services leverage and extend the SCIM standard to implement schema-based REST APIs for Create, Read, Update, Delete, and Query ("CRUDQ") operations on all IDCS resources. Additionally, all internal resources of IDCS used for administration and configuration of IDCS itself are exposed as SCIM-based REST APIs. Access to the identity store 618 is isolated to the SCIM++ API.

In one embodiment, for example, the SCIM standard is implemented to manage the users and groups resources as defined by the SCIM specifications, while SCIM++ is configured to support additional IDCS internal resources (e.g., password policies, roles, settings, etc.) using the language defined by the SCIM standard.

The Administration service supports the SCIM 2.0 standard endpoints with the standard SCIM 2.0 core schemas and schema extensions where needed. In addition, the Administration service supports several SCIM 2.0 compliant endpoint extensions to manage other IDCS resources, for example, Users, Groups, Applications, Settings, etc. The Administration service also supports a set of remote procedure call-style ("RPC-style") REST interfaces that do not perform CRUDQ operations but instead provide a functional service, for example, "UserPasswordGenerator," "UserPasswordValidator," etc.

IDCS Administration APIs use the OAuth2 protocol for authentication and authorization. IDCS supports common OAuth2 scenarios such as scenarios for web server, mobile, and JavaScript applications. Access to IDCS APIs is protected by access tokens. To access IDCS Administration APIs, an application needs to be registered as an OAuth2 client or an IDCS Application (in which case the OAuth2 client is created automatically) through the IDCS Administration console and be granted desired IDCS Administration Roles. When making IDCS Administration API calls, the application first requests an access token from the IDCS OAuth2 Service. After acquiring the token, the application sends the access token to the IDCS API by including it in the HTTP authorization header. Applications can use IDCS Administration REST APIs directly, or use an IDCS Java Client API Library.

Infrastructure Services

The IDCS infrastructure services support the functionality of IDCS platform services. These runtime services include an event processing service (for asynchronously processing user notifications, application subscriptions, and auditing to database); a job scheduler service (for scheduling and executing jobs, e.g., executing immediately or at a configured time long-running tasks that do not require user intervention); a cache management service; a storage management service (for integrating with a public cloud storage service); a reports service (for generating reports and dashboards); an SSO service (for managing internal user authentication and SSO); a user interface ("UI") service (for hosting different types of UI clients); and a service manager service. Service manager is an internal interface between the Oracle Public Cloud and IDCS. Service manager manages commands issued by the Oracle Public Cloud, where the commands need to be implemented by IDCS. For example, when a customer signs up for an account in a cloud store before they can buy something, the cloud sends a request to IDCS asking to create a tenant. In this case, service manager implements the cloud specific operations that the cloud expects IDCS to support.

An IDCS microservice may call another IDCS microservice through a network interface (i.e., an HTTP request).

In one embodiment, IDCS may also provide a schema service (or a persistence service) that allows for using a database schema. A schema service allows for delegating the responsibility of managing database schemas to IDCS. Accordingly, a user of IDCS does not need to manage a database since there is an IDCS service that provides that functionality. For example, the user may use the database to persist schemas on a per tenant basis, and when there is no more space in the database, the schema service will manage the functionality of obtaining another database and growing the space so that the users do not have to manage the database themselves.

IDCS further includes data stores which are data repositories required/generated by IDCS, including an identity store 618 (storing users, groups, etc.), a global database 620 (storing configuration data used by IDCS to configure itself), an operational schema 622 (providing per tenant schema separation and storing customer data on a per customer basis), an audit schema 624 (storing audit data), a caching cluster 626 (storing cached objects to speed up performance), etc. All internal and external IDCS consumers integrate with the identity services over standards-based protocols. This enables use of a domain name system ("DNS") to resolve where to route requests, and decouples consuming applications from understanding the internal implementation of identity services.

Real-Time and Near-Real-Time Tasks

IDCS separates the tasks of a requested service into synchronous real-time and asynchronous near-real-time tasks, where real-time tasks include only the operations that are needed for the user to proceed. In one embodiment, a real-time task is a task that is performed with minimal delay, and a near-real-time task is a task that is performed in the background without the user having to wait for it. In one embodiment, a real-time task is a task that is performed with substantially no delay or with negligible delay, and appears to a user as being performed almost instantaneously.

The real-time tasks perform the main business functionality of a specific identity service. For example, when requesting a login service, an application sends a message to authenticate a user's credentials and get a session cookie in return. What the user experiences is logging into the system. However, several other tasks may be performed in connection with the user's logging in, such as validating who the user is, auditing, sending notifications, etc. Accordingly, validating the credentials is a task that is performed in real-time so that the user is given an HTTP cookie to start a session, but the tasks related to notifications (e.g., sending an email to notify the creation of an account), audits (e.g., tracking/recording), etc., are near-real-time tasks that can be performed asynchronously so that the user can proceed with least delay.

When an HTTP request for a microservice is received, the corresponding real-time tasks are performed by the microservice in the middle tier, and the remaining near-real-time tasks such as operational logic/events that are not necessarily subject to real-time are offloaded to message queues 628 that support a highly scalable asynchronous event management system 630 with guaranteed delivery and processing. Accordingly, certain behaviors are pushed from the front end to the backend to enable IDCS to provide high level service to the customers by reducing latencies in response times. For example, a login process may include validation of credentials, submission of a log report, updating of the last login time, etc., but these tasks can be offloaded to a message queue and performed in near-real-time as opposed to real-time.

In one example, a system may need to register or create a new user. The system calls an IDCS SCIM API to create a user. The end result is that when the user is created in identity store 618, the user gets a notification email including a link to reset their password. When IDCS receives a request to register or create a new user, the corresponding microservice looks at configuration data in the operational database (located in global database 620 in FIG. 6) and determines that the "create user" operation is marked with a "create user" event which is identified in the configuration data as an asynchronous operation. The microservice returns to the client and indicates that the creation of the user is done successfully, but the actual sending of the notification email is postponed and pushed to the backend. In order to do so, the microservice uses a messaging API 616 to queue the message in queue 628 which is a store.

In order to dequeue queue 628, a messaging microservice, which is an infrastructure microservice, continually runs in the background and scans queue 628 looking for events in queue 628. The events in queue 628 are processed by event subscribers 630 such as audit, user notification, application subscriptions, data analytics, etc. Depending on the task indicated by an event, event subscribers 630 may communicate with, for example, audit schema 624, a user notification service 634, an identity event subscriber 632, etc. For example, when the messaging microservice finds the "create user" event in queue 628, it executes the corresponding notification logic and sends the corresponding email to the user.

In one embodiment, queue 628 queues operational events published by microservices 614 as well as resource events published by APIs 616 that manage IDCS resources.

IDCS uses a real-time caching structure to enhance system performance and user experience. The cache itself may also be provided as a microservice. IDCS implements an elastic cache cluster 626 that grows as the number of customers supported by IDCS scales. Cache cluster 626 may be implemented with a distributed data grid which is disclosed in more detail below. In one embodiment, write-only resources bypass cache.

In one embodiment, IDCS runtime components publish health and operational metrics to a public cloud monitoring module 636 that collects such metrics of a public cloud such as Oracle Public Cloud from Oracle Corp.

In one embodiment, IDCS may be used to create a user. For example, a client application 602 may issue a REST API call to create a user. Admin service (a platform service in 614) delegates the call to a user manager (an infrastructure library/service in 614), which in turn creates the user in the tenant-specific ID store stripe in ID store 618. On "User Create Success", the user manager audits the operation to the audit table in audit schema 624, and publishes an "identity.user.create.success" event to message queue 628. Identity subscriber 632 picks up the event and sends a "Welcome" email to the newly created user, including newly created login details.

In one embodiment, IDCS may be used to grant a role to a user, resulting in a user provisioning action. For example, a client application 602 may issue a REST API call to grant a user a role. Admin service (a platform service in 614) delegates the call to a role manager (an infrastructure library/service in 614), who grants the user a role in the tenant-specific ID store stripe in ID store 618. On "Role Grant Success", the role manager audits the operations to the audit table in audit schema 624, and publishes an "identity.user.role.grant.success" event to message queue 628. Identity subscriber 632 picks up the event and evaluates the provisioning grant policy. If there is an active application grant on the role being granted, a provisioning subscriber performs some validation, initiates account creation, calls out the target system, creates an account on the target system, and marks the account creation as successful. Each of these functionalities may result in publishing of corresponding events, such as "prov.account.create.initiate", "prov.target.create.initiate", "prov.target.create.success", or "prov.account.create.success". These events may have their own business metrics aggregating number of accounts created in the target system over the last N days.

In one embodiment, IDCS may be used for a user to log in. For example, a client application 602 may use one of the supported authentication flows to request a login for a user. IDCS authenticates the user, and upon success, audits the operation to the audit table in audit schema 624. Upon failure, IDCS audits the failure in audit schema 624, and publishes "login.user.login.failure" event in message queue 628. A login subscriber picks up the event, updates its metrics for the user, and determines if additional analytics on the user's access history need to be performed.

Accordingly, by implementing "inversion of control" functionality (e.g., changing the flow of execution to schedule the execution of an operation at a later time so that the operation is under the control of another system), embodiments enable additional event queues and subscribers to be added dynamically to test new features on a small user sample before deploying to broader user base, or to process specific events for specific internal or external customers.

Stateless Functionality

IDCS microservices are stateless, meaning the microservices themselves do not maintain state. "State" refers to the data that an application uses in order to perform its capabilities. IDCS provides multi-tenant functionality by persisting all state into tenant specific repositories in the IDCS data tier. The middle tier (i.e., the code that processes the requests) does not have data stored in the same location as the application code. Accordingly, IDCS is highly scalable, both horizontally and vertically.

To scale vertically (or scale up/down) means to add resources to (or remove resources from) a single node in a system, typically involving the addition of CPUs or memory to a single computer. Vertical scalability allows an application to scale up to the limits of its hardware. To scale horizontally (or scale out/in) means to add more nodes to (or remove nodes from) a system, such as adding a new computer to a distributed software application. Horizontal scalability allows an application to scale almost infinitely, bound only by the amount of bandwidth provided by the network.

Stateless-ness of the middle tier of IDCS makes it horizontally scalable just by adding more CPUs, and the IDCS components that perform the work of the application do not need to have a designated physical infrastructure where a particular application is running. Stateless-ness of the IDCS middle tier makes IDCS highly available, even when providing identity services to a very large number of customers/tenants. Each pass through an IDCS application/service is focused on CPU usage only to perform the application transaction itself but not use hardware to store data. Scaling is accomplished by adding more slices when the application is running, while data for the transaction is stored at a persistence layer where more copies can be added when needed.

The IDCS web tier, middle tier, and data tier can each scale independently and separately. The web tier can be scaled to handle more HTTP requests. The middle tier can be scaled to support more service functionality. The data tier can be scaled to support more tenants.

IDCS Functional View

Figure 6A:
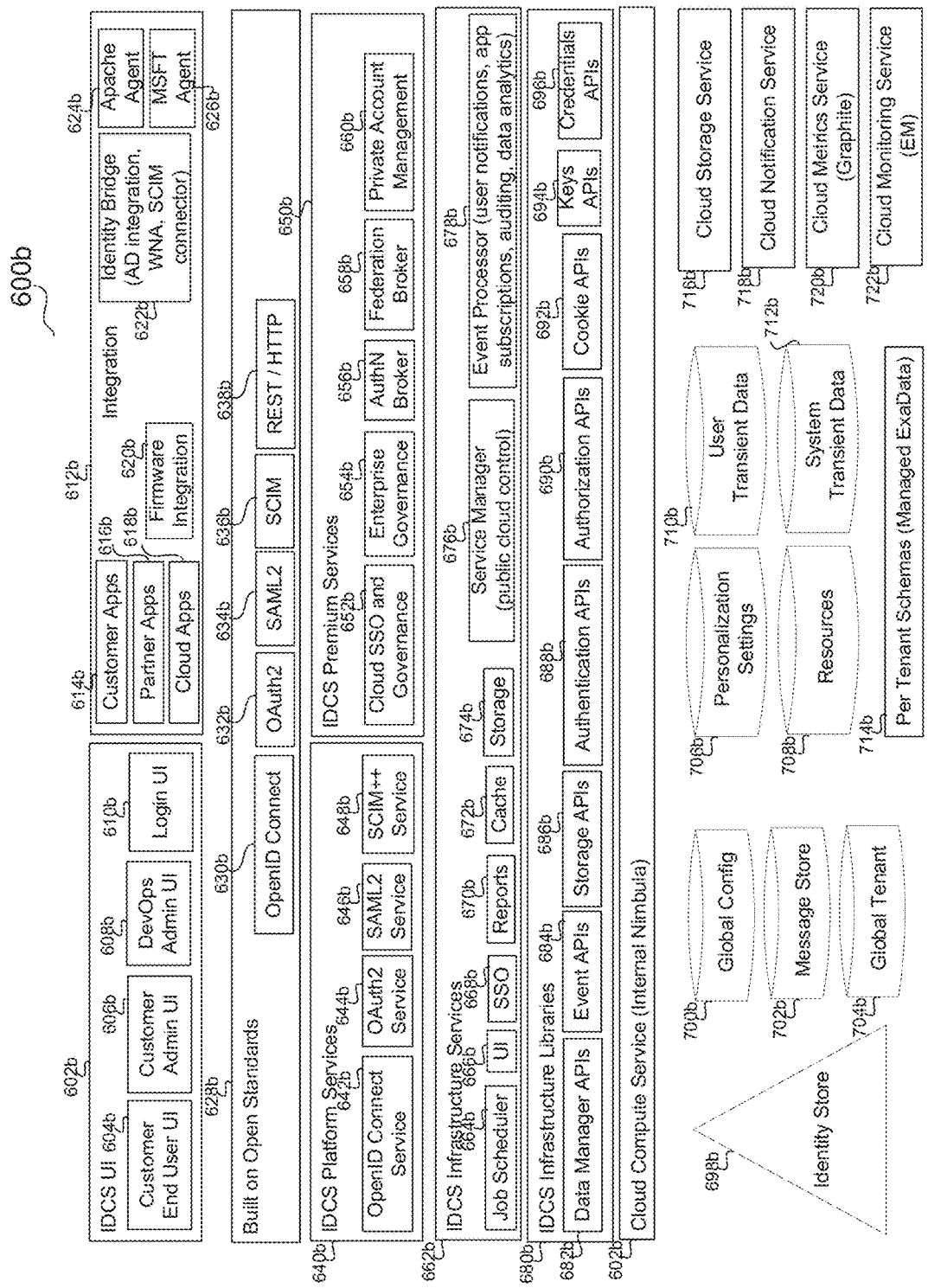
FIG. 6A is a block diagram providing a functional view of an embodiment.

FIG. 6A is an example block diagram 600*b* of a functional view of IDCS in one embodiment. In block diagram 600*b*, the IDCS functional stack includes services, shared libraries, and data stores. The services include IDCS platform services 640*b*, IDCS premium services 650*b*, and IDCS infrastructure services 662*b*. In one embodiment, IDCS platform services 640*b* and IDCS premium services 650*b* are separately deployed Java-based runtime services implementing the business of IDCS, and IDCS infrastructure services 662*b* are separately deployed runtime services providing infrastructure support for IDCS. The shared libraries include IDCS infrastructure libraries 680*b* which are common code packaged as shared libraries used by IDCS services and shared libraries. The data stores are data repositories required/generated by IDCS, including identity store 698*b*, global configuration 700*b*, message store 702*b*, global tenant 704*b*, personalization settings 706*b*, resources 708*b*, user transient data 710*b*, system transient data 712*b*, per-tenant schemas (managed ExaData) 714*b*, operational store (not shown), caching store (not shown), etc.

In one embodiment, IDCS platform services 640*b* include, for example, Open ID Connect service 642*b*, OAuth2 service 644*b*, SAML2 service 646*b*, and SCIM++ service 648*b*. In one embodiment, IDCS premium services include, for example, cloud SSO and governance 652*b*, enterprise governance 654*b*, AuthN broker 656*b*, federation broker 658*b*, and private account management 660*b*.

IDCS infrastructure services 662*b* and IDCS infrastructure libraries 680*b* provide supporting capabilities as required by IDCS platform services 640*b* to do their work. In one embodiment, IDCS infrastructure services 662*b* include job scheduler 664*b*, UI 666*b*, SSO 668*b*, reports 670*b*, cache 672*b*, storage 674*b*, service manager 676*b* (public cloud control), and event processor 678*b* (user notifications, app subscriptions, auditing, data analytics). In one embodiment, IDCS infrastructure libraries 680*b* include data manager APIs 682*b*, event APIs 684*b*, storage APIs 686*b*, authentication APIs 688*b*, authorization APIs 690*b*, cookie APIs 692*b*, keys APIs 694*b*, and credentials APIs 696*b*. In one embodiment, cloud compute service 602*b* (internal Nimbula) supports the function of IDCS infrastructure services 662*b* and IDCS infrastructure libraries 680*b*.

In one embodiment, IDCS provides various UIs 602*b* for a consumer of IDCS services, such as customer end user UI 604*b*, customer admin UI 606*b*, DevOps admin UI 608*b*, and login UI 610*b*. In one embodiment, IDCS allows for integration 612*b* of applications (e.g., customer apps 614*b*, partner apps 616*b*, and cloud apps 618*b*) and firmware integration 620*b*. In one embodiment, various environments may integrate with IDCS to support their access control needs. Such integration may be provided by, for example, identity bridge 622*b* (providing AD integration, WNA, and SCIM connector), Apache agent 624*b*, or MSFT agent 626*b*.

In one embodiment, internal and external IDCS consumers integrate with the identity services of IDCS over standards-based protocols 628*b*, such as OpenID Connect 630*b*, OAuth2 632*b*, SAML2 634*b*, SCIM 636*b*, and REST/HTTP 638b. This enables use of a domain name system ("DNS") to resolve where to route requests, and decouples the consuming applications from understanding internal implementation of the identity services.

The IDCS functional view in FIG. 6A further includes public cloud infrastructure services that provide common functionality that IDCS depends on for user notifications (cloud notification service 718b), file storage (cloud storage service 716b), and metrics/alerting for DevOps (cloud monitoring service (EM) 722b and cloud metrics service (Graphite) 720b).

Cloud Gate

In one embodiment, IDCS implements a "Cloud Gate" in the web tier. Cloud Gate is a web server plugin that enables web applications to externalize user SSO to an identity management system (e.g., IDCS), similar to WebGate or WebAgent technologies that work with enterprise IDM stacks. Cloud Gate acts as a security gatekeeper that secures access to IDCS APIs. In one embodiment, Cloud Gate is implemented by a web/proxy server plugin that provides a web Policy Enforcement Point ("PEP") for protecting HTTP resources based on OAuth.

Figure 7:
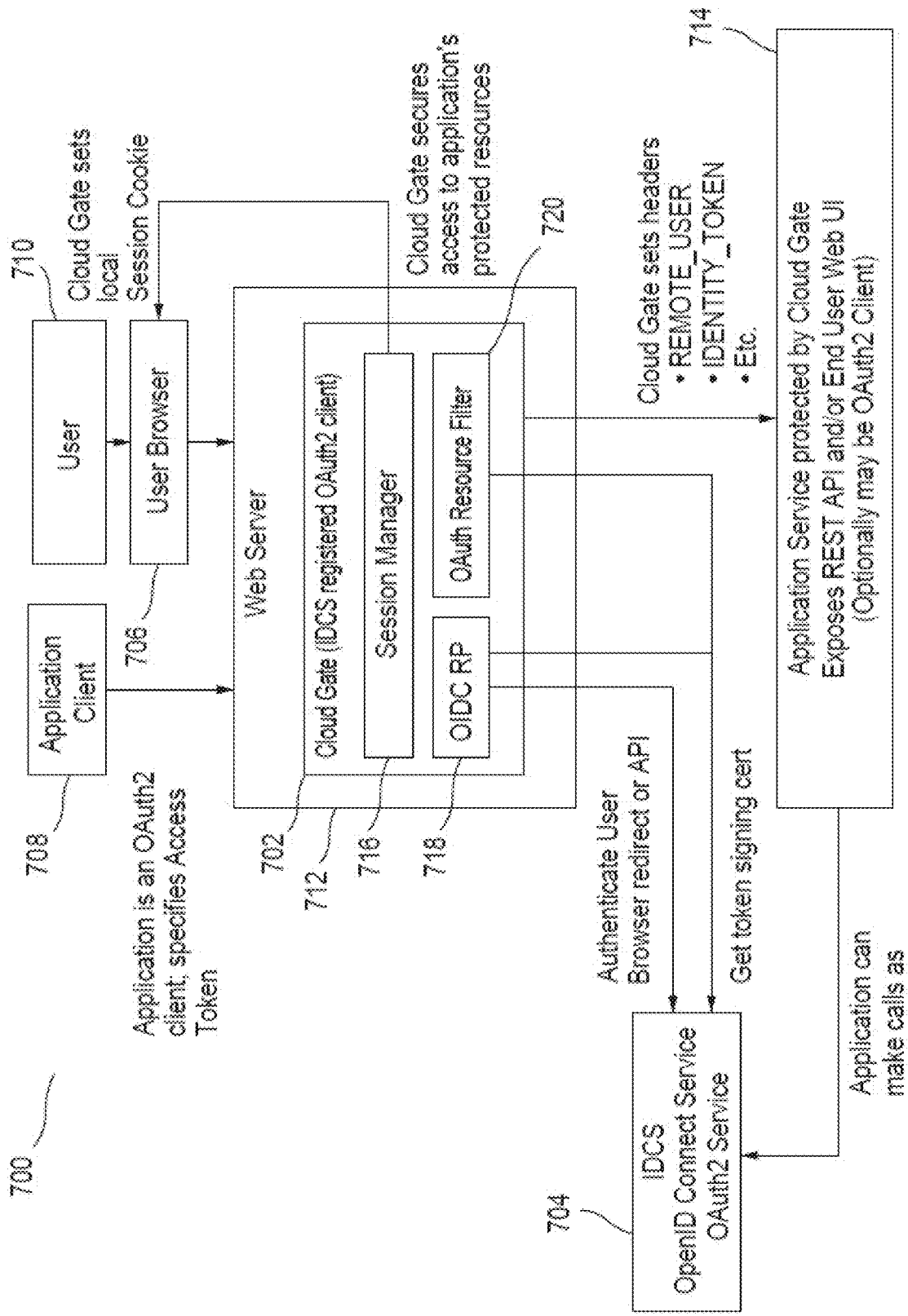
FIG. 7 is a block diagram of an embodiment that implements Cloud Gate.

FIG. 7 is a block diagram 700 of an embodiment that implements a Cloud Gate 702 running in a web server 712 and acting as a Policy Enforcement Point ("PEP") configured to integrate with IDCS Policy Decision Point ("PDP") using open standards (e.g., OAuth2, Open ID Connect, etc.) while securing access to web browser and REST API resources 714 of an application. In some embodiments, the PDP is implemented at OAuth and/or Open ID Connect microservices 704. For example, when a user browser 706 sends a request to IDCS for a login of a user 710, a corresponding IDCS PDP validates the credentials and then decides whether the credentials are sufficient (e.g., whether to request for further credentials such as a second password). In the embodiment of FIG. 7, Cloud Gate 702 may act both as the PEP and as the PDP since it has a local policy.

As part of one-time deployment, Cloud Gate 702 is registered with IDCS as an OAuth2 client, enabling it to request OIDC and OAuth2 operations against IDCS. Thereafter, it maintains configuration information about an application's protected and unprotected resources, subject to request matching rules (how to match URLs, e.g., with wild cards, regular expressions, etc.). Cloud Gate 702 can be deployed to protect different applications having different security policies, and the protected applications can be multi-tenant.

During web browser-based user access, Cloud Gate 702 acts as an OIDC RP 718 initiating a user authentication flow. If user 710 has no valid local user session, Cloud Gate 702 re-directs the user to the SSO microservice and participates in the OIDC "Authorization Code" flow with the SSO microservice. The flow concludes with the delivery of a JWT as an identity token. Cloud Gate 708 validates the JWT (e.g., looks at signature, expiration, destination/audience, etc.) and issues a local session cookie for user 710. It acts as a session manager 716 securing web browser access to protected resources and issuing, updating, and validating the local session cookie. It also provides a logout URL for removal of its local session cookie.

Cloud Gate 702 also acts as an HTTP Basic Auth authenticator, validating HTTP Basic Auth credentials against IDCS. This behavior is supported in both session-less and session-based (local session cookie) modes. No server-side IDCS session is created in this case.

During programmatic access by REST API clients 708, Cloud Gate 702 may act as an OAuth2 resource server/filter 720 for an application's protected REST APIs 714. It checks for the presence of a request with an authorization header and an access token. When client 708 (e.g., mobile, web apps, JavaScript, etc.) presents an access token (issued by IDCS) to use with a protected REST API 714, Cloud Gate 702 validates the access token before allowing access to the API (e.g., signature, expiration, audience, etc.). The original access token is passed along unmodified.

Generally, OAuth is used to generate either a client identity propagation token (e.g., indicating who the client is) or a user identity propagation token (e.g., indicating who the user is). In the embodiments, the implementation of OAuth in Cloud Gate is based on a JWT which defines a format for web tokens, as provided by, e.g., IETF, RFC 7519.

When a user logs in, a JWT is issued. The JWT is signed by IDCS and supports multi-tenant functionality in IDCS. Cloud Gate validates the JWT issued by IDCS to allow for multi-tenant functionality in IDCS. Accordingly, IDCS provides multi-tenancy in the physical structure as well as in the logical business process that underpins the security model.

Tenancy Types

IDCS specifies three types of tenancies: customer tenancy, client tenancy, and user tenancy. Customer or resource tenancy specifies who the customer of IDCS is (i.e., for whom is the work being performed). Client tenancy specifies which client application is trying to access data (i.e., what application is doing the work). User tenancy specifies which user is using the application to access data (i.e., by whom is the work being performed). For example, when a professional services company provides system integration functionality for a warehouse club and uses IDCS for providing identity management for the warehouse club systems, user tenancy corresponds to the professional services company, client tenancy is the application that is used to provide system integration functionality, and customer tenancy is the warehouse club.

Separation and identification of these three tenancies enables multi-tenant functionality in a cloud-based service. Generally, for on-premise software that is installed on a physical machine on-premise, there is no need to specify three different tenancies since a user needs to be physically on the machine to log in. However, in a cloud-based service structure, embodiments use tokens to determine who is using what application to access which resources. The three tenancies are codified by tokens, enforced by Cloud Gate, and used by the business services in the middle tier. In one embodiment, an OAuth server generates the tokens. In various embodiments, the tokens may be used in conjunction with any security protocol other than OAuth.

Decoupling user, client, and resource tenancies provides substantial business advantages for the users of the services provided by IDCS. For example, it allows a service provider that understands the needs of a business (e.g., a healthcare business) and their identity management problems to buy services provided by IDCS, develop their own backend application that consumes the services of IDCS, and provide the backend applications to the target businesses. Accordingly, the service provider may extend the services of IDCS to provide their desired capabilities and offer those to certain target businesses. The service provider does not have to build and run software to provide identity services but can instead extend and customize the services of IDCS to suit the needs of the target businesses.

Some known systems only account for a single tenancy which is customer tenancy. However, such systems are inadequate when dealing with access by a combination of users such as customer users, customer's partners, customer's clients, clients themselves, or clients that customer has delegated access to. Defining and enforcing multiple tenancies in the embodiments facilitates the identity management functionality over such variety of users.

In one embodiment, one entity of IDCS does not belong to multiple tenants at the same time; it belongs to only one tenant, and a "tenancy" is where artifacts live. Generally, there are multiple components that implement certain functions, and these components can belong to tenants or they can belong to infrastructure. When infrastructure needs to act on behalf of tenants, it interacts with an entity service on behalf of the tenant. In that case, infrastructure itself has its own tenancy and customer has its own tenancy. When a request is submitted, there can be multiple tenancies involved in the request.

For example, a client that belongs to "tenant 1" may execute a request to get a token for "tenant 2" specifying a user in "tenant 3." As another example, a user living in "tenant 1" may need to perform an action in an application owned by "tenant 2". Thus, the user needs to go to the resource namespace of "tenant 2" and request a token for themselves. Accordingly, delegation of authority is accomplished by identifying "who" can do "what" to "whom." As yet another example, a first user working for a first organization ("tenant 1") may allow a second user working for a second organization ("tenant 2") to have access to a document hosted by a third organization ("tenant 3").

In one example, a client in "tenant 1" may request an access token for a user in "tenant 2" to access an application in "tenant 3". The client may do so by invoking an OAuth request for the token by going to "http://tenant3/oauth/token". The client identifies itself as a client that lives in "tenant 1" by including a "client assertion" in the request. The client assertion includes a client ID (e.g., "client 1") and the client tenancy "tenant 1". As "client 1" in "tenant 1", the client has the right to invoke a request for a token on "tenant 3", and the client wants the token for a user in "tenant 2". Accordingly, a "user assertion" is also passed as part of the same HTTP request. The access token that is generated will be issued in the context of the target tenancy which is the application tenancy ("tenant 3") and will include the user tenancy ("tenant 2").

Figure 8:
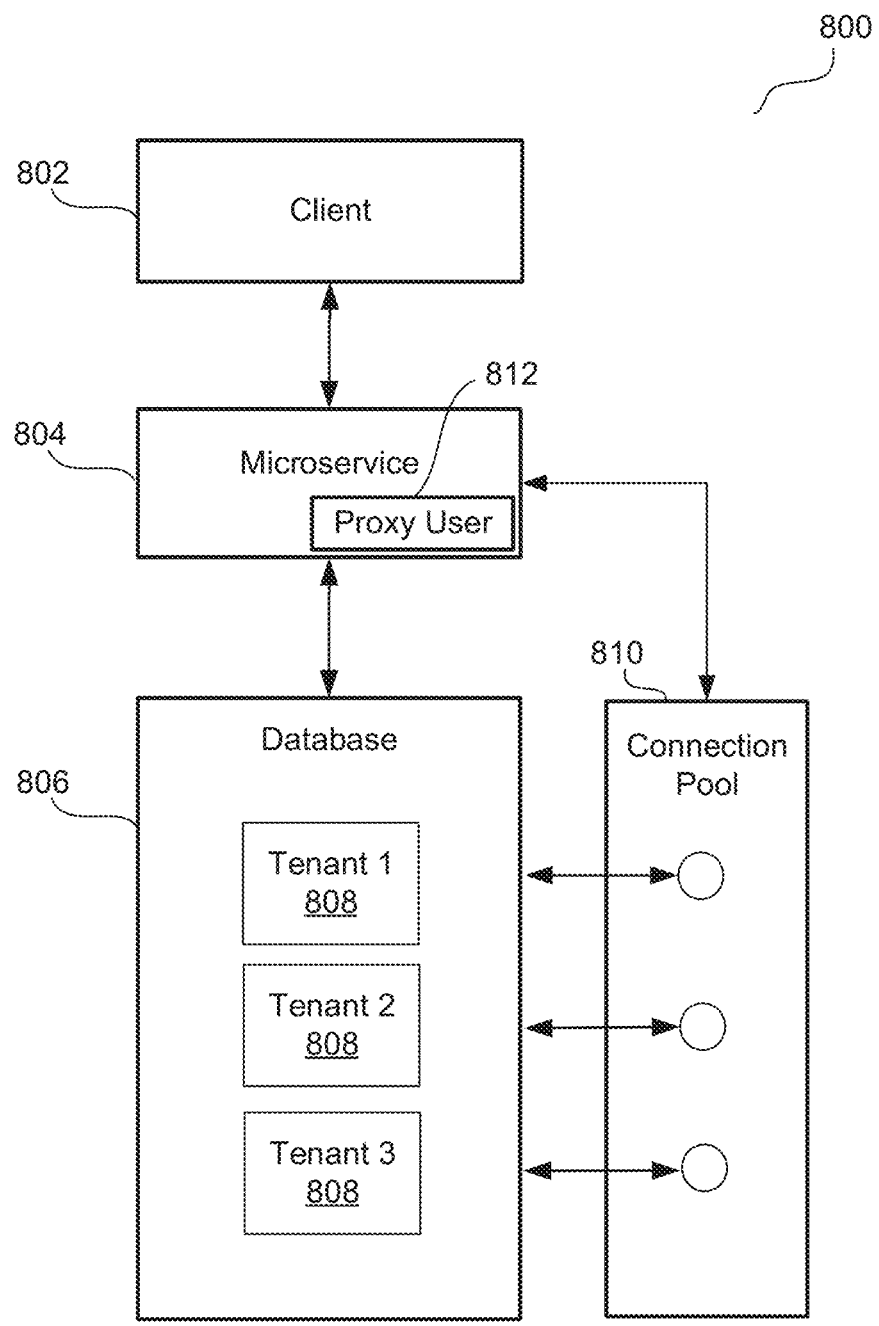
FIG. 8 illustrates an example system that implements multiple tenancies in one embodiment.

In one embodiment, in the data tier, each tenant is implemented as a separate stripe. From a data management perspective, artifacts live in a tenant. From a service perspective, a service knows how to work with different tenants, and the multiple tenancies are different dimensions in the business function of a service. FIG. 8 illustrates an example system 800 implementing multiple tenancies in an embodiment. System 800 includes a client 802 that requests a service provided by a microservice 804 that understands how to work with data in a database 806. The database includes multiple tenants 808 and each tenant includes the artifacts of the corresponding tenancy. In one embodiment, microservice 804 is an OAuth microservice requested through https://tenant3/oauth/token for getting a token. The function of the OAuth microservice is performed in microservice 804 using data from database 806 to verify that the request of client 802 is legitimate, and if it is legitimate, use the data from different tenancies 808 to construct the token. Accordingly, system 800 is multi-tenant in that it can work in a cross-tenant environment by not only supporting services coming into each tenancy, but also supporting services that can act on behalf of different tenants.

System 800 is advantageous since microservice 804 is physically decoupled from the data in database 806, and by replicating the data across locations that are closer to the client, microservice 804 can be provided as a local service to the clients and system 800 can manage the availability of the service and provide it globally.

In one embodiment, microservice 804 is stateless, meaning that the machine that runs microservice 804 does not maintain any markers pointing the service to any specific tenants. Instead, a tenancy may be marked, for example, on the host portion of a URL of a request that comes in. That tenancy points to one of tenants 808 in database 806. When supporting a large number of tenants (e.g., millions of tenants), microservice 804 cannot have the same number of connections to database 806, but instead uses a connection pool 810 which provides the actual physical connections to database 806 in the context of a database user.

Generally, connections are built by supplying an underlying driver or provider with a connection string, which is used to address a specific database or server and to provide instance and user authentication credentials (e.g., "Server=sql_box;Database=Common;User ID=uid; Pwd=password;"). Once a connection has been built, it can be opened and closed, and properties (e.g., the command time-out length, or transaction, if one exists) can be set. The connection string includes a set of key-value pairs, dictated by the data access interface of the data provider. A connection pool is a cache of database connections maintained so that the connections can be reused when future requests to a database are required. In connection pooling, after a connection is created, it is placed in the pool and it is used again so that a new connection does not have to be established. For example, when there needs to be ten connections between microservice 804 and database 808, there will be ten open connections in connection pool 810, all in the context of a database user (e.g., in association with a specific database user, e.g., who is the owner of that connection, whose credentials are being validated, is it a database user, is it a system credential, etc.).

The connections in connection pool 810 are created for a system user that can access anything. Therefore, in order to correctly handle auditing and privileges by microservice 804 processing requests on behalf of a tenant, the database operation is performed in the context of a "proxy user" 812 associated with the schema owner assigned to the specific tenant. This schema owner can access only the tenancy that the schema was created for, and the value of the tenancy is the value of the schema owner. When a request is made for data in database 806, microservice 804 uses the connections in connection pool 810 to provide that data. Accordingly, multi-tenancy is achieved by having stateless, elastic middle tier services process incoming requests in the context of (e.g., in association with) the tenant-specific data store binding established on a per request basis on top of the data connection created in the context of (e.g., in association with) the data store proxy user associated with the resource tenancy, and the database can scale independently of the services.

The following provides an example functionality for implementing proxy user 812:
    dbOperation=<prepare DB command to execute>
    dbConnection=getDBConnectionFromPool( )
    dbConnection.setProxyUser (resourceTenant)
    result=dbConnection.executeOperation (dbOperation)
In this functionality, microservice 804 sets the "Proxy User" setting on the connection pulled from connection pool 810 to the "Tenant," and performs the database operation in the context of the tenant while using the database connection in connection pool 810.

When striping every table to configure different columns in a same database for different tenants, one table may include all tenants' data mixed together. In contrast, one embodiment provides a tenant-driven data tier. The embodiment does not stripe the same database for different tenants, but instead provides a different physical database per tenant. For example, multi-tenancy may be implemented by using a pluggable database (e.g., Oracle Database 12c from Oracle Corp.) where each tenant is allocated a separate partition. At the data tier, a resource manager processes the request and then asks for the data source for the request (separate from metadata). The embodiment performs runtime switch to a respective data source/store per request. By isolating each tenant's data from the other tenants, the embodiment provides improved data security.

In one embodiment, various tokens codify different tenancies. A URL token may identify the tenancy of the application that requests a service. An identity token may codify the identity of a user that is to be authenticated. An access token may identify multiple tenancies. For example, an access token may codify the tenancy that is the target of such access (e.g., an application tenancy) as well as the user tenancy of the user that is given access. A client assertion token may identify a client ID and the client tenancy. A user-assertion token may identify the user and the user tenancy.

In one embodiment, an identity token includes at least a claim/statement indicating the user tenant name (i.e., where the user lives). A "claim" (as used by one of ordinary skill in the security field) in connection with authorization tokens is a statement that one subject makes about itself or another subject. The statement can be about a name, identity, key, group, privilege, or capability, for example. Claims are issued by a provider, and they are given one or more values and then packaged in security tokens that are issued by an issuer, commonly known as a security token service ("STS").

In one embodiment, an access token includes at least a claim/statement indicating the resource tenant name at the time the request for the access token was made (e.g., the customer), a claim indicating the user tenant name, a claim indicating the name of the OAuth client making the request, and a claim indicating the client tenant name. In one embodiment, an access token may be implemented according to the following JSON functionality:

{
. . .
  "tok_type": "AT",
  "user_id": "testuser",
  "user_tenantname": "<value-of-identity-tenant>"
  "tenant": "<value-of-resource-tenant>"
  "client_id": "testclient",
  "client_tenantname": "<value-of-client-tenant>"
. . .
}

In one embodiment, a client assertion token includes at least a claim indicating the client tenant name, and a claim indicating the name of the OAuth client making the request.

The tokens and/or multiple tenancies described herein may be implemented in any multi-tenant cloud-based service other than IDCS. For example, the tokens and/or multiple tenancies described herein may be implemented in SaaS or Enterprise Resource Planning ("ERP") services.

Figure 9:
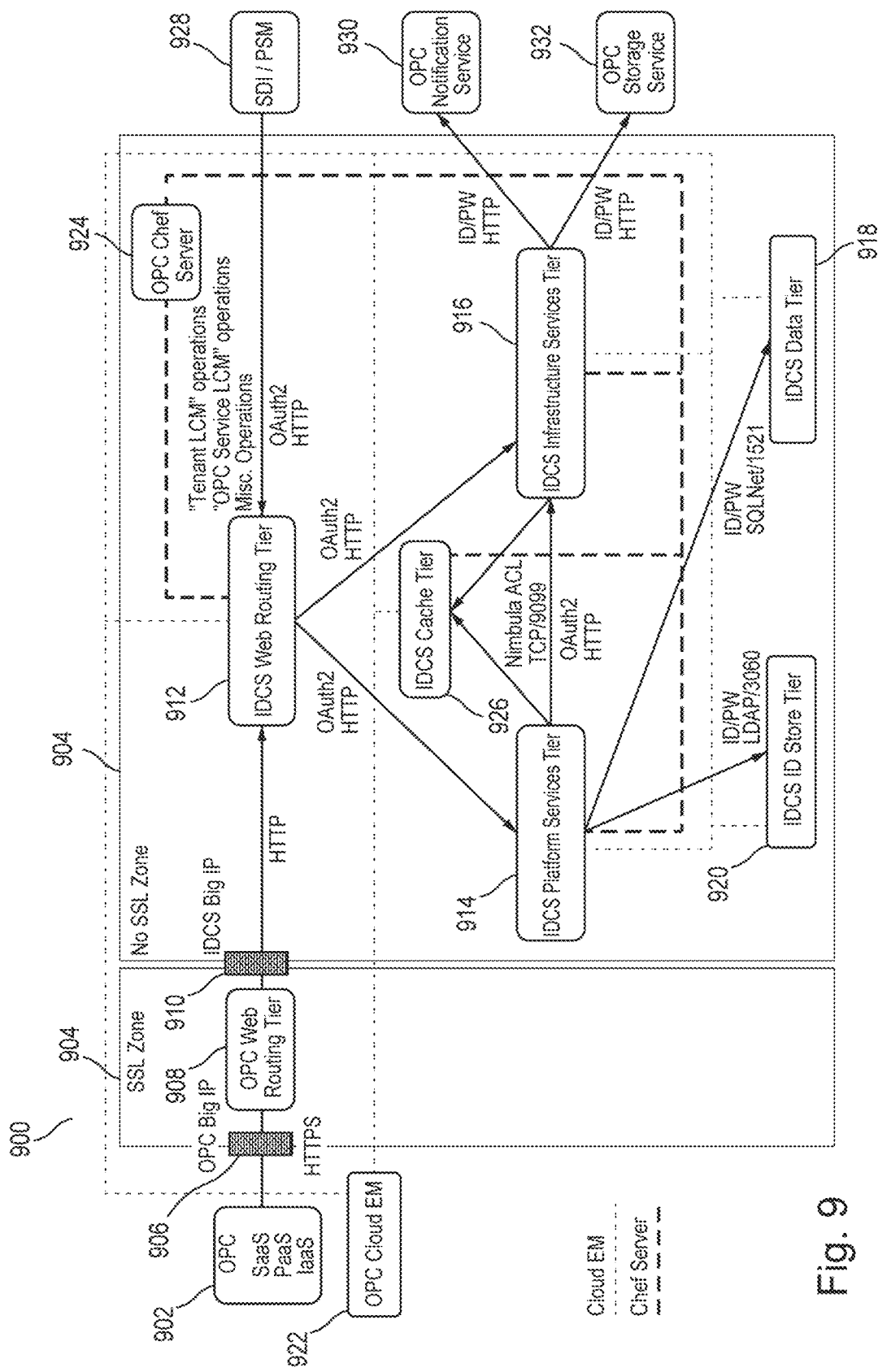
FIG. 9 is a block diagram of a network view of an embodiment.

FIG. 9 is a block diagram of a network view 900 of IDCS in one embodiment. FIG. 9 illustrates network interactions that are performed in one embodiment between application "zones" 904. Applications are broken into zones based on the required level of protection and the implementation of connections to various other systems (e.g., SSL zone, no SSL zone, etc.). Some application zones provide services that require access from the inside of IDCS, while some application zones provide services that require access from the outside of IDCS, and some are open access. Accordingly, a respective level of protection is enforced for each zone.

In the embodiment of FIG. 9, service to service communication is performed using HTTP requests. In one embodiment, IDCS uses the access tokens described herein not only to provide services but also to secure access to and within IDCS itself. In one embodiment, IDCS microservices are exposed through RESTful interfaces and secured by the tokens described herein.

In the embodiment of FIG. 9, any one of a variety of applications/services 902 may make HTTP calls to IDCS APIs to use IDCS services. In one embodiment, the HTTP requests of applications/services 902 go through an Oracle Public Cloud Load Balancing External Virtual IP address ("VIP") 906 (or other similar technologies), a public cloud web routing tier 908, and an IDCS Load Balancing Internal VIP appliance 910 (or other similar technologies), to be received by IDCS web routing tier 912. IDCS web routing tier 912 receives the requests coming in from the outside or from the inside of IDCS and routes them across either an IDCS platform services tier 914 or an IDCS infrastructure services tier 916. IDCS platform services tier 914 includes IDCS microservices that are invoked from the outside of IDCS, such as Open ID Connect, OAuth, SAML, SCIM, etc. IDCS infrastructure services tier 916 includes supporting microservices that are invoked from the inside of IDCS to support the functionality of other IDCS microservices. Examples of IDCS infrastructure microservices are UI, SSO, reports, cache, job scheduler, service manager, functionality for making keys, etc. An IDCS cache tier 926 supports caching functionality for IDCS platform services tier 914 and IDCS infrastructure services tier 916.

By enforcing security both for outside access to IDCS and within IDCS, customers of IDCS can be provided with outstanding security compliance for the applications they run.

In the embodiment of FIG. 9, other than the data tier 918 which communicates based on Structured Query Language ("SQL") and the ID store tier 920 that communicates based on LDAP, OAuth protocol is used to protect the communication among IDCS components (e.g., microservices) within IDCS, and the same tokens that are used for securing access from the outside of IDCS are also used for security within IDCS. That is, web routing tier 912 uses the same tokens and protocols for processing the requests it receives regardless of whether a request is received from the outside of IDCS or from the inside of IDCS. Accordingly, IDCS provides a single consistent security model for protecting the entire system, thereby allowing for outstanding security compliance since the fewer security models implemented in a system, the more secure the system is.

In the IDCS cloud environment, applications communicate by making network calls. The network call may be based on an applicable network protocol such as HTTP, Transmission Control Protocol ("TCP"), User Datagram Protocol ("UDP"), etc. For example, an application "X" may communicate with an application "Y" based on HTTP by exposing application "Y" as an HTTP Uniform Resource Locator ("URL"). In one embodiment, "Y" is an IDCS microservice that exposes a number of resources each corresponding to a capability. When "X" (e.g., another IDCS microservice) needs to call "Y", it constructs a URL that includes "Y" and the resource/capability that needs to be invoked (e.g., https:/host/Y/resource), and makes a corresponding REST call which goes through web routing tier 912 and gets directed to "Y".

In one embodiment, a caller outside the IDCS may not need to know where "Y" is, but web routing tier 912 needs to know where application "Y" is running. In one embodiment, IDCS implements discovery functionality (implemented by an API of OAuth service) to determine where each application is running so that there is no need for the availability of static routing information.

In one embodiment, an enterprise manager ("EM") 922 provides a "single pane of glass" that extends on-premise and cloud-based management to IDCS. In one embodiment, a "Chef" server 924 which is a configuration management tool from Chef Software, Inc., provides configuration management functionality for various IDCS tiers. In one embodiment, a service deployment infrastructure and/or a persistent stored module 928 may send OAuth2 HTTP messages to IDCS web routing tier 912 for tenant lifecycle management operations, public cloud lifecycle management operations, or other operations. In one embodiment, IDCS infrastructure services tier 916 may send ID/password HTTP messages to a public cloud notification service 930 or a public cloud storage service 932.

Cloud Access Control—SSO

One embodiment supports lightweight cloud standards for implementing a cloud scale SSO service. Examples of lightweight cloud standards are HTTP, REST, and any standard that provides access through a browser (since a web browser is lightweight). On the contrary, SOAP is an example of a heavy cloud standard which requires more management, configuration, and tooling to build a client with. The embodiment uses Open ID Connect semantics for applications to request user authentication against IDCS. The embodiment uses lightweight HTTP cookie-based user session tracking to track user's active sessions at IDCS without statefull server-side session support. The embodiment uses JWT-based identity tokens for applications to use in mapping an authenticated identity back to their own local session. The embodiment supports integration with federated identity management systems, and exposes SAML IDP support for enterprise deployments to request user authentication against IDCS.

Figure 10:
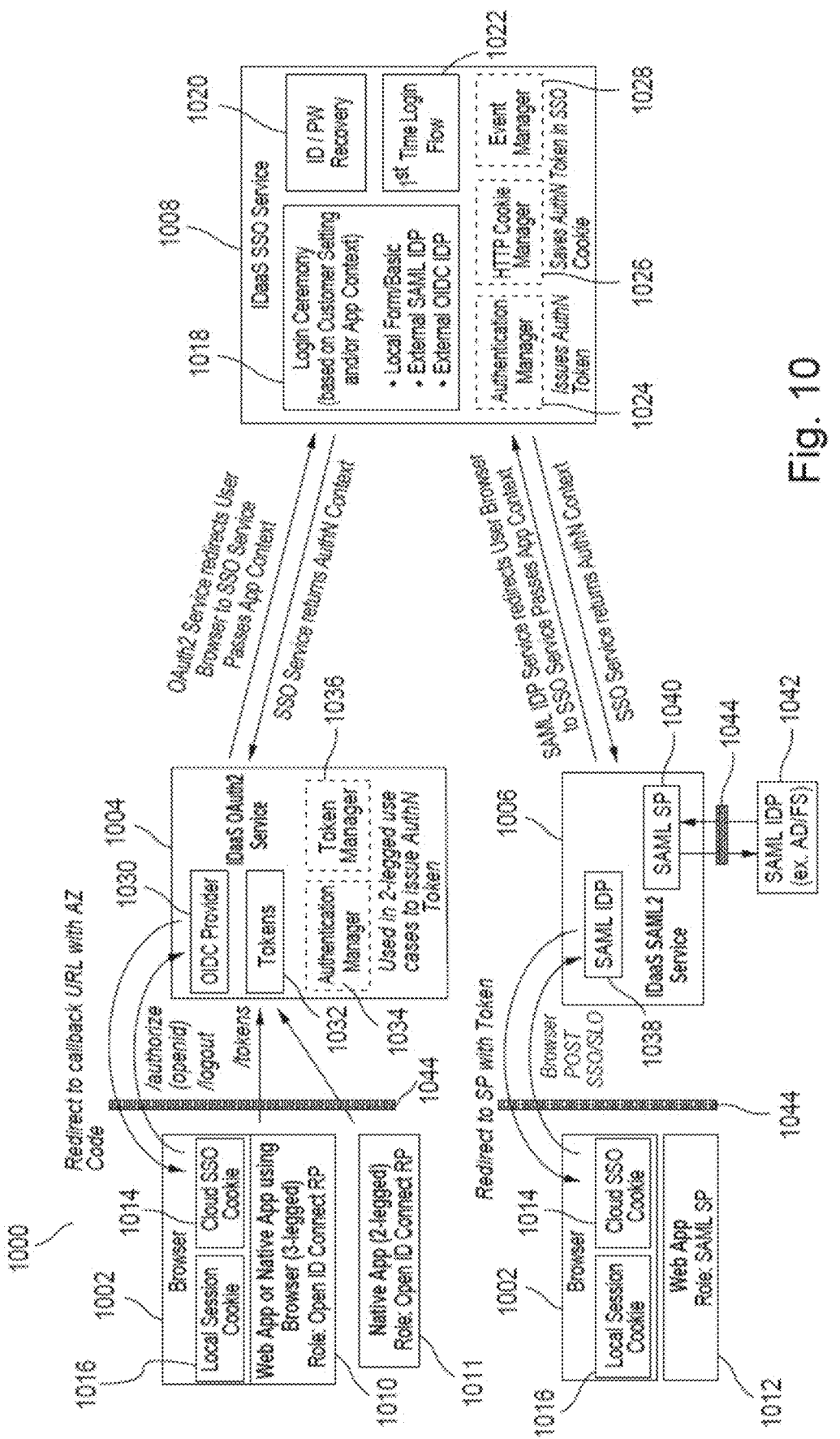
FIG. 10 is a block diagram of a system architecture view of single sign on ("SSO") functionality in one embodiment.

FIG. 10 is a block diagram 1000 of a system architecture view of SSO functionality in IDCS in one embodiment. The embodiment enables client applications to leverage standards-based web protocols to initiate user authentication flows. Applications requiring SSO integration with a cloud system may be located in enterprise data centers, in remote partner data centers, or even operated by a customer on-premise. In one embodiment, different IDCS platform services implement the business of SSO, such as OpenID Connect for processing login/logout requests from connected native applications (i.e., applications utilizing OpenID Connect to integrate with IDCS); SAML IDP service for processing browser-based login/logout requests from connected applications; SAML SP service for orchestrating user authentication against an external SAML IDP; and an internal IDCS SSO service for orchestrating end user login ceremony including local or federated login flows, and for managing IDCS host session cookie. Generally, HTTP works either with a form or without a form. When it works with a form, the form is seen within a browser. When it works without a form, it functions as a client to server communication. Both Open ID Connect and SAML require the ability to render a form, which may be accomplished by presence of a browser or virtually performed by an application that acts as if there is a browser. In one embodiment, an application client implementing user authentication/SSO through IDCS needs to be registered in IDCS as an OAuth2 client and needs to obtain client identifier and credentials (e.g., ID/password, ID/certificate, etc.).

The example embodiment of FIG. 10 includes three components/microservices that collectively provide login capabilities, including two platform microservices: OAuth2 1004 and SAML2 1006, and one infrastructure microservice: SSO 1008. In the embodiment of FIG. 10, IDCS provides an "Identity Metasystem" in which SSO services 1008 are provided over different types of applications, such as browser based web or native applications 1010 requiring 3-legged OAuth flow and acting as an Open ID Connect relaying party ("RP," an application that outsources its user authentication function to an IDP), native applications 1011 requiring 2-legged OAuth flow and acting as an OpenID Connect RP, and web applications 1012 acting as a SAML SP.

Generally, an Identity Metasystem is an interoperable architecture for digital identity, allowing for employing a collection of digital identities based on multiple underlying technologies, implementations, and providers. LDAP, SAML, and OAuth are examples of different security standards that provide identity capability and can be the basis for building applications, and an Identity Metasystem may be configured to provide a unified security system over such applications. The LDAP security model specifies a specific mechanism for handling identity, and all passes through the system are to be strictly protected. SAML was developed to allow one set of applications securely exchange information with another set of applications that belong to a different organization in a different security domain. Since there is no trust between the two applications, SAML was developed to allow for one application to authenticate another application that does not belong to the same organization. OAuth provides Open ID Connect that is a lightweight protocol for performing web based authentication.

In the embodiment of FIG. 10, when an OpenID application 1010 connects to an Open ID server in IDCS, its "channels" request SSO service. Similarly, when a SAML application 1012 connects to a SAML server in IDCS, its "channels" also request SSO service. In IDCS, a respective microservice (e.g., an OpenID microservice 1004 and a SAML microservice 1006) will handle each of the applications, and these microservices request SSO capability from SSO microservice 1008. This architecture can be expanded to support any number of other security protocols by adding a microservice for each protocol and then using SSO microservice 1008 for SSO capability. SSO microservice 1008 issues the sessions (i.e., an SSO cookie 1014 is provided) and is the only system in the architecture that has the authority to issue a session. An IDCS session is realized through the use of SSO cookie 1014 by browser 1002. Browser 1002 also uses a local session cookie 1016 to manage its local session.

In one embodiment, for example, within a browser, a user may use a first application based on SAML and get logged in, and later use a second application built with a different protocol such as OAuth. The user is provided with SSO on the second application within the same browser. Accordingly, the browser is the state or user agent and maintains the cookies.

In one embodiment, SSO microservice 1008 provides login ceremony 1018, ID/password recovery 1020, first time login flow 1022, an authentication manager 1024, an HTTP cookie manager 1026, and an event manager 1028. Login ceremony 1018 implements SSO functionality based on customer settings and/or application context, and may be configured according to a local form (i.e., basic Auth), an external SAML IDP, an external OIDC IDP, etc. ID/password recovery 1020 is used to recover a user's ID and/or password. First time login flow 1022 is implemented when a user logs in for the first time (i.e., an SSO session does not yet exist). Authentication manager 1024 issues authentication tokens upon successful authentication. HTTP cookie manager 1026 saves the authentication token in an SSO cookie. Event manager 1028 publishes events related to SSO functionality.

In one embodiment, interactions between OAuth microservice 1004 and SSO microservice 1008 are based on browser redirects so that SSO microservice 1008 challenges the user using an HTML form, validates credentials, and issues a session cookie.

In one embodiment, for example, OAuth microservice 1004 may receive an authorization request from browser 1002 to authenticate a user of an application according to 3-legged OAuth flow. OAuth microservice 1004 then acts as an OIDC provider 1030, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to OAuth microservice 1004. OAuth microservice 1004 then redirects browser 1002 to a callback URL with an authorization ("AZ") code. Browser 1002 sends the AZ code to OAuth microservice 1004 to request the required tokens 1032. Browser 1002 also includes its client credentials (obtained when registering in IDCS as an OAuth2 client) in the HTTP authorization header. OAuth microservice 1004 in return provides the required tokens 1032 to browser 1002. In one embodiment, tokens 1032 provided to browser 1002 include JW identity and access tokens signed by the IDCS OAuth2 server. Further details of this functionality are disclosed below with reference to FIG. 11.

In one embodiment, for example, OAuth microservice 1004 may receive an authorization request from a native application 1011 to authenticate a user according to a 2-legged OAuth flow. In this case, an authentication manager 1034 in OAuth microservice 1004 performs the corresponding authentication (e.g., based on ID/password received from a client 1011) and a token manager 1036 issues a corresponding access token upon successful authentication.

In one embodiment, for example, SAML microservice 1006 may receive an SSO POST request from a browser to authenticate a user of a web application 1012 that acts as a SAML SP. SAML microservice 1006 then acts as a SAML IDP 1038, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to SAML microservice 1006. SAML microservice then redirects to the SP with required tokens.

In one embodiment, for example, SAML microservice 1006 may act as a SAML SP 1040 and go to a remote SAML IDP 1042 (e.g., an active directory federation service ("ADFS")). One embodiment implements the standard SAML/AD flows. In one embodiment, interactions between SAML microservice 1006 and SSO microservice 1008 are based on browser redirects so that SSO microservice 1008 challenges the user using an HTML form, validates credentials, and issues a session cookie.

In one embodiment, the interactions between a component within IDCS (e.g., 1004, 1006, 1008) and a component outside IDCS (e.g., 1002, 1011, 1042) are performed through firewalls 1044.

Login/Logout Flow

Figure 11:
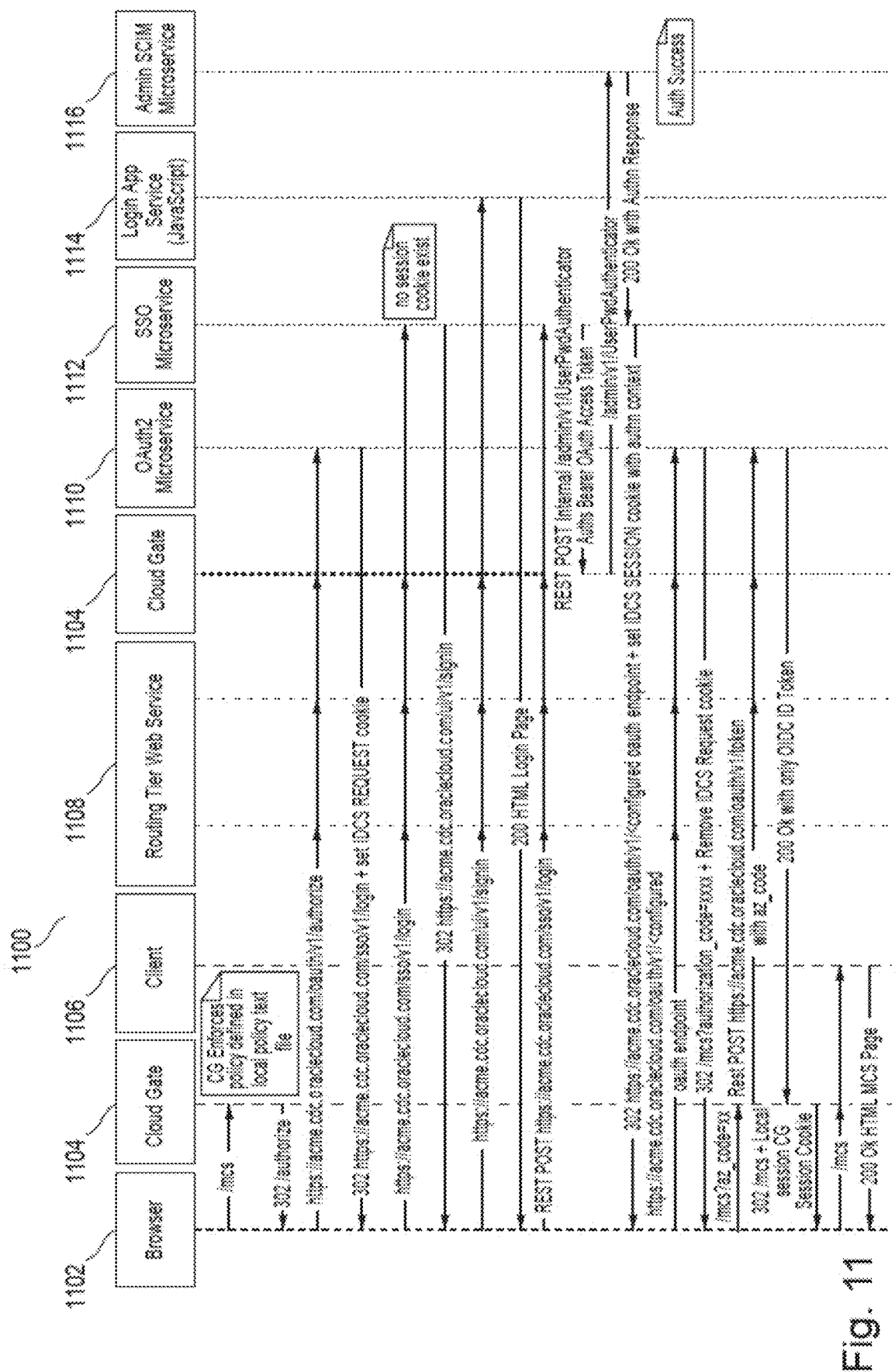
FIG. 11 is a message sequence flow of SSO functionality in one embodiment.

FIG. 11 is a message sequence flow 1100 of SSO functionality provided by IDCS in one embodiment. When a user uses a browser 1102 to access a client 1106 (e.g., a browser-based application or a mobile/native application), Cloud Gate 1104 acts as an application enforcement point and enforces a policy defined in a local policy text file. If Cloud Gate 1104 detects that the user has no local application session, it requires the user to be authenticated. In order to do so, Cloud Gate 1104 redirects browser 1102 to OAuth2 microservice 1110 to initiate OpenID Connect login flow against the OAuth2 microservice 1110 (3-legged AZ Grant flow with scopes="openid profile").

The request of browser 1102 traverses IDCS routing tier web service 1108 and Cloud Gate 1104 and reaches OAuth2 microservice 1110. OAuth2 microservice 1110 constructs the application context (i.e., metadata that describes the application, e.g., identity of the connecting application, client ID, configuration, what the application can do, etc.), and redirects browser 1102 to SSO microservice 1112 to log in.

If the user has a valid SSO session, SSO microservice 1112 validates the existing session without starting a login ceremony. If the user does not have a valid SSO session (i.e., no session cookie exists), the SSO microservice 1112 initiates the user login ceremony in accordance with customer's login preferences (e.g., displaying a branded login page). In order to do so, the SSO microservice 1112 redirects browser 1102 to a login application service 1114 implemented in JavaScript. Login application service 1114 provides a login page in browser 1102. Browser 1102 sends a REST POST to the SSO microservice 1112 including login credentials. The SSO microservice 1112 generates an access token and sends it to Cloud Gate 1104 in a REST POST. Cloud Gate 1104 sends the authentication information to Admin SCIM microservice 1116 to validate the user's password. Admin SCIM microservice 1116 determines successful authentication and sends a corresponding message to SSO microservice 1112.

In one embodiment, during the login ceremony, the login page does not display a consent page, as "login" operation requires no further consent. Instead, a privacy policy is stated on the login page, informing the user about certain profile attributes being exposed to applications. During the login ceremony, the SSO microservice 1112 respects customer's IDP preferences, and if configured, redirects to the IDP for authentication against the configured IDP.

Upon successful authentication or validation, SSO microservice 1112 redirects browser 1102 back to OAuth2 microservice 1110 with the newly created/updated SSO host HTTP cookie (e.g., the cookie that is created in the context of the host indicated by "HOSTURL") containing the user's authentication token. OAuth2 microservice 1110 returns AZ Code (e.g., an OAuth concept) back to browser 1102 and redirects to Cloud Gate 1104. Browser 1102 sends AZ Code to Cloud Gate 1104, and Cloud Gate 1104 sends a REST POST to OAuth2 microservice 1110 to request the access token and the identity token. Both tokens are scoped to OAuth microservice 1110 (indicated by the audience token claim). Cloud Gate 1104 receives the tokens from OAuth2 microservice 1110.

Cloud Gate 1104 uses the identity token to map the user's authenticated identity to its internal account representation, and it may save this mapping in its own HTTP cookie. Cloud Gate 1104 then redirects browser 1102 to client 1106. Browser 1102 then reaches client 1106 and receives a corresponding response from client 1106. From this point on, browser 1102 can access the application (i.e., client 1106) seamlessly for as long as the application's local cookie is valid. Once the local cookie becomes invalid, the authentication process is repeated.

Cloud Gate 1104 further uses the access token received in a request to obtain "userinfo" from OAuth2 microservice 1110 or the SCIM microservice. The access token is sufficient to access the "userinfo" resource for the attributes allowed by the "profile" scope. It is also sufficient to access "/me" resources via the SCIM microservice. In one embodiment, by default, the received access token is only good for user profile attributes that are allowed under the "profile" scope. Access to other profile attributes is authorized based on additional (optional) scopes submitted in the AZ grant login request issued by Cloud Gate 1104.

When the user accesses another OAuth2 integrated connecting application, the same process repeats.

In one embodiment, the SSO integration architecture uses a similar OpenID Connect user authentication flow for browser-based user logouts. In one embodiment, a user with an existing application session accesses Cloud Gate 1104 to initiate a logout. Alternatively, the user may have initiated the logout on the IDCS side. Cloud Gate 1104 terminates the application-specific user session, and initiates OAuth2 OpenID Provider ("OP") logout request against OAuth2 microservice 1110. OAuth2 microservice 1110 redirects to SSO microservice 1112 that kills the user's host SSO cookie. SSO microservice 1112 initiates a set of redirects (OAuth2 OP and SAML IDP) against known logout endpoints as tracked in user's SSO cookie.

In one embodiment, if Cloud Gate 1104 uses SAML protocol to request user authentication (e.g., login), a similar process starts between the SAML microservice and SSO microservice 1112.

Cloud Cache

One embodiment provides a service/capability referred to as Cloud Cache. Cloud Cache is provided in IDCS to support communication with applications that are LDAP based (e.g., email servers, calendar servers, some business applications, etc.) since IDCS does not communicate according to LDAP while such applications are configured to communicate only based on LDAP. Typically, cloud directories are exposed via REST APIs and do not communicate according to the LDAP protocol. Generally, managing LDAP connections across corporate firewalls requires special configurations that are difficult to set up and manage.

To support LDAP based applications, Cloud Cache translates LDAP communications to a protocol suitable for communication with a cloud system. Generally, an LDAP based application uses a database via LDAP. An application may be alternatively configured to use a database via a different protocol such as SQL. However, LDAP provides a hierarchical representation of resources in tree structures, while SQL represents data as tables and fields. Accordingly, LDAP may be more desirable for searching functionality, while SQL may be more desirable for transactional functionality.

In one embodiment, services provided by IDCS may be used in an LDAP based application to, for example, authenticate a user of the applications (i.e., an identity service) or enforce a security policy for the application (i.e., a security service). In one embodiment, the interface with IDCS is through a firewall and based on HTTP (e.g., REST). Typically, corporate firewalls do not allow access to internal LDAP communication even if the communication implements Secure Sockets Layer ("SSL"), and do not allow a TCP port to be exposed through the firewall. However, Cloud Cache translates between LDAP and HTTP to allow LDAP based applications reach services provided by IDCS, and the firewall will be open for HTTP.

Generally, an LDAP directory may be used in a line of business such as marketing and development, and defines users, groups, works, etc. In one example, a marketing and development business may have different targeted customers, and for each customer, may have their own applications, users, groups, works, etc. Another example of a line of business that may run an LDAP cache directory is a wireless service provider. In this case, each call made by a user of the wireless service provider authenticates the user's device against the LDAP directory, and some of the corresponding information in the LDAP directory may be synchronized with a billing system. In these examples, LDAP provides functionality to physically segregate content that is being searched at runtime.

In one example, a wireless service provider may handle its own identity management services for their core business (e.g., regular calls), while using services provided by IDCS in support of a short term marketing campaign. In this case, Cloud Cache "flattens" LDAP when it has a single set of users and a single set of groups that it runs against the cloud. In one embodiment, any number of Cloud Caches may be implemented in IDCS.

Distributed Data Grid

In one embodiment, the cache cluster in IDCS is implemented based on a distributed data grid, as disclosed, for example, in U.S. Pat. Pub. No. 2016/0092540, the disclosure of which is hereby incorporated by reference. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the Oracle Coherence data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, IDCS implements a distributed data grid such as Coherence so that every microservice can request access to shared cache objects without getting blocked. Coherence is a proprietary Java-based in-memory data grid, designed to have better reliability, scalability, and performance than traditional relational database management systems. Coherence provides a peer to peer (i.e., with no central manager), in-memory, distributed cache.

Figure 12:
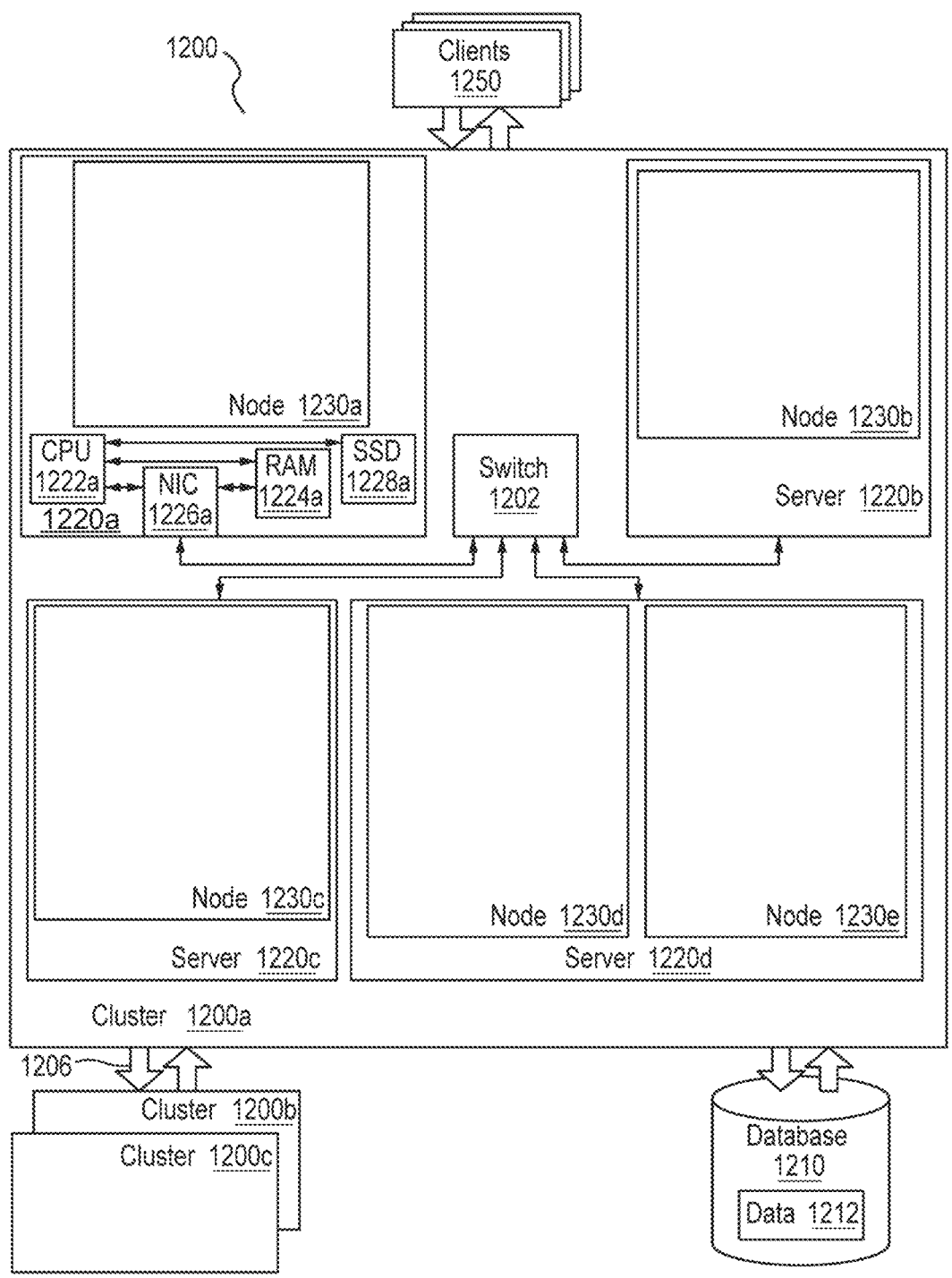
FIG. 12 illustrates an example of a distributed data grid in one embodiment.

FIG. 12 illustrates an example of a distributed data grid 1200 which stores data and provides data access to clients 1250 and implements embodiments of the invention. A "data grid cluster", or "distributed data grid", is a system comprising a plurality of computer servers (e.g., 1220*a*, 1220*b*, 1220*c*, and 1220*d*) which work together in one or more clusters (e.g., 1200*a*, 1200*b*, 1200*c*) to store and manage information and related operations, such as computations, within a distributed or clustered environment. While distributed data grid 1200 is illustrated as comprising four servers 1220*a*, 1220*b*, 1220*c*, 1220*d*, with five data nodes 1230*a*, 1230*b*, 1230*c*, 1230*d*, and 1230*e* in a cluster 1200*a*, the distributed data grid 1200 may comprise any number of clusters and any number of servers and/or nodes in each cluster. In an embodiment, distributed data grid 1200 implements the present invention.

As illustrated in FIG. 12, a distributed data grid provides data storage and management capabilities by distributing data over a number of servers (e.g., 1220*a*, 1220*b*, 1220*c*, and 1220*d*) working together. Each server of the data grid cluster may be a conventional computer system such as, for example, a "commodity x86" server hardware platform with one to two processor sockets and two to four CPU cores per processor socket. Each server (e.g., 1220*a*, 1220*b*, 1220*c*, and 1220*d*) is configured with one or more CPUs, Network Interface Cards ("NIC"), and memory including, for example, a minimum of 4 GB of RAM up to 64 GB of RAM or more. Server 1220*a* is illustrated as having CPU 1222*a*, Memory 1224*a*, and NIC 1226*a* (these elements are also present but not shown in the other Servers 1220*b*, 1220*c*, 1220*d*). Optionally, each server may also be provided with flash memory (e.g., SSD 1228*a*) to provide spillover storage capacity. When provided, the SSD capacity is preferably ten times the size of the RAM. The servers (e.g., 1220*a*, 1220*b*, 1220*c*, 1220*d*) in a data grid cluster 1200*a* are connected using high bandwidth NICs (e.g., PCI-X or PCIe) to a high-performance network switch 1220 (for example, gigabit Ethernet or better).

A cluster 1200*a* preferably contains a minimum of four physical servers to avoid the possibility of data loss during a failure, but a typical installation has many more servers. Failover and failback are more efficient the more servers that are present in each cluster and the impact of a server failure on a cluster is lessened. To minimize communication time between servers, each data grid cluster is ideally confined to a single switch 1202 which provides single hop communication between servers. A cluster may thus be limited by the number of ports on the switch 1202. A typical cluster will therefore include between 4 and 96 physical servers.

In most Wide Area Network ("WAN") configurations of a distributed data grid 1200, each data center in the WAN has independent, but interconnected, data grid clusters (e.g., 1200*a*, 1200*b*, and 1200*c*). A WAN may, for example, include many more clusters than shown in FIG. 12. Additionally, by using interconnected but independent clusters (e.g., 1200*a*, 1200*b*, 1200*c*) and/or locating interconnected, but independent, clusters in data centers that are remote from one another, the distributed data grid can secure data and service to clients 1250 against simultaneous loss of all servers in one cluster caused by a natural disaster, fire, flooding, extended power loss, and the like.

One or more nodes (e.g., 1230*a*, 1230*b*, 1230*c*, 1230*d* and 1230*e*) operate on each server (e.g., 1220*a*, 1220*b*, 1220*c*, 1220*d*) of a cluster 1200*a*. In a distributed data grid, the nodes may be, for example, software applications, virtual machines, or the like, and the servers may comprise an operating system, hypervisor, or the like (not shown) on which the node operates. In an Oracle Coherence data grid, each node is a Java virtual machine ("JVM"). A number of JVMs/nodes may be provided on each server depending on the CPU processing power and memory available on the server. JVMs/nodes may be added, started, stopped, and deleted as required by the distributed data grid. JVMs that run Oracle Coherence automatically join and cluster when started. JVMs/nodes that join a cluster are called cluster members or cluster nodes.

Each client or server includes a bus or other communication mechanism for communicating information, and a processor coupled to bus for processing information. The processor may be any type of general or specific purpose processor. Each client or server may further include a memory for storing information and instructions to be executed by processor. The memory can be comprised of any combination of random access memory ("RAM"), read only memory ("ROM"), static storage such as a magnetic or optical disk, or any other type of computer readable media. Each client or server may further include a communication device, such as a network interface card, to provide access to a network. Therefore, a user may interface with each client or server directly, or remotely through a network, or any other method.

Computer readable media may be any available media that can be accessed by processor and includes both volatile and non-volatile media, removable and non-removable media, and communication media. Communication media may include computer readable instructions, data structures, program modules, or other data in a modulated data signal such as a carrier wave or other transport mechanism, and includes any information delivery media.

The processor may further be coupled via bus to a display, such as a Liquid Crystal Display ("LCD"). A keyboard and a cursor control device, such as a computer mouse, may be further coupled to bus to enable a user to interface with each client or server.

In one embodiment, the memory stores software modules that provide functionality when executed by the processor. The modules include an operating system that provides operating system functionality each client or server. The modules may further include a cloud identity management module for providing cloud identity management functionality, and all other functionality disclosed herein.

The clients may access a web service such as a cloud service. The web service may be implemented on a WebLogic Server from Oracle Corp. in one embodiment. In other embodiments, other implementations of a web service can be used. The web service accesses a database which stores cloud data.

Reference Attributes for Related Stored Objects

Embodiments of IDCS store and manage identity data and need to store objects that have references to other objects. Therefore, embodiments define and use a schema that can store such objects. The object references may be stored either in the referee object or in the referred object depending on each specific scenario. Generally, a schema is a set of attribute definitions describing a resource. The SCIM RFC 7643 specifies a mechanism for storing and handling simple references via "$ref". However, the SCIM referencing functionality is inadequate for handling use cases with complex resource relationships. Accordingly, embodiments store such references by extending the SCIM specification. The functionality for storing references in embodiments can be used for different types of resources and different levels/complexity of references between objects. It can handle complex scenarios such as self-nesting and associative (chained) relationships between the referred and the referee. Further, the known SCIM core schema described in IETF RFC 7643 is adequate for providing a collection of attribute definitions for a single resource but is not adequate for supporting join conditions when joining multiple objects/ resources (i.e., joining tables corresponding to multiple resources). However, embodiments enhance the SCIM core schema to accommodate joining multiple objects/resources. In the below, "user" and "group" are used as examples of resources in embodiments, and the terms "resource" and "object" may be used interchangeably.

In embodiments, a reference provides a way to link related objects, and each reference may indicate various types of relationships between objects. Examples of references are simple references, parent-child references, and associative/chained references. The SCIM standard allows for defining relationships between resources/objects using the "reference" attribute in the SCIM specification RFC 7643. For example, in SCIM 7643, a group resource is given as follows:

```
{
  "schemes": ["urn:ietf:params:scim:schemes:core:2.0:Group"],
  "id": "e9e30dba-f08f-4109-8486-d5c6a331660a",
  "displayName": "Tour Guides",
  "meta": {
   "resourceType": "Group",
   "created": "2011-08-01T18:29:49.793Z",
   "lastModified": "2011-08-01T20:31:02.315Z",
   "location":
   "https://example.com/v2/Groups/e9e30dba-f08f-4109-8486-
   d5c6a331660a"
  },
  "members": [
   {
    "value": "92b725cd-9465-4e7d-8c16-01f8e146b87a",
    "$ref": "https://example.com/v2/Users/92b725cd-9465-4e7d-8c16-
    01f8e146b87a",
    "type": "User"
   }
  ]
}
```

In the above, the "Tour Guides" Group has an "id" of "e9e30dba-f08f-4109-8486-d5c6a331660a" and the "Alice" User resource has an "id" of "92b725cd-9465-4e7d-8c16-01f8e146b87a". The "members" attribute in the Group is a reference attribute to store the relationship between Group and User. Specifically, in "members", the "type" sub-attribute indicates "User" is the referred object, the "value" sub-attribute provides the particular id of the "Alice" user, and "$ref" provides the location of the user.

However, the reference attribute only supports relationships in a one-way navigation mechanism to navigate from a referee to a referenced object, e.g., navigating from a "parent" object (referee) to its "child" object (reference). In contrast, embodiments provide referencing functionality to navigate from "parent" to "child" as well as from "child" to its "parents". Further, embodiments store and navigate self-nesting and associative relationships. Embodiments extend the SCIM specification and define and use "direct", "indirect", and "self-nested" relationships and provide functionality to configure "persisted" and "non-persisted" references, as described below.

Figure 13:
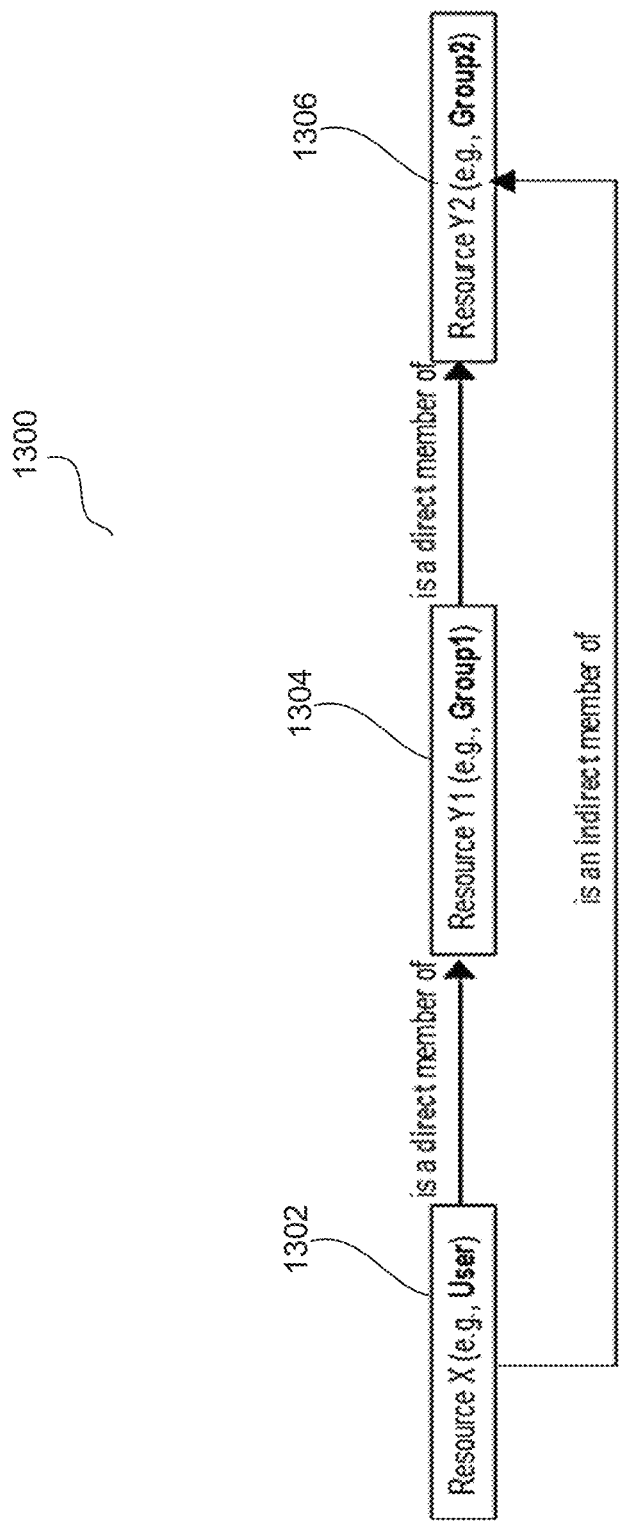
FIG. 13 is an example block diagram of relationships between resources in an embodiment.

FIG. 13 is an example block diagram 1300 of relationships between a user resource 1302 (resource X), a first group resource 1304 (resource Y1), and a second group resource 1306 (resource Y2), according to an embodiment. A user can be a member of one or more groups, and each group can be a member of one or more other groups. A group has an attribute called "members" which links it to its constituent users and groups. A user has an attribute called "groups" which links it to its groups. In FIG. 13, the user resource 1302 is a direct member of the first group resource 1304, and the first group resource 1304 is a direct member of the second group resource 1306. The user resource 1302 is also an indirect member of the second group resource 1306 by virtue of the aforementioned direct relationships.

One embodiment defines a relationship "type" for each of the references between objects in order to be able to store complex relationships between objects. The relationship "type" of a reference may be "direct", "indirect", or "Self-nested". In a relationship of type "direct", the referenced resource is directly stored in the referenced table. The term "direct" indicates that the referred and the referee objects are connected "directly", meaning there is no intermediate link between them. In FIG. 13, the user resource 1302 is a "direct" member of the first group resource 1304, and the first group resource 1304 is a "direct" member of the second group resource 1306. In a relationship of type "indirect", the referenced resource is stored as an indirect reference due to nesting. For example, a group can have members of type user or group, allowing nested groups as members. A user may be a member of a nested group. In FIG. 13, the user resource 1302 is an "indirect" member of the second group resource 1306. A relationship of type "Self-nested" is exclusively used for defining a self-nested relationship among objects. For example, a group can have other groups as its members. For example, the relation between the first group resource 1304 and the second group resource 1306 is a "direct" relationship. However, the user resource 1302 is a "direct" member of the first group resource 1304 and an "indirect" member of the second group resource 1306. Applying a "Self-nested" query on the second group resource 1306 will fetch the user resource 1302. That is, the "Self-nested" query fetches "indirect" members of a Group.

After defining the relationship "type" for a reference, embodiments define persistence information ("persistence scope") for the reference. The following functionality provides example schemas and attributes for users and groups, where persisted and non-persisted references are implemented.

```
"groups" attribute in X(User) resource schema
{
  "name": "groups",
  "description", "A list of groups that the user belongs to, either
  through direct membership, nested groups, or dynamically
  calculated",
  "idcsRefResourceAttributes": ["Group.members.value"],
  "mutability": "readOnly",
  "subAttributes": [
   {
    "name": "value",
    "description": "The identifier of the User's group.",
    "idcsRefResourceAttributes": [Group.id],
    "idcsValuePersisted": false,
    "mutability": "readOnly"
   },
   {
    "name": "type"
    "description": "A label indicating the attribute's function; e.g. 'direct'
    or 'indirect'.",
    "idcsRefResourceAttributes": ["Group.members type"],
    "canonicalValues": ["direct", "indirect"],
    "idcsValuePersisted": false,
    "mutability": "readOnly"
   },
   {
    "name", "$ref",
    "description": "The URI of the Group resource to which the user
    belongs",
    "referenceTypes": ["Group"],
    "idcsValuePersisted": false,
```

```
    "mutability": "readOnly"
  },
  {
    "name": "display",
    "description", "A human readable name",
    "idcsRefResourceAttributes": ["Group.displayName"],
    "idcsValuePersisted": false,
    "mutability": "readOnly"
  }
  ]
}
{
  "members" attribute in Y (Group) resource schema
{
  "name": "members",
  "description": "Group members",
  "mutability": "readWrite",
  "subAttributes": [
    {
      "name": "value",
      "description": "ID of the member of this Group",
      "idcsRefResourceAttributes": ["User.id", "Group.id"]
      "idcsTargetAttributeName": "1_VC_1",
      "mutability": "readWrite"
    },
    {
      "name": "type",
      "description": "indicates the type of resource, e.g., User or Group",
      "idcsTargetAttributeName": "1_VC_2",
      "cannonicalValues": ["User", "Group"],
      "mutability": "readWrite"
    },
    {
      "name": "$ref",
      "description": "The URI that corresponds to the member of this Group",
      "referenceTypes": ["User", "Group"],
      "idcsValuePersisted": false,
      "mutability": "readOnly"
    },
    {
      "name": "display",
      "description", "Member display name",
      "idcsRefResourceAttributes": ["user.displayName", "Group.displayName"],
      "idcsValuePersisted": false,
      "mutability": "readOnly"
    }
  ]
}
```

In the above, "idcsRefResourceAttributes" is an attribute that specifies the directly referenced attributes in the referred objects (e.g., "members.value" sub-attribute refers to id attribute in User or Group resource). "mutability" indicates is an attribute can be changed ("readOnly" indicating no mutability and "readWrite" indicating mutability), "idcsValuePersisted" indicates if a reference attribute is persisted or not, and "canonical Values" under "members.type" sub-attribute indicates that only these resource types are accepted as the referred objects for this attribute.

For persisted reference attributes, the referrer resource (e.g., a group) houses a reference to the referred resource (e.g., a user or a group) which is persisted in the referrer's record in database. For non-persisted reference attributes, the references from the referrer (e.g., a user) to the referred objects (e.g., a group) are not persisted in the referrer record. For example, in a group, the attribute "members" has its sub-attributes "value" and "type" persisted in database. The corresponding table column names are given by "idcsTargetAttributeName", and "mutability" is set as "readWrite". Meanwhile, other sub-attributes such as "displayName" are not persisted ("idcsValuePersisted" is set as false and "mutability" is set as "readOnly") and their value is derived from the referred object's record (e.g., user or group's record). The reference relationship on the attribute level between referrer and referred objects are given by "idcsRefResourceAttributes". As another example, for a user resource, all sub-attributes of the attribute "groups" are marked such that "idcsValuePersisted" is false and "mutability" is "readOnly", indicating that such references are non-persisted and their values are to be derived from the referred objects.

In one embodiment, at the time of server start-up, first an in-memory representation of the objects called "ResourceTypeInfo" is constructed. This is the stage where the aforementioned "type" and "persistence scope" information defined for the references in the resources are parsed by IDCS and translated into the in-memory object "ResourceTypeInfo" and its descendants. This in-memory object stores the attributes defined in the resource, and also stores the object-to-object relationship information described herein. This structure is used to navigate between referee and referred resources during IDCS run-time.

Figure 14:
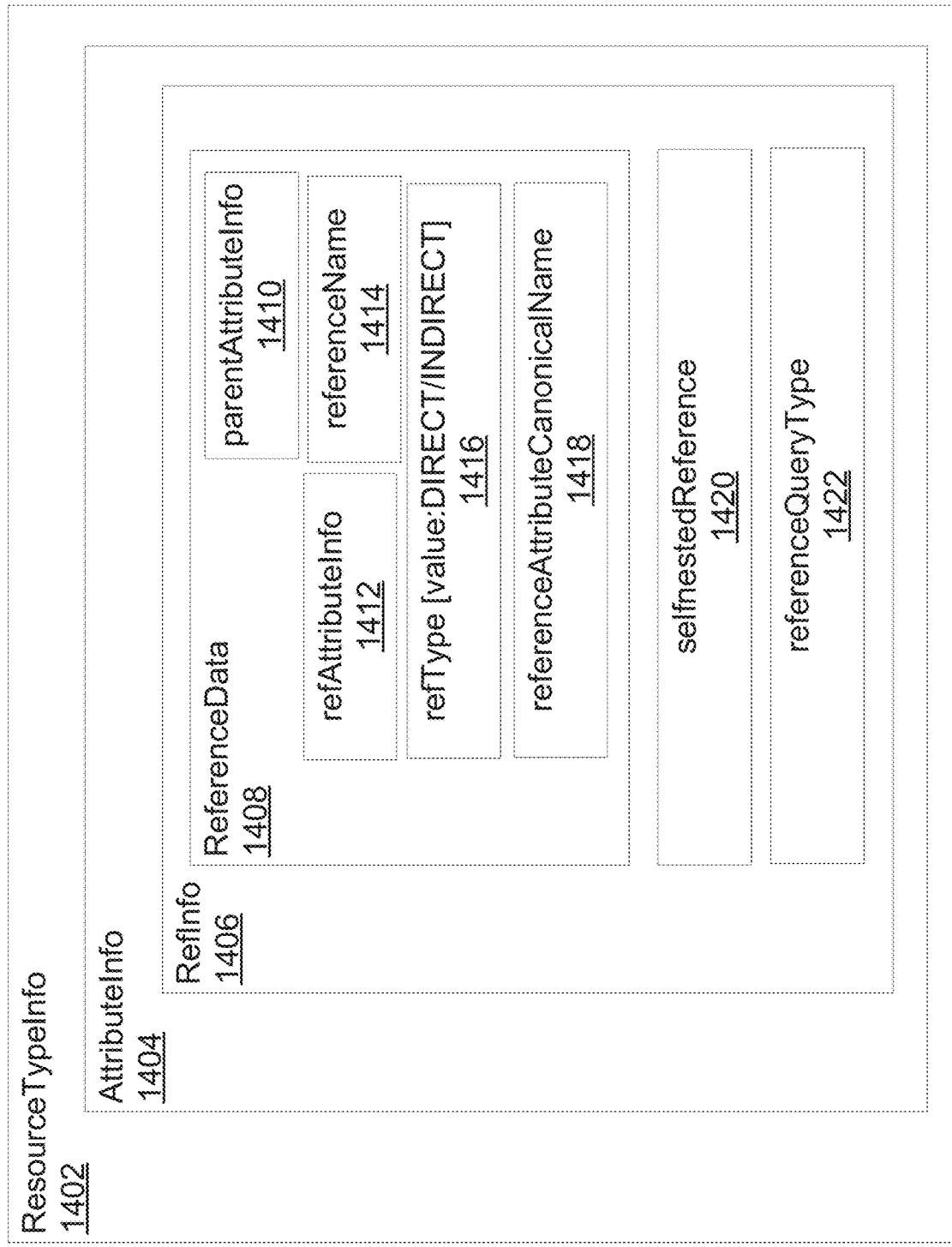
FIG. 14 is an example structural view of an in-memory object that defines/stores several object attributes and their relationships, according to an embodiment.

FIG. 14 is a structural view of the in-memory "ResourceTypeInfo" object 1402 that defines/stores several object attributes and their relationships, according to an embodiment. FIG. 14 illustrates the hierarchy/composition of ResourceTypeInfo 1402, AttributeInfo 1404, Ref Info 1406, and ReferenceData 1408. Specifically, the "ResourceTypeInfo" object 1402 includes a "List <AttributeInfo>" that includes one or more "AttributeInfo" object 1404. Each "AttributeInfo" object 1404 may include an optional "Ref Info" object 1406. The "Ref Info" object 1406 includes a "ReferenceData" object 1408, a "selfnestedReference" object 1420, and a "referenceQueryType" object 1422, defined as follows:

Map <String, ReferenceData>

| boolean | selfnestedReference |
| enum | referenceQueryType |

The "ReferenceData" object 1408 includes a "parentAttributeInfo" object 1410, a "refAttributeInfo" object 1412, a "referenceName" object 1414, a "refType" object 1416, and a "referenceAttributeCanonicalName" object 1418, defined as follows:

| AttributeInfo | parentAttributeInfo |
| AttributeInfo | refAttributeInfo |
| String | referenceName |
| enum | refType [value: DIRECT/INDIRECT] |
| String | referenceAttributeCanonicalName |

Each of these objects is defined in further detail as follows. The "ResourceTypeInfo" object 1402 represents the in-memory view of an object. It contains one or more "AttributeInfo" objects 1404. Each "AttributeInfo" object 1402 represents the in-memory view of an attribute in the object. If the attribute defines a reference, a corresponding "Ref Info" object 1406 is used to house the reference information. The "Ref Info" object 1406 represents the in-memory view of the reference structure in a corresponding "AttributeInfo" object 1404. The "Ref Info" object 1406 holds all values defined in the reference attributes. It is multi-valued and thereby allows a resource to be linked to multiple other resources as "Map<String, ReferenceData>". An example of the "Ref Info" object 1406 is "<Group.members.value, <ReferenceData>>". The "Ref Info" object 1406 includes "selfNestedReference" 1420 which is a Boolean that indicates if the referrer is referring to any resource which has self-reference, and "referenceQueryType" 1422 which is an "enum" that indicates the kind of query which needs to be constructed to fetch these resources. The values that "referenceQueryType" 1422 can take are "[direct, indirect, self-nested]".

The "RefInfo" object 1406 also includes "ReferenceData" 1408 that represents the building block of a reference attribute. As described, with reference to "Ref Info" 1406, there is a "ReferenceData" 1408 for each value of the multi-valued reference attribute (e.g., "idcsRefResourceAttribute": ["Group.members.value", "AppRole.members.value"]). Each value is parsed into "parentAttributeInfo" 1410 ("AttributeInfo" of the referenced resource's parent), "refAttributeInfo" 1412 ("AttributeInfo" of the referenced resource), "referenceName" 1414 (name of the referenced attribute), and "refType" 1416 ("enum" with values [direct, indirect]). With reference to the [direct, indirect] values of enum, "direct" indicates that the resource is persisted directly and hence has a direct relationship, while "indirect" indicates that the resource has an indirect relationship and is linked via some other reference resource. For example, AppRole.members.value can have either "Groups" or "Users". A User may be referring to any group and it may either have a direct relationship with a group or an appRole which then has a group as a member. The second case would be an indirect relationship.

Figure 15:
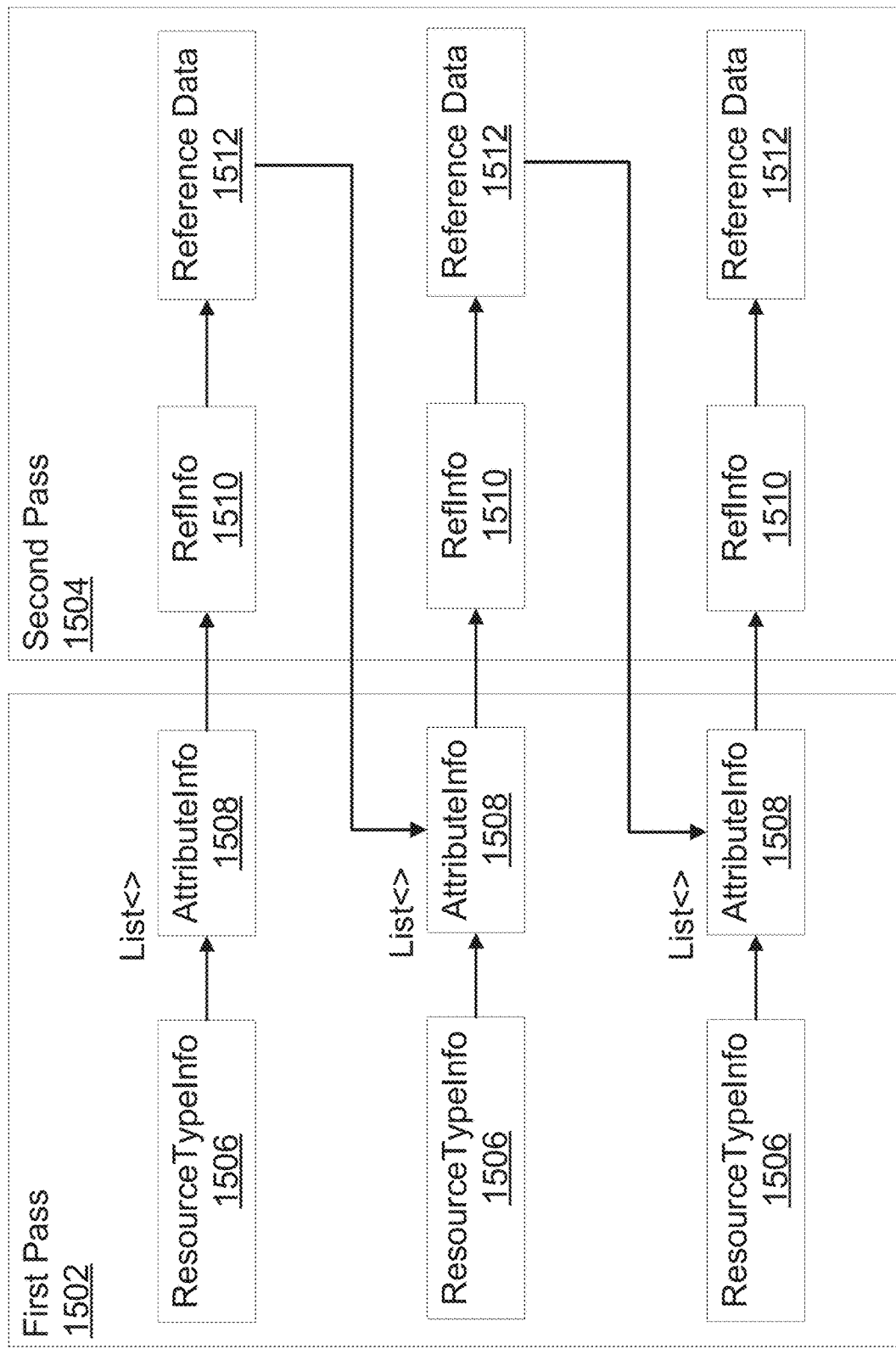
FIG. 15 is an example block diagram of a two-pass mechanism for building the references between objects in the server initialization phase, according to an embodiment.

Embodiments implement a two-pass loading mechanism during start-up for object reference linkage. As described, at the time of start-up, embodiments read the resources from the database and build their respective in-memory structural representation. Subsequently, embodiments build the object references using a two-pass loading mechanism. FIG. 15 is an example block diagram of the two-pass mechanism for building the references between objects in the server initialization phase in one embodiment. In the first pass 1502 the in-memory objects are built, and in the second pass 1504 the in-memory objects are linked. Specifically, in the first pass 1502 the objects are read from the database and the in-memory "ResourceTypeInfo" object 1506 and "AttributeInfo" object 1508 for each of the resources are built. The reference information between the objects is not built in the first pass 1502. In the second pass 1504 the references (if any) between objects are parsed. That is, a "Ref Info" object 1510 and "Reference Data" 1512 are built, and then linking of objects is constructed between each "Reference Data" 1512 and a corresponding "AttributeInfo" 1508. In one embodiment, for example, the respective "AttributeInfo" 1508 object state is stored (linked) with the "Reference Data" 1512 by setting the object in the constructor of "Reference Data" 1512 object.

Query Processor for Reference Attributes

In embodiments, IDCS stores identity data and needs to access resources that have references to other resources. As described above, embodiments extend the SCIM schema to define reference relationships for such resources. Further, embodiments provide functionality to optimally query such resources. The query is determined at run-time by the requested resource types and their reference relationships. One embodiment breaks down incoming queries for reference attributes and then structures an optimal SQL query to be used in a relational database management system ("RDBMS") in the backend. Embodiments extend the SCIM "filter" functionality to referenced resources. The functionality provided by embodiments for querying references is dynamic and can be used for any level of references among objects. It can also handle complex scenarios such as self-nesting and associative (i.e., chained) relationships between referred and referee objects. Embodiments may be implemented for any type of resources. However, in the below, example embodiments are described with reference to "User", "Group", and "Approle" resources, and "resources" and "objects" are used in an interchangeable manner.

As disclosed, embodiments classify resource relationships as "direct", "indirect", or "Self-nested", for "persisted" and "non-persisted" references. Embodiments of IDCS define and use these types of relationships and references. The SCIM RFC 7644 (herein incorporated by reference) defines a standard set of query parameters that can be used to filter, sort, and paginate data to satisfy a query initiated by a client of IDCS and return resources. Table 1 provides some example SCIM query parameters.

TABLE 1

Example SCIM query parameters

| Query parameter | Description | Example |
|---|---|---|
| filter | Used for filtering the result set | http://idcs.oracle.com/admin/v1/Users?filter=userName eq "Ben" searches for all users whose username attribute is equal to "ben" |
| sortBy | Used for sorting the search results | http://idcs.oracle.com/admin/v1/Users?filter=userName eq "Ben"&sortBy=lastMofiedDate searches for all users whose username attribute is equal to "ben" and sorts the search results by last Modified date stored for the users. |
| startIndex | Indicates the paginating index | http://idcs.oracle.com/admin/v1/Users?filter=userName eq "Ben"&sortBy=lastMofiedDate&startIndex=10 |
| count | Indicates how many records to fetch | http://idcs.oracle.com/admin/v1/Users?filter=userName eq "Ben"&sortBy=lastMofiedDate&count=20 |

When IDCS needs to process a request for a resource, the request may have referenced attributes as a part of the attributes to be fetched from the resource, when the resource is returned as per SCIM RFC 7644. The request may also have filters corresponding to the referenced attributes that are in the resource. Handling the filters on the referenced resources is non-trivial, especially when these filters are configurable in a variety of ways, e.g., when the filter may contain any combinations of referenced and non-referenced resources, and/or the filter may use any of the operators defined as per SCIM RFC 7644, and/or the filters may be "Simple" or "Complex" or "Logical" as per SCIM.

Since IDCS cannot pre-determine the type of requests and the associated filters that may be present in a query, the query processor needs to be able to generate the correct and optimal queries for any given scenario. From an implementation perspective, the resources reside in distinct tables in the database and thus the tables need to be "joined" in order to satisfy the query.

Accordingly, embodiments provide a reference query processor configured for processing requests for resources that implement the above-described reference attribute functionality. Embodiments use the in-memory structure described with reference to FIG. 14 to optimally serve the complex client-initiated queries with filters on the reference attributes. Embodiments provide a reference attribute query builder that can handle persisted and non-persisted references and can support direct, indirect, and "Self-nested" relationships among references. The reference attribute query builder supports two types of processing, related to: (a) reference attributes requested from a resource, and (b) filter conditions on the references in the requested resource. The reference attribute query builder determines and builds the optimal query at run-time based on requested reference attributes and presented filters. Further, since a resource can have references from more than one resource, the query builder is configured to efficiently query data from all these references and merge them.

Some examples of queries and their descriptions for a "User" resource are as follows:
  Get all groups for a specific user: GET/Users/<user id>?attributes=groups
  Get all appRoles for a specific user: GET/Users/<user id>?attributes=appRoles
  Get all direct users for a specific group: GET/Users?filter=groups[value eq "123" and type eq "direct"]
  Get all indirect users not for a specific group: GET/Users?filter=groups[not(value eq "123" and type eq "direct")]
  Get all direct users for a specific appRole: GET/Users?filter=appRoles[value eq "123" and type eq "direct"]
  Get all indirect users not for a specific appRole: GET/Users?filter=appRoles[not(value eq "123" and type eq "direct")]

An example of a query and its description for a "Group" resource is as follows:
  Get all members for a specific group: GET/Groups/<group id>? attributes=members An example of a query and its description for an "appRole" resource is as follows:
  Get all members for a specific appRole: GET/AppRoles/<appRole id>? attributes=members The reference query builder needs to address two requirements: the reference attributes requested, and the filter conditions. Embodiments of IDCS use RDBMS to persist the resources. Then, attributes requested by an IDCS client are translated as part of a SQL "SELECT clause" (a statement returning a "result set" of records from corresponding tables), and filter conditions are translated as a SQL "WHERE clause" (indicating criteria for rows to be retrieved). The query builder uses both parts to fetch the appropriate "result set" and construct and send the response back to the requesting IDCS client. Resource reference relationships are defined in the resource schema using "idcsRefResourceAttributes". A two-phase building of the reference structure is implemented at the time of start-up as described herein with reference to FIG. 15.

Figure 16:
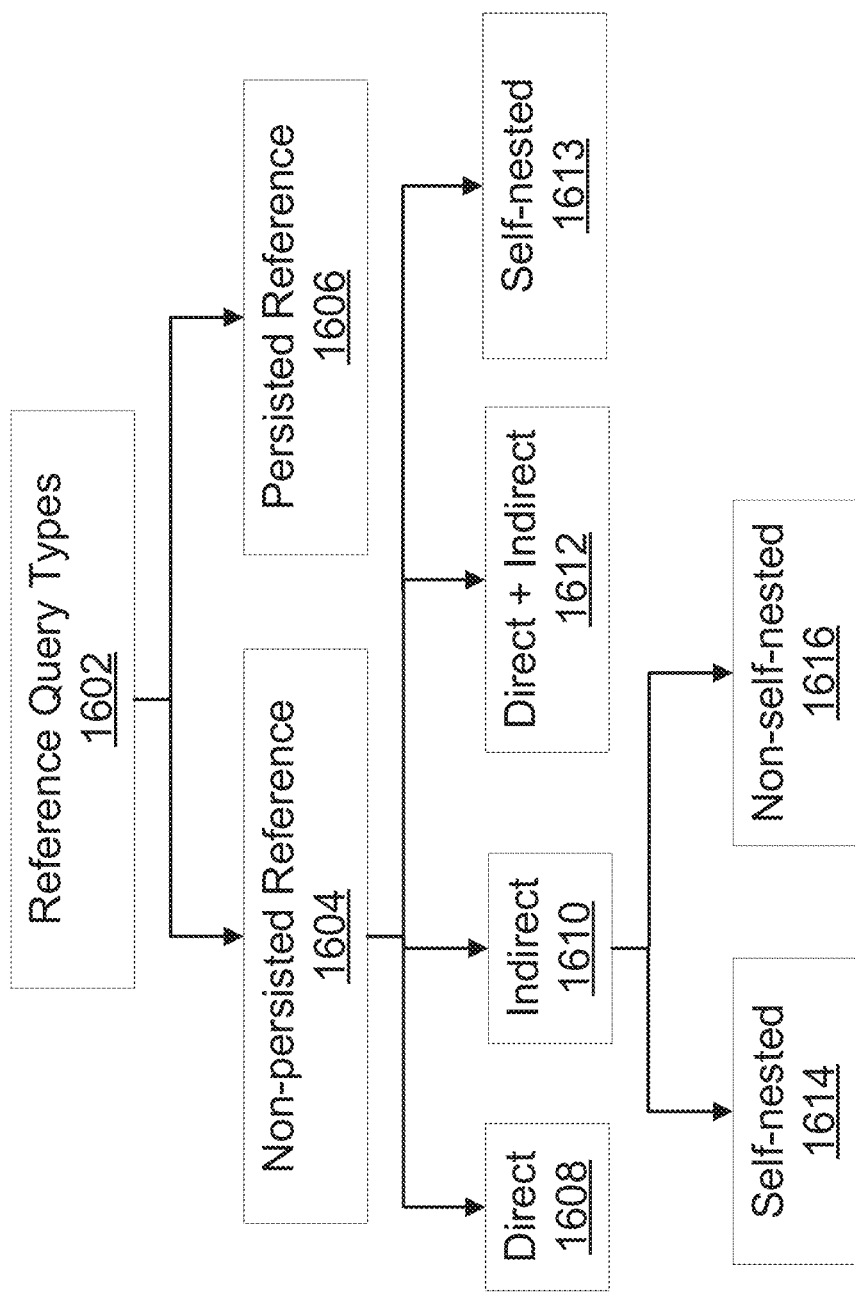
FIG. 16 is an example schematic hierarchical diagram of different reference query types according to an embodiment.

The reference query builder serves the reference attributes requested by the IDCS client according to filter conditions contained in the request sent by the IDCS client, as follows. When an IDCS client sends a request for a resource, the request may identify a specific set of attributes that have to be retrieved. This attributes-to-fetch set is first processed to form the following three sets, based on the metadata of each attribute defined in the schema:
  Non-persisted reference attribute set: the attributes whose values are not stored in the object but are derived from the referred resource, and have "idcsRefResourceAttributes" with certain attribute names from the referred resource
  Persisted reference attribute set: the attributes whose values are stored in the same object, and have "idcsRefResourceAttributes" with certain attribute names from the referred resource
  Regular (non-reference) attribute set: the attributes that do not have "idcsRefResourceAttributes" metadata The three attribute sets are then processed separately to generate queries to fetch their values from database. For persisted and non-persisted reference attribute sets, embodiments iterate the sets for each attribute, divide the use cases based on the direct, indirect, and "self-nested" relationship of the attribute and its referred attribute, and build a particular query to fetch the values of the attribute. FIG. 16 provides a schematic hierarchical diagram of different reference query types 1602 for persisted and non-persisted references, with direct, indirect, and self-nested relationships among referred objects and referees, and where simple, complex, and logical filter conditions are supported, according to an embodiment. Regular non-reference attribute queries are not illustrated in FIG. 16. Each reference query type 1602 may be for a persisted reference 1606 or for a non-persisted reference 1604. An example of a persisted reference 1606 is "Groups.members.displayName". Each persisted reference 1606 may be queried under simple, complex, or logical filter conditions. Each non-persisted reference 1604 may be direct 1608 (type eq "direct"), indirect 1610 (type eq "indirect"), "direct+indirect" 1612 (when type is not specified), or "self-nested" (type eq "self-nested") 1613. An example of a direct reference 1608 is "Groups→Users". Each direct reference 1608 may be queried under simple, complex, or logical filter conditions. Each "direct+indirect" reference 1612 may also be queried under simple, complex, or logical filter conditions. Each indirect reference 1610 may be self-nested 1614 or non-self-nested 1616. Each direct reference 1608 may also be self-nested or non-self-nested (not shown in the figure). An example of a self-nested reference 1614 is "Groups→Groups". An example of a non-self-nested reference 1616 is "appRole→Groups". Each self-nested reference 1614 may be queried under simple, complex, or logical filter conditions. Each non-self-nested reference 1616 may also be queried under simple, complex, or logical filter conditions.

Figure 17:
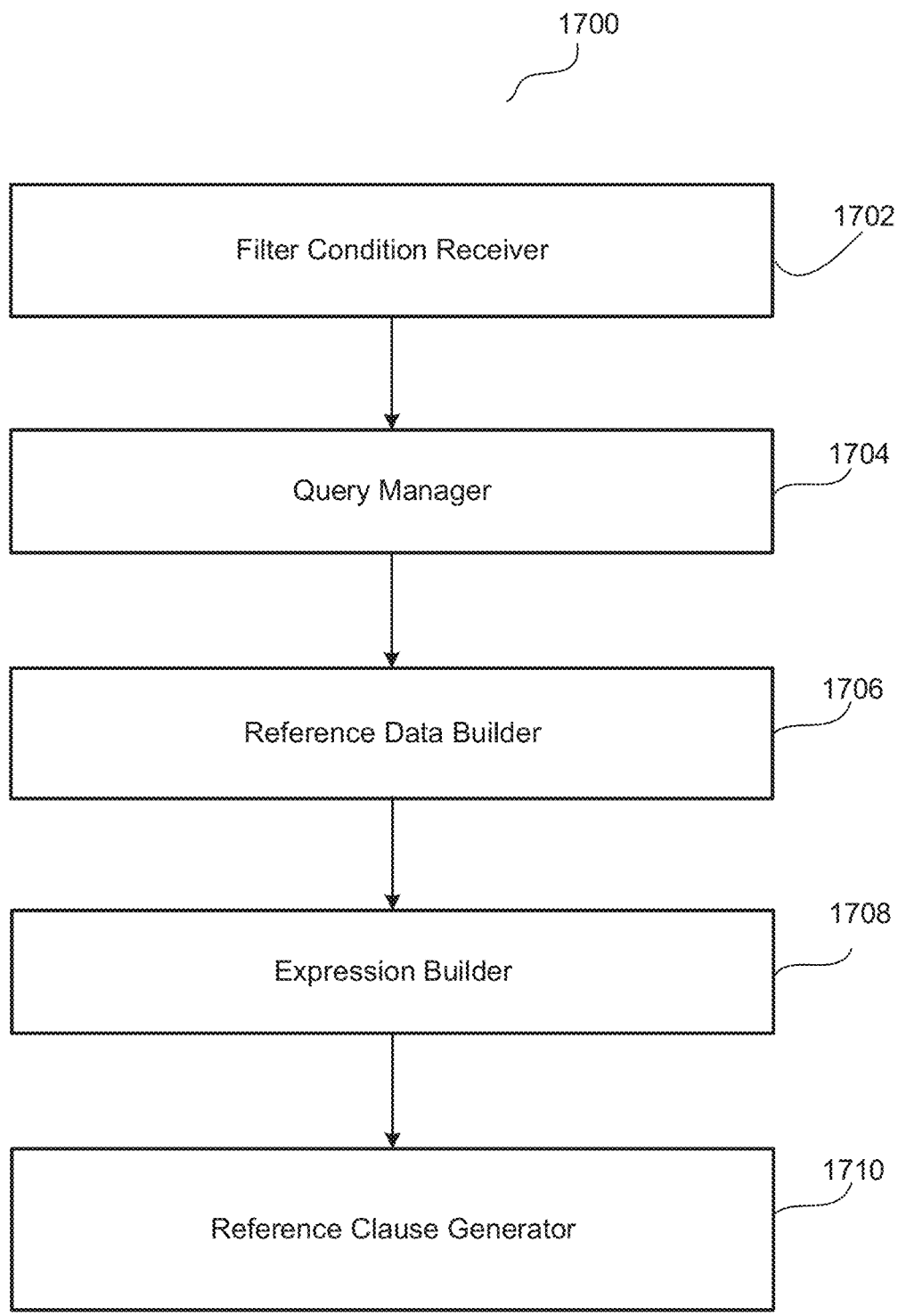
FIG. 17 is an example schematic diagram of a five-stage filter reference query builder/processor, according to an embodiment.

The following are examples of requests related to "User", "Group", and "AppRole" resources in embodiments that support queries on attributes with direct, indirect, and self-nested relationships among referred objects and referees:

Non-persisted reference attribute requested (e.g., User.appRoles, User.groups, Group.appRoles):
  Example 1: Direct search for non-self-nested reference attribute: "User.groups" if "Group" only contains "User" as members
  Example 2: Self-nested reference attribute: "User.groups" if "Group" contains both "User" and "Group" as members
  Example 3: Not self-nested but indirect reference attribute: "User.appRoles", "Group.appRoles"
Persisted reference attribute requested (e.g., Group.members, AppRole.members)
  Example: The attribute is persisted because some of its sub-attributes such as "members.value" and "members.type" are persisted, but some other sub-attributes such as "members.display" are not persisted and should be fetched from the referred resource table One embodiment provides a query builder for serving filter conditions contained in a request sent by an IDCS client. FIG. 17 is a schematic diagram of a filter reference query builder/processor, demonstrating five stages of building reference queries on filter conditions according to an embodiment. Each stage is constructed using the information from its previous stage as well as auxiliary information derived from the reference attributes described herein with reference to FIG. 14. The five stages include a filter condition receiver 1702, a query manager 1704, a reference data loader 1706, an expression builder 1708, and a reference clause generator 1710.

The filter condition receiver 1702 is the first stage and performs traversal and parsing of the "filter object". Specifically, when IDCS receives a client-initiated request for a resource with a filter (as per SCIM), the filter string is parsed and a "filter object" is constructed as a pre-processing step. Table 2 provides an example valid set of filter operators that can be used on a resource attribute in one embodiment.

TABLE 2

Example valid set of filter operators

| Binary operators | | |
|---|---|---|
| Operator | Implied as | Example filter string |
| eq | equals | username eq "Ben Jensen" |
| co | contains | username co "Ben Jensen" |
| sw | Starts with | Username sw "ben" |
| ew | Ends with | Username ew "sen" |
| ne | Not equals | Phone.type ne "home" |
| gt | Greater than | Count gt "2" |
| ge | Greater than or equal to | Count ge "2" |
| lt | Less than | Count lt "2" |
| ge | Less than or equal to | Count le "2" |

| Operator | Implied as | Example |
|---|---|---|
| Unary operator | | |
| pr | Is Present | Username pr |
| Logical operator | | |
| and | and | Username eq "ben" and phone.type eq "home" |
| or | or | Username eq "ben" or username eq "alex" |
| not | Not of some some value | Not(username eq "alex") |

The following provides examples for various filter types in embodiments. A simple filter is a filter with any of the binary or unary operators used on a resource attribute (there can only be one resource attribute in a simple filter), for example:
  username eq "Ben Jensen"
  Username co "ben"
  username pr
A logical filter is a filter made of multiple simple filters used in combination with logical operator, for example:
  username sw "ben" or username sw "alex"
  username co "test" and displayName co "test"
A complex filter is used on complex attributes such as name, emails, phone in the examples provided in Table 2, according to an embodiment.

TABLE 2

Examples of complex attributes

| "Name " : { "Firstname": "ben", "lastname":"sen", "middle name" :"jen" } | "emails":{ "type": "home", "value":"test@abc.com" } | "phone":{ "type": "home", "value":"123-999-9999" } |
|---|---|---|

Each complex attribute has sub-attributes defined, and a filter condition is applied on the sub-attribute in reference to its parent attribute. For example, as shown in Table 2, "emails" is a complex attribute, also called a parent attribute. "Emails" has two sub-attributes: type and value. In a complex filter, the filter condition is applied to emails.type or emails.value. Examples of filter on complex attributes are:
  name[firstname eq "ben"]
  emails[type eq "home" and value co "test"]
When a filter string such as those described above is passed to the IDCS, IDCS APIs parse the string and build the filter object and identify the filter type as simple/complex/logical, as shown in the below example functionality in one embodiment:

```
Class Filter {
  enum Operator {
    EQUALS("eq"),
    NOT_EQUALS("ne"),
    CONTAINS("co"),
    BEGINS_WITH("sw"),
    ENDS_WITH("ew"),
    GREATER_EQUAL("ge"),
    GREATER_THAN("gt"),
    LESS_EQUAL("le"),
    LESS_THAN("lt"),
    IS_PRESENT("pr"),
  }
  private String propertyName;
  private Operator op;
  private String propertyVal;
  private Filter left;
  private Filter right;
  private boolean simpleFilter;
  private boolean complexFilter;
  private boolean filterOnNonPersistedComplexReferenceAttr;
  private boolean filterOnPersistedComplexReferenceAttr;
  private boolean isPartOfComplexFilter;
  private boolean isPartOfLogicalFilter;
}
```

The filter object is a tree-like representation of the decomposed filter string. The filter condition receiver 1702 takes the filter object as its input and parses/traverses it to determine the query type as illustrated in FIG. 16. Specifically, the filter condition receiver 1702 parses/traverses the filter object to deduce the following information:

- The attribute on which the filter is applied determines if the query is for persisted or non-persisted references.
- If the filter is configured to be applied on "type", the "value" of "type" determines if the query is for a direct or an indirect reference. If the "value" is not specified, then the filter reference query builder needs to fetch both direct and indirect resources.
- An indirect reference can be either self-nested or non-self-nested.
- Each filter can be of type simple, logical, or complex, as per SCIM.
- Each of the logical filters and simple filters are passed as inputs to the first stage. For complex filters, the entire complex filter is treated as a single entity and is passed to the first stage. That is, when the query manager 1704 processes the filter object, complex filters are processed in their entirety for a single query, whereas simple/logical filters are processed individually. More specifically, after the filter string is received as input, embodiments parse the string, read each attribute and operator, and initialize and construct filter object using the read values. Then, embodiments load attribute information for each attribute in the filter object, read attribute information object (to identify if the attribute is a reference persisted/non-persisted attribute), and set the flags in filter object.

The second stage is the filter query manager 1704 which is the filter data pre-processor. Specifically, once the query type is determined in the first stage, an instance of the query manager 1704 is instantiated, which also holds a reference to the filter object. The query manager 1704 is responsible for constructing the resulting SQL query on the filter at run-time. For each of the filters that need to be processed by the query manager 1704, corresponding filter reference data is built by the query manager 1704. Specifically, this pre-processor reads the filter object and builds an instance of "ReferenceProcessingData" described in further detail below. Every query manager 1704 builds the "ReferenceProcessingData" based on the query type, i.e., direct, indirect, direct/indirect, and persisted. Then, the "ReferenceProcessingData" is loaded at the third stage which is the reference data loader 1706.

"ReferenceProcessingData" uses the "RefInfo" and "ReferenceData" objects which are built during server initialization as described herein with reference to FIG. 15. The following functionality is an example "Common ReferenceProcessingData":

Map<String, FilterData>filterDataMap
Filter rootFilter
CommonDBMapping commonDBMapping
resourcename In the above, each "FilterData" includes the following functionality:

AttributeInfo filterattributeinfo
Filter filter
List<FilterReferenceData>filterreferenceDatalist In the above, each "FilterReferenceData" (which refers to reference data built during server initialization) includes the following functionality:

ReferenceData referenceData
DataProviderMapping dbMapping
SQLComponents sqlcomponents In the above, each "SQLComponents" includes the following functionality:

List<String>selectColumns
List<String>whereClauses
String fromClause
String connectByclause The "Common ReferenceProcessingData" in one embodiment extends to "ReferenceProcessingData" which includes the following functionality:

boolean anyObjectTableAttrPresent
boolean anySubObjectTableAttrPresent
boolean anyFilterOnValueAttr
Map <String, CommonDBMapping>IndirectRefDBMap More specifically, "Common ReferenceProcessingData" contains the following data required for processing a query:

Map<String, FilterData>filterDataMap—has one or more filter objects. For a complex filter there can be more than one.
Filter rootFilter—has the instance of the main filter.
CommonDBMapping commonDBMapping—has all the required data provider attributes.
String resourceName—has the resource name of the endpoint.

"FilterData" is an object that stores the relevant reference information pertaining to each of the filter objects in a filter, and contains the following data:

AttributeInfo filterAttributeInfo—all attribute details of the filter attribute.
Filter filter—a simple filter object being evaluated.
List<FilterReferenceData>filterReferenceData—list of IDCS reference attributes. "FilterReferenceData" has the reference to the "ReferenceData" object for the attribute and contains the following data:
ReferenceData referenceData—has the reference to the referenceData object.
DataProviderMapping dataProviderMapping—has the attributes data provider mapping used for building queries.
SqlComponents sqlcomponents—described below.

"SqlComponents" is the object representation of the query to be constructed, and contains the following data:

List<String>selectColumns—has the list of columns which is part of the "select clause".
List<String>whereClauses—has the list of "where" conditions used for building the query.
String fromClause—has the "from clause" for the query.
String connectByclause—has"connectBy clause" (if any).

The fourth stage is the query expression builder 1708. Each of the query managers 1704 instantiates a respective query expression builder 1708 that uses the "ReferenceProcessingData" and builds the "ReferenceSqlClause". "ReferenceSqlClause" is the in-memory representation of a query generated by the expression builder 1708. Each expression builder 1708 builds the query for the respective query type (e.g., direct, indirect, direct and indirect, persisted) such as "connect by" clause for self-nested references, nested queries for indirect references, etc.

Figure 18:
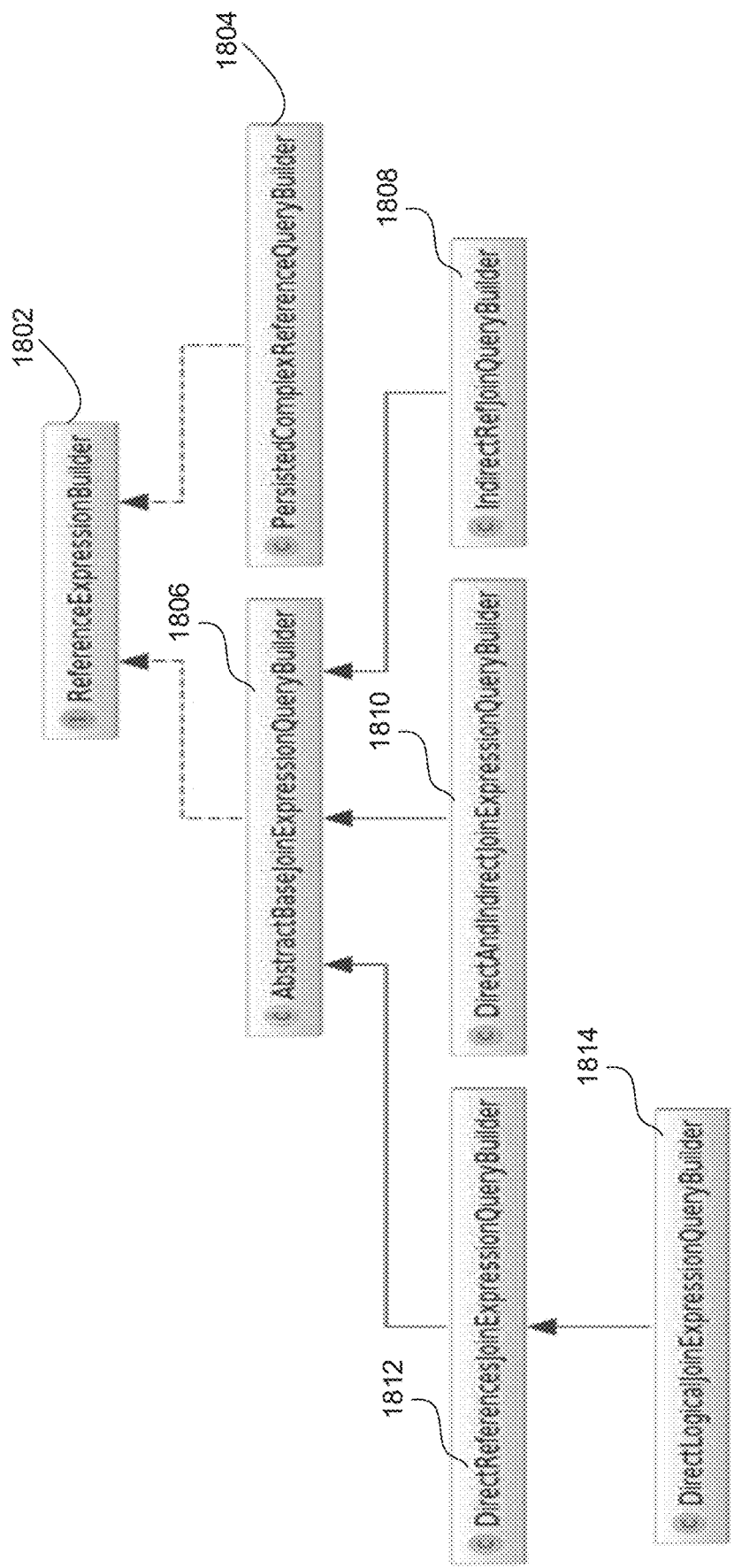
FIG. 18 is an example block diagram of classes in the expression builder of FIG. 17, according to an embodiment.

FIG. 18 is a block diagram of classes in the expression builder 1708 in one embodiment. 1802 is a Java Interface that defines the overall contract for the expression builder class hierarchy. 1804 is a Java concrete class having the logic/implementation for generating the reference query for persisted reference attributes with complex filters. 1806 is a Java Abstract Class that defines the abstract implementation for generating the SQL Groups and JOIN expressions. The connections from 1802 to 1804 and 1806 represent "Inheritance" ("is-a" relationship in Object Oriented Design). 1808, 1810, and 1812 are concrete implementations of 1806. The connections from 1806 to 1808, 1810, and 1812 represent "Inheritance" ("is-a" relationship in Object Oriented Design). 1808 is a Java class that has the implementation for generating the SQL Groups and JOIN expressions involving indirect references (INDIRECT_REF) along with a simple, complex, or logical filter. 1810 is a Java class that has the implementation for generating the SQL Groups and JOIN expressions for direct and indirect references along with a simple, complex, or logical filter. 1812 is a Java class that has the implementation for generating the SQL Groups and JOIN expressions for direct references. 1814 is a Java class that has the implementation for generating the SQL Groups and JOIN expressions for direct references along with a logical filter. The connection from 1812 to 1814 represents "Inheritance" ("is-a" relationship in Object Oriented Design).

The fifth and last stage is the reference query generator 1710. When the main SQL generator is fully constructed, it invokes the "buildSql( )" on "ReferenceSqlClause" which will bind the query parameters and generate the "where" clause for the main SQL. Specifically, each query manager 1704 builds the query components required for generating the "where" clause for the filter. These where clauses are SQL statements generated to fetch data from a different table (a reference resource table). Filter conditions are applied on the reference table to fetch relevant results. "ReferenceSqlClause" exposes method "buildSql" that eventually combines all components of the query together to get the final query on the reference table. "ReferenceSqlClause" contains the following data:

ReferenceProcessingData—data which is processed and built by the query manager 1704 after parsing the filter.

SqlComponent sqlComponent—has the main query SQL components.

SqlComponent outerSqlComponent—has the outer queries if any.

Boolean connectByquery—indicates if it is a "connect by" query or not. When a resource contains hierarchal data, those nested relationships can be fetched using the SQL's "connect by" clause. For example, assuming GroupA has members [User1, User2, GroupB], and GroupB has members [user3, user4], when all users who belong to GroupA are requested, the result is User1 (direct), User2 (direct), User3 (indirect through GroupB), and User4 (indirect through GroupB). That is, since GroupB is a member of GroupA, all its members become members of GroupA indirectly, and SQL provides functionality to retrieve this data store from corresponding tables using "connect by" queries.

String buildSql( )—returns the complete query after processing the sqlComponents in the current instance.

Figure 19A:
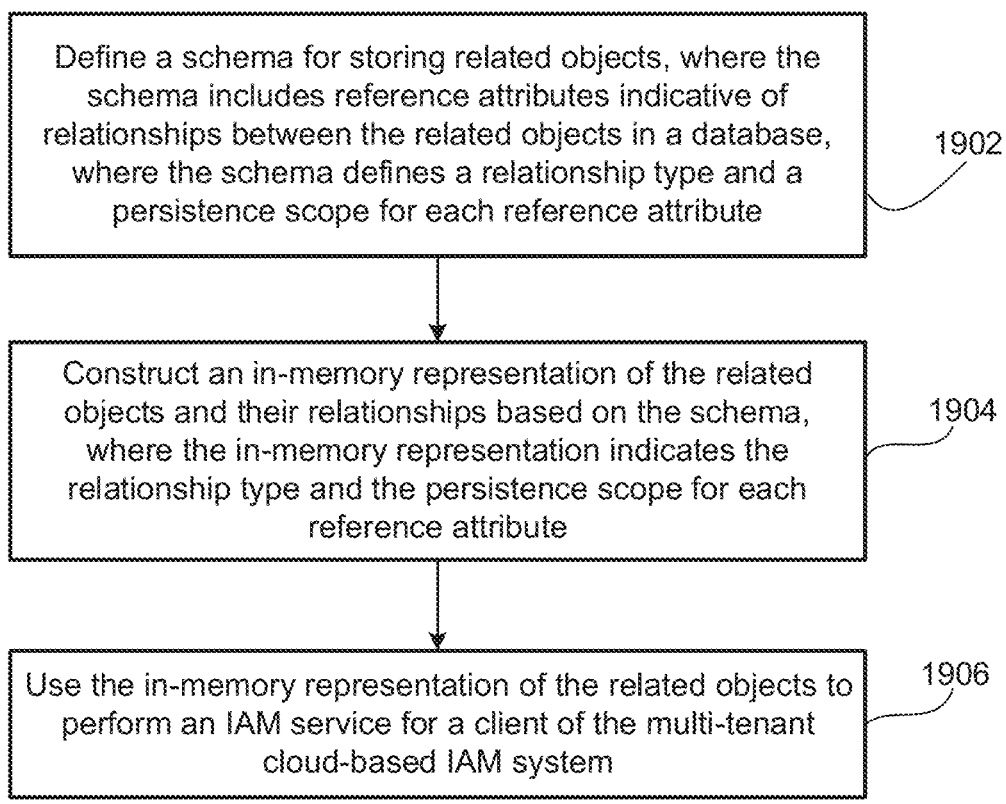
FIGS. 19A and 19B are flow diagrams of functionality for defining and using reference attributes and for reference attribute query processing in accordance with embodiments.
Figure 19B:
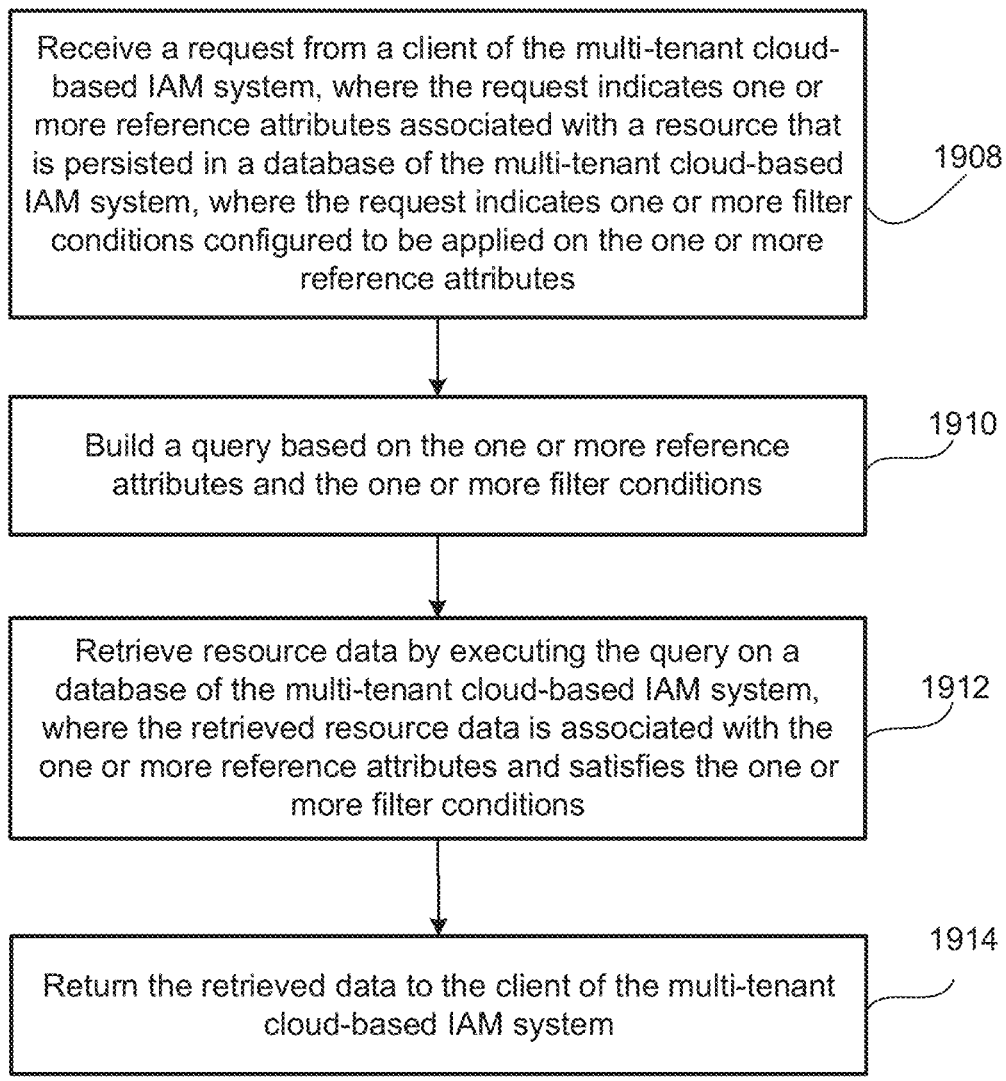

FIGS. 19A and 19B are flow diagrams of functionality for storing and using object relationships and for reference attribute query processing in a multi-tenant cloud-based IAM system in accordance with embodiments. In one embodiment, the functionality of the flow diagrams of FIGS. 19A and 19B is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Referring now to FIG. 19A, a flow diagram is illustrated for an example method for storing and using object relationships in a multi-tenant cloud-based IAM system.

At 1902 a schema is defined for storing related objects, where the schema includes reference attributes indicative of relationships between the related objects in a database, and where the schema defines a relationship type and a persistence scope for each reference attribute. The related objects may include, for example, users, groups, or "AppRoles" configured and/or used by components of the multi-tenant cloud-based IAM system such as any of the IDCS microservices 614 providing cloud-based IAM services to tenants of the multi-tenant cloud-based IAM system as described herein with reference to FIG. 6.

In one embodiment, a microservice is a self-contained module that can communicate with other modules/microservices, and each microservice has an unnamed universal port that can be contacted by others. In one embodiment, the microservice is a run-time component/process. In one embodiment, the microservice is stateless and retrieves data from the database to perform an identity management service. In one embodiment, the database and the microservice are configured to scale independently of one another. In one embodiment, the database includes a distributed data grid. In one embodiment, one or more applications (e.g., any application illustrated at 602 in FIG. 6) implement IAM functionality provided by components of the multi-tenant cloud-based IAM system (e.g., microservices 614 in FIG. 6).

At 1904 an in-memory representation of the related objects and their relationships is constructed based on the schema, where the in-memory representation indicates the relationship type and the persistence scope for each reference attribute, and at 1906 the in-memory representation of the related objects is used to perform an IAM service for a client of the multi-tenant cloud-based IAM system.

In one embodiment, the relationship type indicates whether a corresponding reference attribute is indicative of a direct relationship, an indirect relationship, or a self-nested relationship, and the persistence scope indicates whether a corresponding reference attribute is persisted or non-persisted. The direct relationship indicates that corresponding referrer and referred objects are directly related. The indirect relationship indicates that corresponding referrer and referred objects are connected through at least one other object. The self-nested relationship indicates that corresponding referrer and referred objects are the same object. A persisted reference attribute indicates that a corresponding referrer object houses a reference to a corresponding referred object and the reference is persisted in a database record of the corresponding referrer object. A non-persisted reference attribute indicates that a reference from a corresponding referrer object to a corresponding referred object is not persisted in a database record of the corresponding referrer object.

In one embodiment, constructing the in-memory representation of the related objects and their relationships is performed during server start-up. In one embodiment, a two-pass loading mechanism is implemented during the server start-up, including, in a first pass, building in-memory objects that represent the related objects, and, in a second pass, linking the in-memory objects based on their relationships.

Referring now to FIG. 19B, a flow diagram of an example method for reference attribute query processing in a multi-tenant cloud-based IAM system is provided.

At 1908 a request is received from a client of the multi-tenant cloud-based IAM system, where the request indicates one or more reference attributes associated with a resource that is persisted in a database of the multi-tenant cloud-based IAM system, and the request indicates one or more filter conditions configured to be applied on the one or more reference attributes. The reference attributes may correspond to related objects that include, for example, users, groups, or "AppRoles" configured and/or used by components of the multi-tenant cloud-based IAM system such as any of the IDCS microservices 614 providing cloud-based IAM services to tenants of the multi-tenant cloud-based IAM system as described herein with reference to FIG. 6.

In one embodiment, a microservice is a self-contained module that can communicate with other modules/microservices, and each microservice has an unnamed universal port that can be contacted by others. In one embodiment, the microservice is a run-time component/process. In one embodiment, the microservice is stateless and retrieves data from the database to perform an identity management service. In one embodiment, the database and the microservice are configured to scale independently of one another. In one embodiment, the database includes a distributed data grid. In one embodiment, one or more applications (e.g., any application illustrated at 602 in FIG. 6) implement IAM functionality provided by components of the multi-tenant cloud-based IAM system (e.g., microservices 614 in FIG. 6).

At 1910 a query is built based on the one or more reference attributes and the one or more filter conditions, and at 1912 resource data is retrieved by executing the query on a database of the multi-tenant cloud-based IAM system, where the retrieved resource data is associated with the one or more reference attributes and satisfies the one or more filter conditions.

At 1914 the retrieved data is returned to the client of the multi-tenant cloud-based IAM system.

In one embodiment, the query is a SQL query executed at run-time, and the database is an RDBMS in the backend of the multi-tenant cloud-based IAM system.

In one embodiment, the resource includes references from multiple other resources, and data is queried from all of the multiple other resources and then merged into the retrieved resource data.

In one embodiment the resource is stored in the database of the multi-tenant cloud-based IAM system using a schema configured for storing related objects, where the one or more reference attributes are indicative of relationships between the related objects in the database, and the schema defines a relationship type and a persistence scope for each reference attribute.

In one embodiment, retrieving the resource data is performed using an in-memory representation of the related objects and their relationships, where the in-memory representation is constructed based on the schema, and the in-memory representation indicates the relationship type and the persistence scope for each reference attribute. The relationship type indicates whether a corresponding reference attribute is indicative of a direct relationship, an indirect relationship, or a self-nested relationship, and the persistence scope indicates whether a corresponding reference attribute is persisted or non-persisted.

The direct relationship indicates that corresponding referrer and referred objects are directly related. The indirect relationship indicates that corresponding referrer and referred objects are connected through at least one other object. The self-nested relationship indicates that corresponding referrer and referred objects are the same object. A persisted reference attribute indicates that a corresponding referrer object houses a reference to a corresponding referred object and the reference is persisted in a database record of the corresponding referrer object. A non-persisted reference attribute indicates that a reference from a corresponding referrer object to a corresponding referred object is not persisted in a database record of the corresponding referrer object.

In one embodiment, retrieving the resource data includes: constructing a first set of reference attributes and a second set of reference attributes, where the first set of reference attributes is a first subset of the one or more reference attributes that are indicated as persisted, where the second set of reference attributes is a second subset of the one or more reference attributes that are indicated as non-persisted; and processing the first set and the second set separately to retrieve the resource data. In one embodiment, the first set is processed under an applicable one of simple, complex, or logical filter conditions. In one embodiment, the second set is divided into further subsets of reference attributes corresponding to relationship types of direct, indirect, self-nested, and non-self-nested, where a respective query is built to separately fetch values of attributes associated with each of the further subsets under an applicable one of simple, complex, or logical filter conditions.

In one embodiment, the in-memory representation of the related objects and their relationships is constructed during server start-up. In one embodiment, a two-pass loading mechanism is implemented during the server start-up, including: in a first pass, building in-memory objects that represent the related objects; and in a second pass, linking the in-memory objects based on their relationships.

In one embodiment, the request is received from an application that implements IAM functionality provided by components of the multi-tenant cloud-based IAM system, and the components include one or more microservices.

As disclosed, embodiments define and implement reference attributes that provide a mechanism to identify associative (direct/indirect) relationships between the referrer and referred objects, including self-nesting. Embodiments support persisted and non-persisted references. Embodiments provide the structural semantics for optimally storing references. Embodiments disclose the description of references for their types (persisted and non-persisted) and relationship (direct, indirect, and self-nested), as well as how IDCS constructs in-memory representation of resources. Embodiments can use the schema to process complex queries on the reference attributes. The schema and the query mechanism may be implemented/used in any microservice of IDCS for linking related objects.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method for storing and using object relationships in a multi-tenant cloud-based identity and access management (IAM) system, the method comprising:
    defining a schema for storing related objects, wherein the schema includes reference attributes indicative of relationships between the related objects in a database and linking the objects, wherein the schema defines a relationship type and a persistence scope for each reference attribute and each of the related objects comprises a System for Cross-domain Identity Management (SCIM) based object;
    constructing an in-memory representation of the related objects and their relationships based on the schema, wherein the in-memory representation indicates the relationship type and the persistence scope for each reference attribute; and using the in-memory representation of the related objects to perform an IAM service for a client of the multi-tenant cloud-based IAM system, the IAM service comprising a request for a first object;

the relationship type defined for each of the reference attributes and indicating one of: whether a corresponding reference attribute is indicative of a direct relationship, an indirect relationship, and a self-nested relationship between related objects comprising a referrer object and a referred object, the persistence scope indicating whether a corresponding reference attribute is persisted or non-persisted, wherein the direct relationship indicates that a corresponding referrer object and referred object are directly related, the indirect relationship indicates that the corresponding referrer object and referred object are connected through at least one other object and the self-nested relationship indicates that the corresponding referrer object and referred object are a same object; and the reference attributes are SCIM based and enable navigation from a referee object to a reference object and navigation from the reference object to the referee object.

2. The method of claim 1, wherein a persisted reference attribute indicates that the corresponding referrer object houses a reference to the corresponding referred object and the reference is persisted in a database record of the corresponding referrer object.

3. The method of claim 1, wherein a non-persisted reference attribute indicates that a reference from the corresponding referrer object to the corresponding referred object is not persisted in a database record of the corresponding referrer object.

4. The method of claim 1, wherein the constructing of the in-memory representation of the related objects and their relationships is performed during server start-up.

5. The method of claim 4, wherein a two-pass loading mechanism is implemented during the server start-up, comprising:

in a first pass, building in-memory objects that represent the related objects; and in a second pass, linking the in-memory objects based on their relationships.

6. The method of claim 1, wherein the database is a distributed data grid.

7. The method of claim 1, wherein the IAM service is performed by one or more applications that implement IAM functionality provided by components of the multi-tenant cloud-based IAM system.

8. The method of claim 7, wherein the components comprise one or more microservices.

9. A non-transitory computer-readable medium having instructions stored thereon that, when executed by a processor, cause the processor to perform storing and using object relationships in a multi-tenant cloud-based identity and access management (IAM) system, the performing comprising:

defining a schema for storing related objects, wherein the schema includes reference attributes indicative of relationships between the related objects in a database and linking the objects, wherein the schema defines a relationship type and a persistence scope for each reference attribute and each of the related objects comprises a System for Cross-domain Identity Management (SCIM) based object;

constructing an in-memory representation of the related objects and their relationships based on the schema, wherein the in-memory representation indicates the relationship type and the persistence scope for each reference attribute; and using the in-memory representation of the related objects to perform an IAM service for a client of the multi-tenant cloud-based IAM system, the IAM service comprising a request for a first object;

the relationship type defined for each of the reference attributes and indicating one of: whether a corresponding reference attribute is indicative of a direct relationship, an indirect relationship, and a self-nested relationship between related objects comprising a referrer object and a referred object, the persistence scope indicating whether a corresponding reference attribute is persisted or non-persisted, wherein the direct relationship indicates that a corresponding referrer object and referred object are directly related, the indirect relationship indicates that the corresponding referrer object and referred object are connected through at least one other object and the self-nested relationship indicates that the corresponding referrer object and referred object are a same object; and the reference attributes are SCIM based and enable navigation from a referee object to a reference object and navigation from the reference object to the referee object.

10. A system comprising:

one or more processors; and a computer-readable medium having instructions stored thereon that, when executed by the processors, cause the processors to perform storing and using object relationships in a multi-tenant cloud-based identity and access management (IAM) system, the performing comprising:

defining a schema for storing related objects, wherein the schema includes reference attributes indicative of relationships between the related objects in a database and linking the objects, wherein the schema defines a relationship type and a persistence scope for each reference attribute and each of the related objects comprises a System for Cross-domain Identity Management (SCIM) based object;

constructing an in-memory representation of the related objects and their relationships based on the schema, wherein the in-memory representation indicates the relationship type and the persistence scope for each reference attribute; and using the in-memory representation of the related objects to perform an IAM service for a client of the multi-tenant cloud-based IAM system, the IAM service comprising a request for a first object;

the relationship type defined for each of the reference attributes and indicating one of: whether a corresponding reference attribute is indicative of a direct relationship, an indirect relationship, and a self-nested relationship between related objects comprising a referrer object and a referred object, the persistence scope indicating whether a corresponding reference attribute is persisted or non-persisted, wherein the direct relationship indicates that a corresponding referrer object and referred object are directly related, the indirect relationship indicates that the corresponding referrer object and referred object are connected through at least one other object and the self-nested relationship indicates that the corresponding referrer object and referred object are a same object; and the reference attributes are SCIM based and enable navigation from a referee object to a reference object and navigation from the reference object to the referee object.

11. The system of claim 10, wherein a persisted reference attribute indicates that the corresponding referrer object houses a reference to the corresponding referred object and the reference is persisted in a database record of the corresponding referrer object.

12. The system of claim 10, wherein a non-persisted reference attribute indicates that a reference from the corresponding referrer object to the corresponding referred object is not persisted in a database record of the corresponding referrer object.

13. The system of claim 10, wherein the constructing of the in-memory representation of the related objects and their relationships is performed during server start-up.

14. The system of claim 13, wherein a two-pass loading mechanism is implemented during the server start-up, comprising:

in a first pass, building in-memory objects that represent the related objects; and in a second pass, linking the in-memory objects based on their relationships.

15. The system of claim 10, wherein the database is a distributed data grid.

16. The system of claim 10, wherein the IAM service is performed by one or more applications that implement IAM functionality provided by components of the multi-tenant cloud-based IAM system.

17. The system of claim 16, wherein the components comprise one or more microservices.

18. The non-transitory computer-readable medium of claim 9, wherein a persisted reference attribute indicates that the corresponding referrer object houses a reference to the corresponding referred object and the reference is persisted in a database record of the corresponding referrer object.

19. The non-transitory computer-readable medium of claim 9, wherein a non-persisted reference attribute indicates that a reference from the corresponding referrer object to the corresponding referred object is not persisted in a database record of the corresponding referrer object.

20. The non-transitory computer-readable medium of claim 9, wherein the constructing of the in-memory representation of the related objects and their relationships is performed during server start-up using a two-pass loading mechanism comprising:

in a first pass, building in-memory objects that represent the related objects; and in a second pass, linking the in-memory objects based on their relationships.

* * * * *

UNITED STATES PATENT AND TRADEMARK OFFICE
CERTIFICATE OF CORRECTION

PATENT NO. : 11,308,132 B2
APPLICATION NO. : 15/991057
DATED : April 19, 2022
INVENTOR(S) : Srinivasan et al.

It is certified that error appears in the above-identified patent and that said Letters Patent is hereby corrected as shown below:

On the Title Page

On page 5, Column 1, Item (56) under Other Publications, Line 12, delete "Cast" and insert -- Case --, therefor.

On page 5, Column 1, Item (56) under Other Publications, Line 30, delete "201 60829102122" and insert -- 20160829102122 --, therefor.

On page 6, Column 1, Item (56) under Other Publications, Line 5, delete "Applt" and insert -- AppIt --, therefor.

In the Drawings

On sheet 2 of 21, in FIG. 2, under Reference Numeral 218, Line 2, delete "On Premise" and insert -- On-Premise --, therefor.

On sheet 3 of 21, in FIG. 3, under Reference Numeral 218, Line 2, delete "On Premise" and insert -- On-Premise --, therefor.

On sheet 3 of 21, in FIG. 3, under Reference Numeral 228, Line 1, delete "Open ID" and insert -- OpenID --, therefor.

On sheet 4 of 21, in FIG. 4, under Reference Numeral 218, Line 2, delete "On Premise" and insert -- On-Premise --, therefor.

On sheet 11 of 21, in FIG. 10, under Reference Numeral 1010, Line 3, delete "Open ID" and insert -- OpenID --, therefor.

On sheet 11 of 21, in FIG. 10, under Reference Numeral 1011, Line 2, delete "Open ID" and insert -- OpenID --, therefor.

Signed and Sealed this
Eleventh Day of October, 2022

*Katherine Kelly Vidal*

Katherine Kelly Vidal
*Director of the United States Patent and Trademark Office*

CERTIFICATE OF CORRECTION (continued)
U.S. Pat. No. 11,308,132 B2

In the Specification

In Column 5, Lines 37-38, delete "Open ID" and insert -- OpenID --, therefor.

In Column 7, Line 23, delete "Open ID" and insert -- OpenID --, therefor.

In Column 9, Line 66, delete "Open ID" and insert -- OpenID --, therefor.

In Column 13, Line 21, delete "Management++("SCIM++")," and insert -- Management++ ("SCIM++"), --, therefor.

In Column 13, Line 22, delete "Open ID" and insert -- OpenID --, therefor.

In Column 13, Line 23, delete "Open ID" and insert -- OpenID --, therefor.

In Column 13, Line 25, delete "Open ID" and insert -- OpenID --, therefor.

In Column 13, Line 32, delete "Open ID" and insert -- OpenID --, therefor.

In Column 13, Line 37, delete "Open ID" and insert -- OpenID --, therefor.

In Column 13, Line 47, delete "("RP"s))" and insert -- ("RPs")) --, therefor.

In Column 18, Line 32, delete "Open ID" and insert -- OpenID --, therefor.

In Column 19, Line 27, delete "Open ID" and insert -- OpenID --, therefor.

In Column 19, Line 30, delete "Open ID" and insert -- OpenID --, therefor.

In Column 24, Line 29, delete "Open ID" and insert -- OpenID --, therefor.

In Column 25, Line 34, delete "Open ID" and insert -- OpenID --, therefor.

In Column 25, Line 66, delete "Open ID" and insert -- OpenID --, therefor.

In Column 26, Line 15, delete "Open ID" and insert -- OpenID --, therefor.

In Column 26, Line 38, delete "Open ID" and insert -- OpenID --, therefor.

In Column 26, Line 41, delete "Open ID" and insert -- OpenID --, therefor.

In Column 27, Line 38, delete "JW" and insert -- JWT --, therefor.

In Column 33, Line 20, delete ""schemes":" and insert -- "schemas": --, therefor.

In Column 33, Line 20, delete "schemes" and insert -- schemas --, therefor.

CERTIFICATE OF CORRECTION (continued)
U.S. Pat. No. 11,308,132 B2

In Column 34, Line 52, delete "[Group.id"]," and insert -- ["Group.id"], --, therefor.

In Column 35, Line 26, delete ""cannonicalValues":" and insert -- "canonicalValues": --, therefor.

In Column 35, Line 52, delete ""canonical Values"" and insert -- "canonicalValues" --, therefor.

In Column 36, Line 25, delete "Ref Info" and insert -- RefInfo --, therefor.

In Column 36, Lines 29-30, delete ""Ref Info"" and insert -- "RefInfo" --, therefor.

In Column 36, Line 30, delete ""Ref Info"" and insert -- "RefInfo" --, therefor.

In Column 36, Line 59, delete ""Ref Info"" and insert -- "RefInfo" --, therefor.

In Column 36, Line 60, delete ""Ref Info"" and insert -- "RefInfo" --, therefor.

In Column 36, Line 62, delete ""Ref Info"" and insert -- "RefInfo" --, therefor.

In Column 36, Line 66, delete ""Ref Info"" and insert -- "RefInfo" --, therefor.

In Column 36, Line 67, delete "<ReferenceData»"." and insert -- <ReferenceData>>". --, therefor.

In Column 36, Line 67, delete ""Ref Info"" and insert -- "RefInfo" --, therefor.

In Column 37, Line 10, delete ""Ref Info"" and insert -- "RefInfo" --, therefor.

In Column 38, Line 1, delete ""Ref Info"" and insert -- "RefInfo" --, therefor.

In Column 41, Line 55, delete "ge" and insert -- le --, therefor.

In Column 43, Lines 48-49, delete ""Common ReferenceProcessingData":" and insert -- "CommonReferenceProcessingData": --, therefor.

In Column 44, Line 4, delete ""Common ReferenceProcessingData"" and insert -- "CommonReferenceProcessingData" --, therefor.

In Column 44, Line 11, delete ""Common ReferenceProcessingData"" and insert -- "CommonReferenceProcessingData" --, therefor.

In Column 45, Line 40, delete "[user3, user4]," and insert -- [User3, User4], --, therefor.